(12) United States Patent
Khalid

(10) Patent No.: US 12,507,087 B2
(45) Date of Patent: Dec. 23, 2025

(54) METHODS AND APPARATUS FOR AUTOMATICALLY DETECTING AND/OR CORRECTING PHYSICAL CELL ID (PCI) COLLISIONS

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 364 days.

(21) Appl. No.: 18/212,703

(22) Filed: Jun. 21, 2023

(65) Prior Publication Data

US 2024/0430701 A1    Dec. 26, 2024

(51) Int. Cl.
*H04W 24/10* (2009.01)
*H04W 24/02* (2009.01)

(52) U.S. Cl.
CPC ........... *H04W 24/02* (2013.01); *H04W 24/10* (2013.01)

(58) Field of Classification Search
CPC .............................. H04W 24/02; H04W 24/10
See application file for complete search history.

(56) References Cited

U.S. PATENT DOCUMENTS

| | | | |
|---|---|---|---|
| 2013/0215870 A1* | 8/2013 | Hosobe | H04W 36/0061 370/331 |
| 2015/0063137 A1* | 3/2015 | Shen | H04W 24/10 370/252 |

\* cited by examiner

*Primary Examiner* — Chuong A Ngo
(74) *Attorney, Agent, or Firm* — Straub & Straub; Michael P. Straub; Stephen T. Straub

(57) ABSTRACT

Methods and apparatus for automatically identifying overshooting cells and automatically changing PCIs in cases of actual or possible PCI confusion are described. A cell with a poor KPI, e.g., indicative of failed attachment attempts, is identified. PCI confusion is considered as a possible cause of the poor KPI. A cell which uses the same PCI as the cell with the poor KPI is identified and the coverage areas of the cell with the poor KPI and the other cell using the same PCI is determined. Operating UEs in trace mode combined with deactivation of a cell while the other cell using the same PCI remains active is sometimes used to map cell coverage areas. If the coverage areas of two cells using the same PCI are determined to overlap, a different PCI is assigned to one of the two cells using the same PCI to thereby eliminate possible PCI confusion.

20 Claims, 37 Drawing Sheets

| FIGURE 3A |
|---|
| FIGURE 3B |
| FIGURE 3C |
| FIGURE 3D |

FIGURE 3

| FIGURE 9A |
| FIGURE 9B |
| FIGURE 9C |
| FIGURE 9D |
| FIGURE 9E |
| FIGURE 9F |
| FIGURE 9G |
| FIGURE 9H |
| FIGURE 9I |
| FIGURE 9J |
| FIGURE 9K |
| FIGURE 9L |
| FIGURE 9M |

FIGURE 9

METHODS AND APPARATUS FOR AUTOMATICALLY DETECTING AND/OR CORRECTING PHYSICAL CELL ID (PCI) COLLISIONS

FIELD

The present application relates to communications methods and apparatus, and more particularly, to methods and apparatus for identifying overshooting cells, identifying PCI cell collision pairs, and/or automatically performing PCI management operations to correct problems such as PCI collisions.

BACKGROUND

Cells are identified by physical cell ID (PCI) in a wireless network. A user equipment (UE) trying to connect to a wireless network must obtain PCI and synchronize itself with the network.

There is a limited number of PCI's available in a 4G wireless network and a 5G wireless network, i.e., 504 and 1008, respectively. Due to the limited number of PCIs, PCIs must be reused within a network in which there are more cells than unique PCIs.

5G networks deploy high frequencies and are usually very dense compared to 4G networks. Because of the high frequency used and dense deployments typical of 5G networks, good PCI planning is needed for a pre-determined re-usable distance between two different cells being assigned the same PCI. However, even with careful planning, heterogeneous networks are prone to PCI collision and confusion. This is largely because small cells deployed indoor as well as of different sizes can overshoot because of the radio frequency (RF) environment. The RF environment is also varying in some markets or areas due to different constructions/architecture, different foliage, and/or different capacity sites.

Cells of different sizes are deployed to provide coverage and capacity as needed. These cells are deployed in varying terrain, with varying clutter and varying building heights. Due to a complex deployment, PCI confusion is very likely in at least some parts of the network. When the coverage area of cells using the same PCI overlap this is sometimes referred to as a PCI collision and can cause PCI confusion where a UE may be unsure or confused about what actual physical cell it is attached to or trying to attach to. Thus PCI confusion is often the result of multiple cells, e.g., a pair of cells, using the same PCI in the coverage area in which the UE is located. PCI confusion will hinder UEs from synchronizing and connecting to the network. Due to PCI confusion, one or more network Key Performance Indicators (KPIs) may look poor, e.g., with the poor KPI being bad due to failed attachment attempts. In such a case the poor KPI may indicate that users are unable to connect to the network. This can result in churn, i.e., poor experience leading to users abandoning the service provider.

Normally, overshooting cells could be optimized to avoid overshooting of coverage, e.g., by reducing the range of an identifying overshooting cell. However, this approach of reducing the coverage range of an identified cell, which overshoots in one localized area, may lead to coverage gaps in other areas of the network. Thus, it would be better, from an overall network coverage standpoint, if the PCI of the overshooting cell could be changed to eliminate the PCI confusion, rather than reducing the coverage range of a cell.

The usual method of identifying overshooting cells requires drive testing, and drive testing is an expensive method of network diagnostics, as it requires vehicles, testing technical personnel, and measurement/recording equipment. In addition, the usual method for changing a PCI of a cell involves manual review, manual approval, and manual intervention to implement the PCI change in the network, which is also costly and time consuming.

In view of the above discussion, there is a need for methods and apparatus for automatically detecting PCI collisions, e.g., finding overshooting cells which reach the coverage area of another cell with the same PCI, and/or automatically changing PCIs to eliminate a detected PCI collision.

SUMMARY

Methods and apparatus for automatically identifying overshooting cells and automatically changing PCIs are described. Methods and apparatus, in accordance with the present invention, are suitable for use in a Mobile Network Operator (MNO) network, e.g., an independently operating MNO network or a Hybrid Mobile Network Operator (HNMO) network. The methods and apparatus, in accordance with the present invention, are particularly well suited for use in a HMNO network due to ease of implementation and fall back on a MNO (backup network presence).

In accordance with one exemplary embodiment a cell with a poor KPI is identified. In at least some cases where the KPI relates to failed attachment attempts, PCI confusion is considered as a possible cause of the poor KPI. A cell which uses the same PCI as the cell with the poor KPI is identified and the coverage areas of the cell with the poor KPI and the other cell using the same PCI is determined. Determining the coverage areas of the cells which may be subject to PCI confusion can involve turning off one of the cells being evaluated for possible PCI confusion and using UE trace mode capabilities to determine the overage area of the cell using the same PCI that is left operating. If the coverage areas of two cells using the same PCI are determined to overlap, a different PCI is assigned to one of the two cells using the same PCI to thereby eliminate possible PCI confusion.

An exemplary method of controlling physical cell ID (PCI) use in a network, in accordance with some embodiments, comprises: identifying one or more cells with a key performance indicator (KPI) below a cell level threshold, said one or more cells including a first cell with a KPI below the cell level threshold: identifying a first collision candidate cell having a PCI which is the same as the PCI of the first cell, said first cell and first collision candidate cell forming a first potential PCI cell pair; determining the coverage area of the first collision candidate cell based on information indicating the location of user equipments (UEs) receiving service from the first collision candidate cell: determining if the coverage area of the first collision candidate cell overlaps a cell coverage area of the first cell; and performing a PCI management operation based on whether said determining determines that the coverage area of the first collision candidate cell overlaps the cell coverage area of the first cell or does not overlap the cell coverage area of the first cell.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 3 comprises the combination of FIG. 3A, FIG. 3B, FIG. 3C and FIG. 3D.

FIG. 9 comprises the combination of FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L and FIG. 9M.

DETAILED DESCRIPTION

Figure 1:
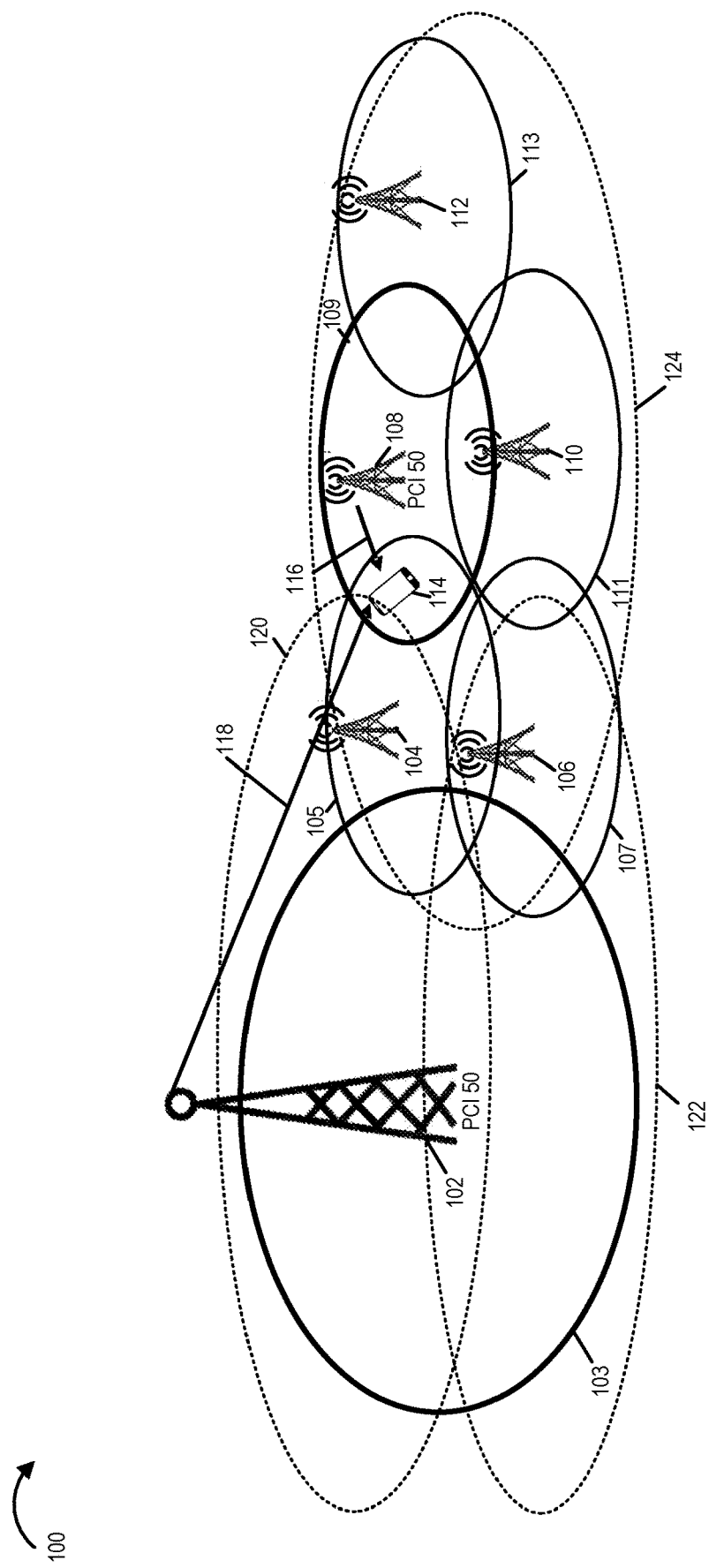
FIG. 1 is a drawing illustrating a communications system including cells of a mobile wireless network in which a cell, using a particular physical cell identifier (PCI) may overshoot into another cell using the same PCI resulting in a PCI collision problem.

FIG. 1 is a drawing illustrating a communications system 100 including cells of a first mobile wireless network. The first mobile wireless network includes (cell 1 base station 102, e.g., gNB1, cell 2 base station 104, e.g., gNB2, cell 3 base station 106, e.g., gNB3, cell 4 base station 108, e.g., gNB4, cell 5 base station 110, e.g., gNB5, cell 6 base station 112, e.g., gNB6) with corresponding intended wireless coverage areas (103, 105, 107, 109, 111, 113), respectively. The communications system 100 further includes a plurality of user equipments (UEs) including exemplary UE 114. Each cell has an assigned PCI. In this example cell 1 with serving base station 102 and cell 4 with serving base station 108 each have the same assigned PCI=50. Assume that each of the other cells (cell 2 with serving base station 104, cell 3 with serving base station 106, cell 4 with serving base station 110, cell N with serving base station N 112) each have a unique PCI, which is not assigned to any of the other cells shown in FIG. 1.

Large cell 1, with its serving base station 102, has a large intended coverage area 103, while small cell 4, with its serving base station 108 has a small intended coverage area 109. FIG. 1 is illustrating a case where cell 1, with a PCI of 50, is overshooting. Signal 118 from cell 1 base station 102, e.g., gNB1, reaches UE 114, which is currently at a location which is outside the intended coverage area 103 for cell 1. Signal 116 from cell 4 base station 108, e.g., gNB4, also reaches UE 114. The larger cell 1, with PCI=50 is overshooting into the intended coverage area 109 of small cell 4, which also has a PCI of 50. The opposite case can also happen when coverage of a smaller cell can overshoot into the intended coverage of a larger cell.

The overshooting of a cell can go undetected, as there is typically no distinct method to detect the overshooting cell and report the overshooting cell for correction. Drive testing collecting data, performing manual evaluations of collected data, and manually taking corrective actions has usually been the best way to resolve an issue of an overshooting cell. However, the approach of drive testing and manual interventions is not only costly but also results in a delayed response to fix an identified problem.

An exemplary method, in accordance with the present invention, relies on data reported by UEs to map actual coverage areas for cells, which may be experiencing PCI collision and identify PCI collision areas. The UE reported data includes UE location information, e.g., UE GPS position fixes, and/or information used to derive UE locations. In some embodiments, the UE reported data includes trace mode data from UEs. Based on reported or determined geolocations of the UEs, being served by the base station, e.g., gNB, of the cell, the actual coverage area of the cell is determined. The actual coverage area for each cell of a potential PCI collision cell pair is determined. A comparison, e.g., a geographical comparison, of determined cell coverage areas is used to determine a coverage area overlap, e.g., corresponding to an overshooting cell. A determined coverage area overlap, if it exists, between the two cells of the potential PCI collision cell pair, is indicative of a PCI collision problem for the cell pair and identifies a collision zone(s). In some embodiments, within collision zones, one or more UEs can be, and sometimes are, instructed to collect and send more detailed data to estimate the impact of potential collision. Automated decisions are made, e.g., based on the UE data and/or more detailed UE data, e.g., automatically changing the assigned PCI of an overshooting cell.

The exemplary method, in accordance with the present invention, utilizes a system, implemented in accordance with features of the present invention, in place, e.g., a system including a PCI collision detector (PCD), an operating support systems (OSS), and a geographic information system (GIS), that will look at the collected data (e.g., trace data) from the UEs and determine a collision zone and eventually fix the issue automatically, e.g., automatically re-assigning a cell to a different PCI.

The exemplary system 100 shown in FIG. 1 further includes a second mobile wireless network, e.g., a mobile network operator (MNO) network. The dashed circles (120, 122, 124) represent intended MNO coverage areas corresponding to the second mobile wireless network. The base stations for the cells of the second mobile wireless network, e.g., the MNO network, are not shown in this example.

In one example, the first mobile wireless network, which includes cells (cell 1 with its serving base station 102, cell 2 with its serving base station 104, cell 3 with its serving base station 106, cell 4 with its serving base station 108, cell 5 with its serving base station 110, cell 6 with its serving base station 112) is a mobile virtual network operator (MVNO) network. In various embodiments, the intent is to for UEs of the first network including UE 114 to use the first mobile wireless network as much as possible, with the second mobile wireless network being available as a back-up network, when adequate coverage in the first network is not available. Therefore, it is beneficial to reduce or eliminate any first network collisions, with regard to PCI, so that the UE 114 will remain connected to cells of the first network.

Figure 2:
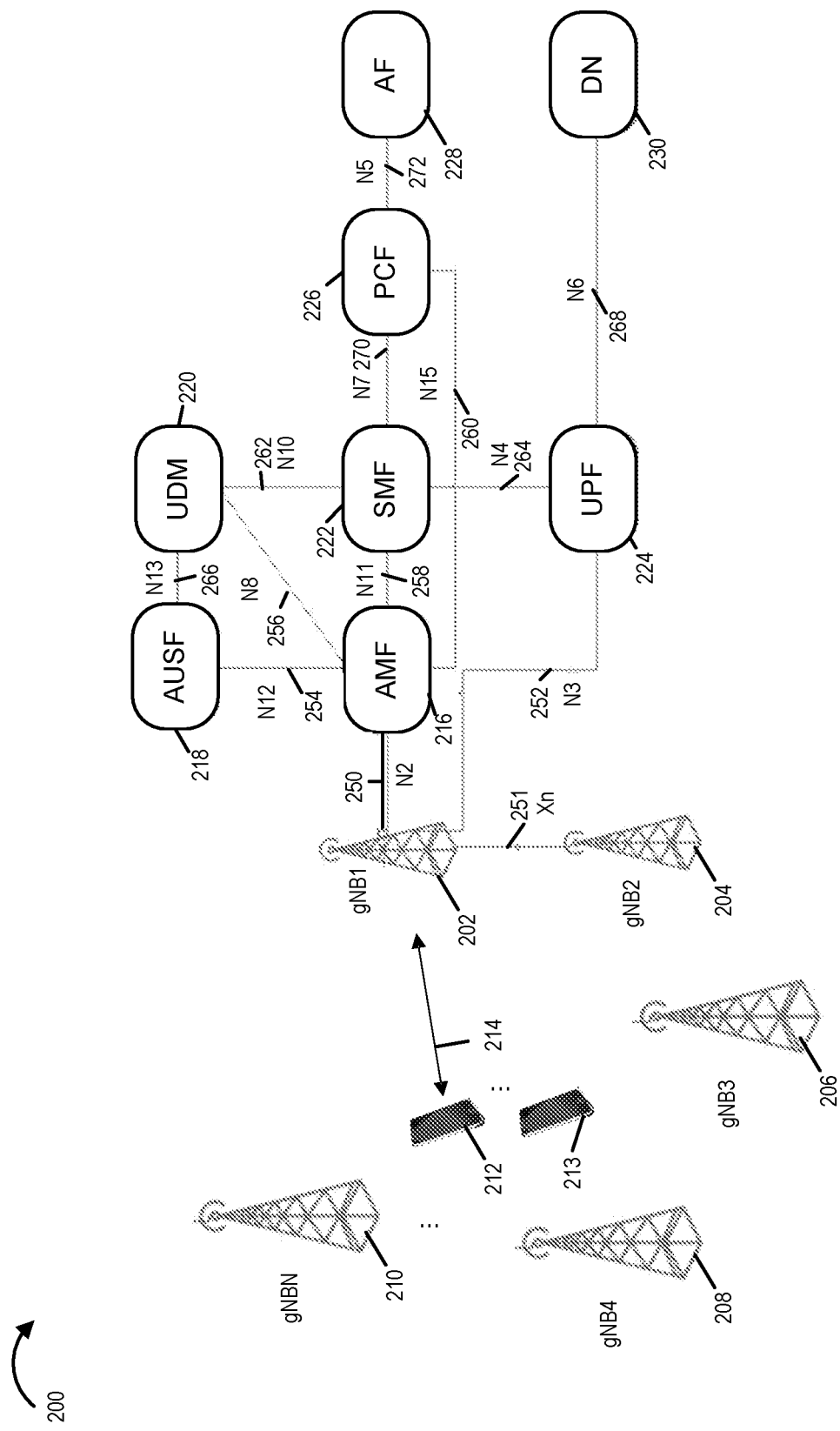
FIG. 2 is a drawing illustrating a wireless communications system including a plurality of gNBs, and a plurality of UEs, and typical high level infrastructure of a 5G network, coupled together as shown.
Figure 3A:
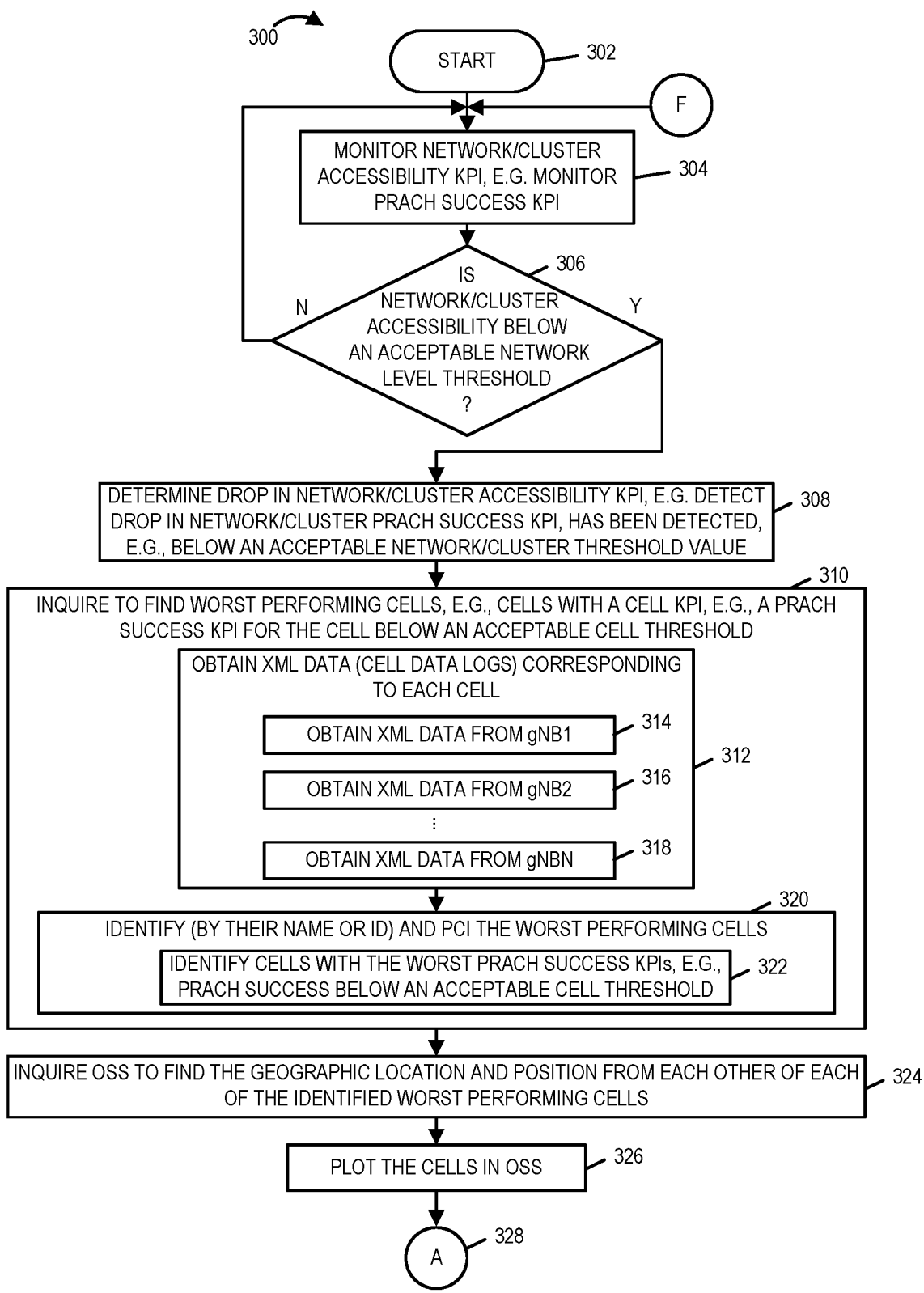
FIG. 3A is a first part of a flowchart of an exemplary method of operating a communications system in accordance with an exemplary embodiment.
Figure 3B:
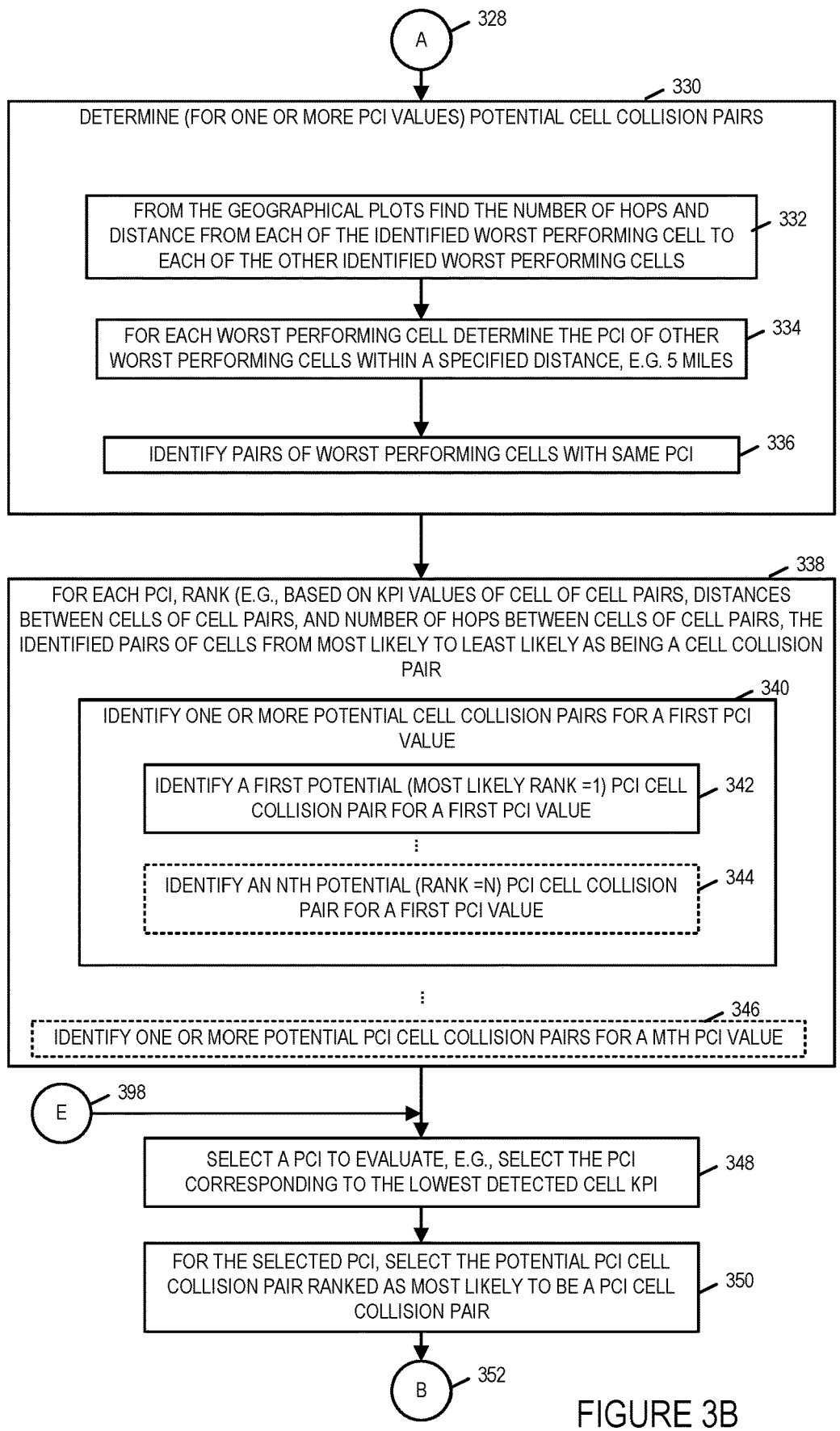
FIG. 3B is a second part of a flowchart of an exemplary method of operating a communications system in accordance with an exemplary embodiment.
Figure 3C:
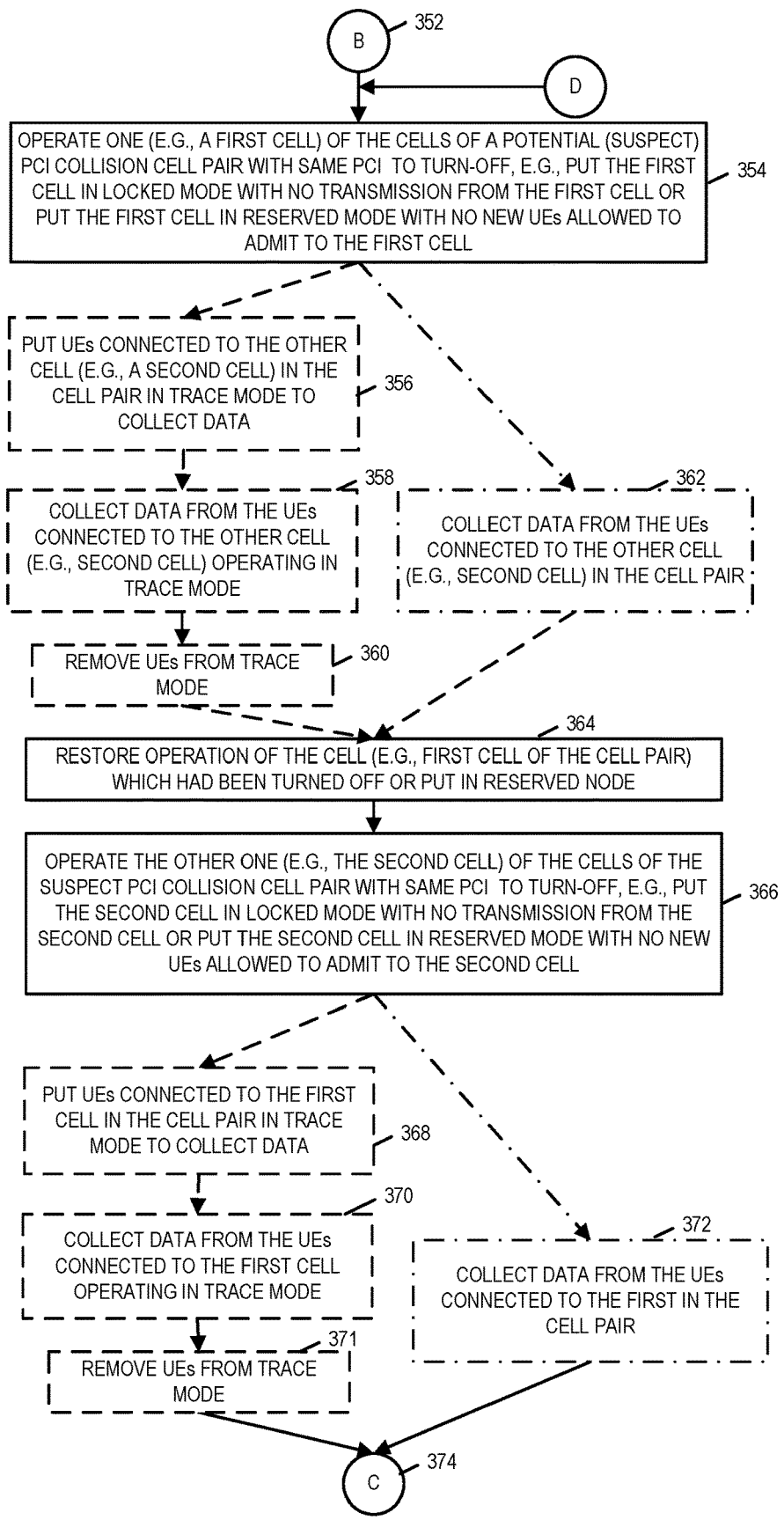
FIG. 3C is a third part of a flowchart of an exemplary method of operating a communications system in accordance with an exemplary embodiment.
Figure 3D:
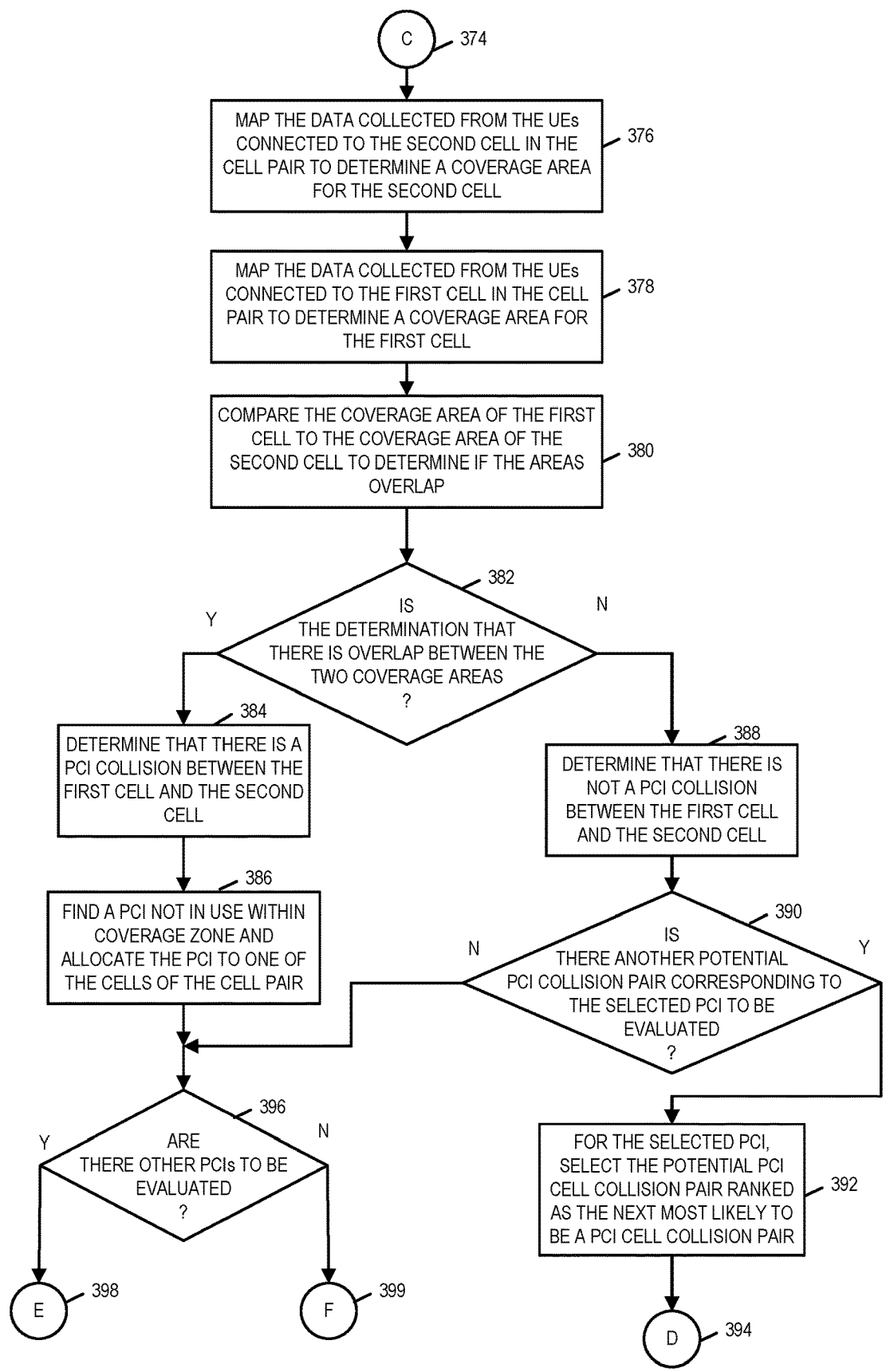
FIG. 3D is a fourth part of a flowchart of an exemplary method of operating a communications system in accordance with an exemplary embodiment.

FIG. 2 is a drawing illustrating a wireless communications system 200 including a plurality of gNBs (gNB1 202, gNB2 204, gNB3 206, gNB4 208, ..., gNBN 210), and a plurality of UEs (UE1 212, ..., UEN 213), and typical high level infrastructure of a 5G network including an access and mobility management function (AMF) 216, an authentication server function (AUSF) 218, a unified data management (UDM) 220, a session management function (SMF) 22, a user plane function (UPF) 224, a policy control function (PCF) 226, an application function (AF) 228, and a data network (DN) 230, coupled together as shown. Each of the UEs (UE 1 212, ..., UEN 213) may be coupled to one or more of the gNBs. Exemplary UE 1 212 is shown coupled to gNB1 202 via wireless link 214. First base station gNB 1 202 is coupled to AMF 216 via N2 connection 250. Each of the other base stations (gNB2 204, gNB3 206, gNB4 208, ..., gNBN 210) is also coupled to an AMF such as, e.g., AMF 216. First base station gNB1 202 is also coupled to second base gNB2 204 via Xn connection 251. First base station gNB1 202 is coupled to UPF 224 vis N3 connection 252. AMF 216 is coupled to AUSF 218 via N12 connection 254. AMF 216 is coupled to UDM 220 via N8 connection 256. AMF 216 is coupled to PCF 226 via N15 connection 260. AUSF 218 is coupled to UDM 220 via N13 connection 266. AMF 216 is coupled to SMF 222 via N11 connection 258. SMF 222 is coupled to UDM 220 via N10 connection 262. SMF 222 is coupled to PCF 226 via N7 connection 270. PCF 226 is coupled to AF 228 via N5 connection 272. UPF 224 is coupled to DN 230 via N6 connection 268. A 4G network is similar to the 5G network but with fewer network entities. Exemplary 4G network entities include a mobility management entity (MME), a home subscriber server (HSS), a packet data network (PDN) gateway (P-GW), a serving gateway (S-GW), and a policy and charging rules function (PCRF).

A UE, e.g., UE 212, is constantly measuring the network and sending reports back to the gNB to which it is connected, e.g., for delivery back to the network, e.g., back to the core. The base stations, e.g., gNBs send gnodeB level data back to the network, e.g., back to the core. The network uses this data to determine when to handover a given UE from one gNB, e.g., from gNB 1 202 to another gNB, e.g., one of gNB2 204, gNB3 206, gNB4 208, gNBN 210.

Data is typically received by the core network from 1000's of UEs and each type of type, which is received, usually has one or more very specific uses.

In accordance with one feature of various embodiments of the present invention, reported data from UEs will be used to determine collision zones (PCI collision zones). The reported UE data will be used in helping to lockdown on existing collision zones, e.g., automatically identify with precision existing collision zones.

In addition to collecting and using UE level data, which is normally reported back, in some embodiments, UEs are controlled to collect UE traces, to further drill down and provide additional information to more precisely identify collision zones and/or sources of cell overshooting.

In various embodiments, after determining the problem, e.g., a PCI collision on a particular PCI due to overshooting of a particular cell, the system can automatically fix the issue by changing the PCI, e.g., changing the PCI of the overshooting cell which resulted in the detected PCI collision.

PCI confusion or collision is caused when a UE is trying to acquire the network, e.g., the first network. If a UE receives the same PCI from two (or more) cells, then the UE may not be able to acquire the network because the same PCI is coming from two (or more) different cells.

In accordance with a feature of some embodiments of the present invention, a technique is implemented which proactively determines collision regions, and these determined collision regions are then used to determine the cell, who's PCI should be changed. The exemplary process uses a step by step approach to determine the collision prone cells and then performs further steps to fix the issue.

FIG. 3, comprising the combination of FIG. 3A, FIG. 3B, FIG. 3C and FIG. 3D, is a flowchart 300 of an exemplary method of operating a communications system in accordance with an exemplary embodiment. Operation of the exemplary method starts in step 302 in which the communications system is powered on and initialized. Operation proceeds from start step 302 to step 304. In step 304 an OSS monitors a network/cluster accessibility KPI, e.g., the OSS monitors PRACH success KPI for the network or cluster. Operation proceeds from step 304 to step 306. In step 306 the OSS determines if the network/cluster accessibility KPI is below an acceptable network level threshold. If the determination is that the network/cluster KPI is not below the acceptable network level threshold, then operation proceeds from step 306 to the input of step 304 for additional monitoring. However, if the determination is that the network/cluster KPI is below the acceptable network level threshold, then operation proceeds from step 306 to step 308, in which the OSS determines that a drop in the network/cluster KPI has been detected, e.g., a drop in the PRACH success KPI has been detected, e.g., below the acceptable network/cluster threshold value, and operations are to proceed to attempt to identify a PCI collision between cells and take corrective action(s). Operation proceeds from step 308 to step 310.

In step 310 the OSS inquires to find the worst performing cells, e.g., cells with a cell KPI, e.g., a PRACH success KPI for the cell, below an acceptable cell level threshold. Step 310 includes step 312. Step 310 includes step 312, in which the OSS obtains XML data (cell data logs) corresponding to each cell (cell 1, cell 2, . . . , cell N). Step 312 includes steps 314, 316 and 318. In step 314 the OSS obtains XML data from gNB1. In step 316 the OSS obtains XML data from gNB2. In step 318 the OSS obtains XML data from gNBM. Operation proceeds from sep 312 to step 320.

In step 320 the OSS identifies (e.g., by their name and/or ID) and PCI, the worst performing cells. Step 320 includes step 322, in which the OSS identifies cells with the worst PRACH success KPIs, e.g., cells with PRACH success KPI values below an acceptable cell level threshold. Operation proceeds from step 310 to step 326.

In step 326 the OSS plots the identified worst performing cells, e.g., obtaining a graphical plot which identifies the location of the worst performing cells with respect to each other. Operation proceeds from step 326, via connecting node A 328 to step 330.

In step 330 the OSS determines, for one or more PCI values, potential PCI collision pairs. For example, the OSS determines potential PCI collision pairs for PCI=50. Step 330 includes steps 332, 334 and 336. In step 332 the OSS finds from the geographical plot the number of hops and distance from each of the identified worst performing cells to each of the other identified worst performing cells. In step 334 the OSS determines for each of the identified worst performing cells, the PCI of other worst performing cells with a specified distance, e.g., 5 miles. In step 336 the OSS identifies pairs of worst performing cells with the same PCI. Operation proceeds from step 330 to step 338.

In step 338, for each PCI, the OSS ranks (e.g., based on KPI values of cells of a cell pairs, distance between cells of cell pairs, and/or number of hops between cells of cell pairs, the identified pairs of cells from most likely to least likely as being a cell collision pair. Step 338 includes step 340 in which the OSS identifies one or more potential PCI cell collision pairs for a first PCI value (e.g., PCI=50). Step 340 includes step 342 and may, and sometimes does, include step 344. In step 342 the OSS identifies a first potential (most likely with rank=1) PCI collision pair for the first PCI value.

In step 344 the OSS identifies a Nth potential (with rank=1) PCI collision pair for the first PCI value. In some embodiments, step 338 includes step 346, in which the OSS identifies one or more potential PCI collision pairs for a Mth PCI value. OSS determined PCI collision pair information is communicated from the OSS to the PCI collision detector (PCD).

Operation proceeds from step 338 to step 348. In step 348 the PCD selects a PCI to evaluate, e.g., the PCD selects the PCI corresponding to the lowest detected cell KPI for which at least one potential PCI collision pair has been identified. For example, consider the that lowest detected KPI for a cell corresponds to PCI=50 and that at least one potential PCI collision pair has been identified for PCI=50. Operation proceeds from step 348 to step 350. In step 350 the PCD, selects, for the selected PCI, the potential PCI collision pair ranked as most likely to be a KPI collision pair, for further evaluation and testing. Operation proceeds from step 350, via connecting node B 352 to step 354.

In step 354 the PCD operates one (e.g., a first cell) of the cells of a potential (suspect) PCI collision pair with the same PCI to turn-off, e.g., put the first cell in locked mode with no transmission from the first cell, or put the first cell in reserved mode with no new UEs allowed to admit to the first cell. In some embodiments, the PCD operates the first cell to turn-on or enter reserved mode via a control message sent to the base station of the first cell via the OSS, and the base station of the first cell receives the control message and implements the command. Operation proceeds from step 354 to step 356 or step 362, depending upon the embodiment.

In step 356 the PCD puts UEs connected to the other cell (e.g., a second cell) in the cell pair in trace mode to collect data. In some embodiments, the PCD puts UEs connected to the other cell in trace mode via a control message sent to the base station of the second cell via the OSS, and the base station of the second cell sends commands to its UEs, which implement the command and enter trace mode. Operation proceeds from step 356 to step 358. In step 358 the PCD collects data from UEs connected to the other cell, e.g., second cell, operating in trace mode. For example, the UEs operating in trace mode sends trace data to the base station of the second cell, which aggregates the trace data from multiple UEs and sends trace logs to a TCE server which stores the trace logs. Then the TCE sends the trace logs to the PCD when requested. Operation proceeds from step 358 to step 360. In step 360 the PCD removes the UEs from trace mode, e.g., via sending a command message to the base station of the second cell.

In step 362 the PCD collects data from the UEs connected to the other cell (e.g., second cell) in the cell pair. For example, the PCD obtains, e.g., from the OSS or from a UE location tracking server, UE data corresponding to the second cell during the time interval in which the first cell was turned off or operating in reserved mode.

Operation proceeds from step 360 or step 362 to step 364. In step 364 the PCD restores operation of the cell (e.g., first cell of the cell pair) which had been turned-off or put in reserved mode, e.g., a command message sent to the base station of the first cell. Operation proceeds from step 364 to step 366

In step 366 the PCD operates the other one (e.g., the second cell) of the cells of the potential PCI collision pair with the same PCI to turn-off, e.g., put the second cell in locked mode with no transmission from the second cell, or put the second cell in reserved mode with no new UEs allowed to admit to the second cell. In some embodiments, the PCD operates the second cell to turn-on or enter reserved mode via a control message sent to the base station of the second cell via the OSS, and the base station of the second cell receives the control message and implements the command. Operation proceeds from step 366 to step 368 or step 372, depending upon the embodiment.

In step 368 the PCD puts UEs connected to the first cell in the cell pair in trace mode to collect data. In some embodiments, the PCD puts UEs connected to the first cell in trace mode via a control message sent to the base station of the first cell via the OSS, and the base station of the first cell sends commands to its UEs, which implement the command and enter trace mode. Operation proceeds from step 368 to step 370. In step 370 the PCD collects data from UEs connected to the first cell operating in trace mode. For example, the UEs operating in trace mode sends trace data to the base station of the first cell, which aggregates the trace data from multiple UEs and sends trace logs to a TCE server which stores the trace logs. Then the TCE sends the trace logs to the PCD when requested. Operation proceeds from step 370 to step 371. In step 371 the PCD removes the UEs from trace mode, e.g., via sending a command message to the base station of the first cell.

In step 372 the PCD collects data from the UEs connected to the other first cell in the cell pair. For example, the PCD obtains, e.g., from the OSS or from a UE location tracking server, UE data corresponding to the first cell during the time interval in which the second cell was turned off or operating in reserved mode.

Operation proceeds from step 371 or step 372, via connecting node C 374 to step 376.

In step 376, a GIS server maps data collected from the UEs connected to the second cell in the cell pair to determine a coverage area for the second cell. For example, the PCD, which has acquired the UE data (e.g., trace data or other UE data which includes UE location information), corresponding to UEs connected to the base station of the second cell, sends the UE data to the GIS server, which maps the data to obtain a geographical map of the coverage area for the second cell (under the condition that first cell is turned of or in reserve mode). Operation proceeds from step 376 to step 378.

In step 378, a GIS server maps data collected from the UEs connected to the first cell in the cell pair to determine a coverage area for the first cell. For example, the PCD, which has acquired the UE data (e.g., trace data or other UE data which includes UE location information), corresponding to UEs connected to the base station of the first cell, sends the UE data to the GIS server, which maps the data to obtain a geographical map of the coverage area for the first cell (under the condition that second cell is turned of or in reserve mode). Operation proceeds from step 378 to step 380.

In step 380 the GIS server compares the coverage area of the first cell to the coverage area of the second cell to determine if the areas overlap. Operation proceeds from step 380 to step 382.

In step 382 the if the determination is that there is an overlap between the two coverage area, then operation proceeds to step 384 in which the PCD determines that there is a PCI collision between the first cell and the second cell. However, if the determination is that there is no overlap between the two coverage area, then operation proceeds from step 382 to step 388, in which the PCD determines that there is not a PCI collision between the first cell and the second cell.

Returning to step 384, operation proceeds from step 384 to step 386, in which the OSS, under the control of the PCD finds a PCI not in use (e.g., PCI=51) within the coverage zone area that would be affected by the change and allocates the PCI to one of the cells of the cell pair, e.g., the first cell or the second cell. Operation proceeds from step 386 to step 396.

Returning to step 388, operation proceeds from step 388 to step 390. In step 390 the PCD determines whether or not there is another potential PCI collision pair corresponding to the selected PCI (e.g., PCI=50) to be evaluated. If the determination is that there is not another potential PCI collision pair corresponding to the selected PCI to be evaluated, then operation proceeds from step 390 to step 396. However, if the determination is that there is another potential PCI collision pair corresponding to the selected PCI to be evaluated, then operation proceeds from step 390 to step 392, in which the PCD selects, for the selected PCI (e.g., PCI=50), the potential PCI cell collision pair ranked and next mostly likely to be a PCI cell collision pair. For example, the PCD selects potential PCI cell collision pair (cell 1, cell 3) for evaluation. Operation proceeds from step 392 via connecting node D 394 to step 354.

Returning to step 396, in step 396 the PCD checks to determine if there are any other PCIs to be evaluated for PCI collision. If the determination is that there is at least one other PCI to be evaluated, then operation proceeds from step 396, via connecting node E 398 to step 348. However, if the determination is that there is not at least one other PCI to be evaluated, then operation proceeds from step 396, via connecting node F 399 to step 304.

Various features and aspects for some exemplary methods, in accordance with the present invention, are described below. One step, e.g., a first step, in an exemplary method includes finding, e.g., identifying, the suspecting cells that are causing the problem of PCI confusion. Another step, e.g., a second step, includes validating that the identified cells are indeed causing PCI collisions.

The precursor to a PCI collision problem is a decrease of the Physical Random Access Channel (PRACH) success key performance indicator (KPI). When this KPI (PRACH success KPI) drops for a cell, it is an indication of a PCI collision problem with respect to the cell.

When the network KPI (overall PRACH success KPI for the network) drops, the system investigates cells and finds the cells with the worst PRACH success. The system then narrows down to clusters by looking at the geographical locations of the identified cells. Exemplary steps include:

Step 1: Identify, using PRACH success KPI, the worst performing cells by their name (e.g., cell ID).

Step 2: Inquire operations support system (OSS) to find the geographical location of each of the identified cells, plot the identified cells, and determine the distance of each of the identified cells from one another.

Step 3: Determine cells/cluster with high PRACH drop (low PRACH success KPI).

Step 4: From the geographical plots, find the number of hops and distance of other cells.

Step 5: Determine PCI of other cells within a specified distance, e.g., 5 miles.

Step 6: Identify pairs with the same PCI.

Subsequent steps follow to determine collision zones, e.g., using UE to collect data, while in trace mode, identify a PCI not in use within the coverage zone of interest, and allocate the identified PCI (which is not in use within the coverage zone of interest) to one of the cells involved with the collision (e.g., the overshooting cell).

At step 2, cells are plotted and distance is measured. If the collision cells (e.g., a pair of potential collision cells which were identified by low PRACH success KPI) are next to each other and also have the same PCI, it is a straightforward case of neighbors with the same PCI. The network can initiate a PCI change for one of the cells of the cell pair within the OSS.

However, if the pairs/groups are not next to each other, then the system performs an investigation automatically. This investigation determines from a geographical point of view if there are cells within a defined distance with the same PCI possibly causing PCI collision/confusion. This approach is shown in drawing 400 of FIG. 4 for one exemplary cell, cell 402. The OSS is queried to determine the PCI of all neighboring cells within a circle. Drawing 400 shows exemplary cell 402 with PCI=50 and neighboring cells (404, 406, 408, 410, 412, 414), with corresponding PCIs (25, 30, 17, 25, 17, 30) within circle 432 corresponding to radius 430. In this example, there are no neighbors with the same PCI (PCI=50) within the first circle 432. This circle is expanded, in incremental steps, and the number of hops are determined between cells of the same PCI. Drawing 400 further shows neighboring cells (416, 418, 420), with corresponding PCIs (30, 25, 50) within circle 436 with radius 434 but outside circle 432 with radius 430. Drawing 400 further shows neighboring cell 422, with corresponding PCI=50 within circle 440 with radius 438 but outside circle 436 with radius 434.

Table 450 summarized cell pairs. Cell 402 and cell 420 are a first cell pair (having PCI=50) corresponding to one zone hop, as indicated by row 452. Cell 402 and cell 422 are a second cell pair (having PCI=50) corresponding to two zone hops.

Figure 4:
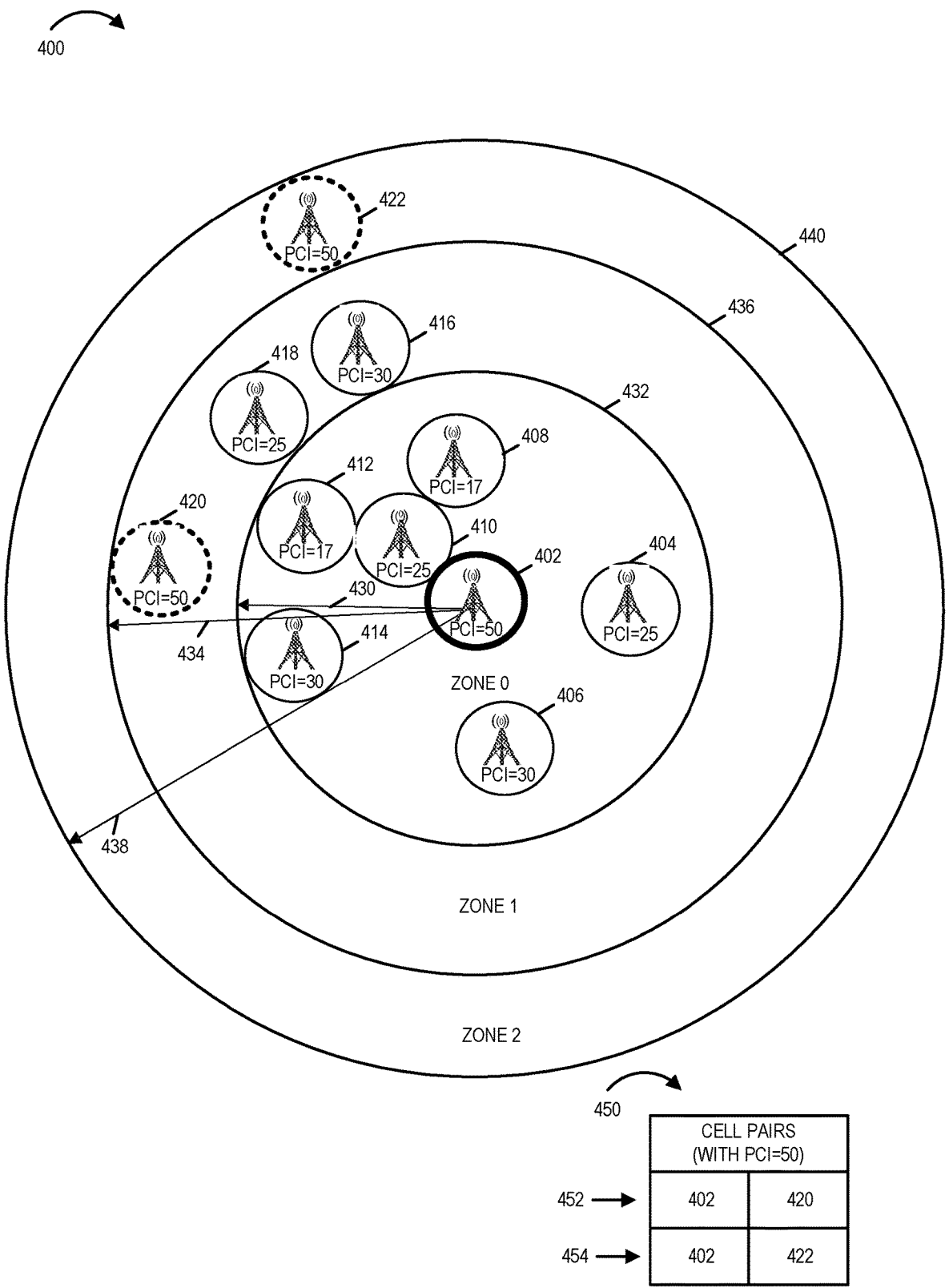
FIG. 4 is a drawing illustrating exemplary cells, identified as having a low Physical Random Access Channel (PRACH) success Key Performance Indicator (KPI), including cell pairs, with the same PCI, which may be PCI collision pairs.
Figure 5:
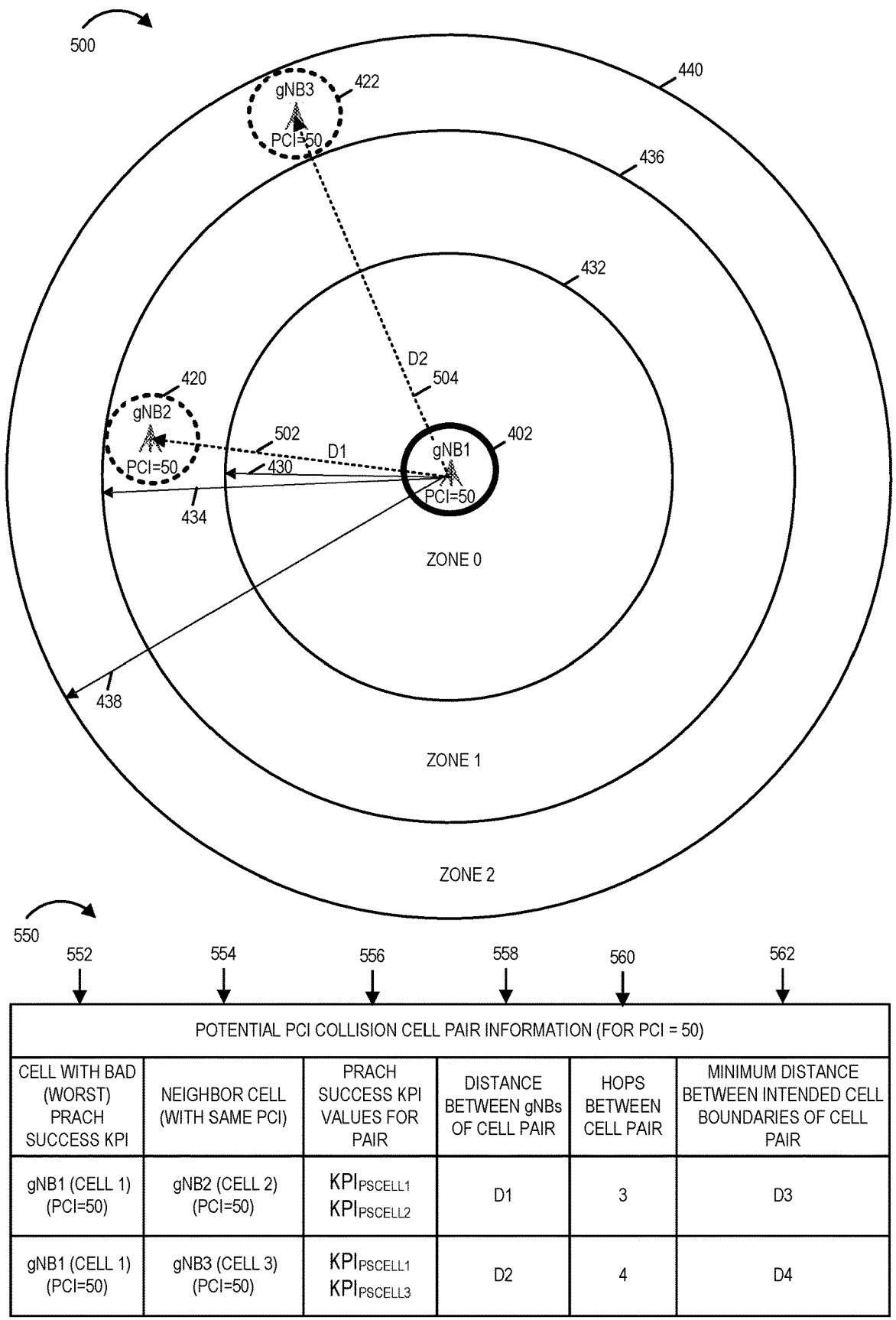
FIG. 5 is a drawing illustrating two exemplary potential PCI cell collision pairs and further including a table including information which may be used rank the potential PCI cell collision pairs as to which is more likely to be a cell PCI collision pair.

FIG. 5 includes a drawing 500 illustrating two exemplary potential PCI cell collision pairs corresponding to PCI=50: first potential PCI cell collision pair (cell 1 402/cell 2 404) and second potential PCI cell collision pair (cell 1 402/cell 3 422) corresponding to the example of FIG. 4, and further illustrates base station (gNB) pair separation distance information ((separation distance D1 502 between: gNB1, corresponding to cell 1, and gNB2, corresponding to cell 2) and (separation distance D2 504 between: gNB1, corresponding to cell 1, and gNB3, corresponding to cell 3. FIG. 5 further includes potential cell collision pair information table 550 which includes information (cell KPI values, gNB separation information, cell pair hop information, and minimum distance between intended cell boundaries information) which may be used rank the potential PCI cell collision pairs as to which one is more likely to be a cell PCI collision pair. Ranked potential PCI cell collision pairs are tested in order from most likely to least likely.

Consider that cell 402 (gNB1) has the worst (lowest) PRACH success KPI value for the cells with PCI=50. First column 552 lists the cell with the bad (worst) PRACH success KPI, which is cell 1 (gNB1). Second column 554 identifiers neighbors of cell 1, with the same PCI value, which identifiers gNB2 (cell 2) and gNB3 (cell 3). Third column 556 lists the PRACH success values for the potential cell PCI collision pairs. Fourth column 558 lists the distance between gNBs of potential PCI collision pairs. Fifth column 560 lists the number of hops between cells of the potential PCI collision pairs. Sixth column 562 lists the minimum distance between intended cell boundaries of a potential PCI collision pair. In some embodiments, in which cells with different intended cell sizes are implemented, the minimum distance between intended cell boundaries of a cell pair is included and used in addition to or in place of distance between gNBs of a cell pair.

In various embodiments, the likelihood ranking for a potential PCI collision pair corresponding to a set of potential PCI collision pairs for a particular PCI value, is determined based on one or more or all of: KPI values (e.g., PRACH success KPI values, distance between gNBs of a cell pair, hops between the cell pair, and/or minimum distance between intended cell boundaries of the cell pair).

After determining pairs, either or both of a couple of alternative methods can be, and sometimes are, used to resolve the problem.

In one method, via OSS, a cell of the cell pair is controlled to be put in cell reserve, i.e., the cell doesn't admit any new users, or the cell of the cell pair is controlled to be turn-off, e.g., as during maintenance operations, in order to be able to determine the overshooting range of the other cell of the cell pair, e.g. using UE measurements from UEs located within the intended coverage area of cell, which was put in reserve or turned-off.

In another method, propagation delay is used to determine the distance and compared with propagation.

The approach of placing a cell of the cell pair in reserve or turning off a cell of the cell pair to facilitate measurements will now be described in more detail. One pair of cells with the same PCI are identified, e.g., a candidate pair of cells with the same PCI are identified. One of the cells, e.g., a first cell, of the cell pair will be turned off, i.e., the first cell will be put in cell locked mode, i.e., no transmission from the first cell, or alternatively, the first cell will be put in cell reserve mode, i.e., no new UEs are allowed to admit into the first cell. As a next step the UEs (e.g., a set of UEs) connected to the other cell, e.g., the second cell of the cell pair, will be put in trace mode and data will be collected and reported to the second cell, or just their typical measurement will be performed, data collected and reported to the second cell (e.g., typical measurements reported to the second cell as part of normal operations). These measurement results will be plotted.

Similarly, the other cell, e.g., the second cell of the cell pair, will be turned off or put in reserve mode. As a next step the UEs (a set of UEs) under the first cell will be put in trace mode and data will be collected and reported to the first cell, or just their typical measurement will be performed, data collected and reported to the first cell (e.g., typical measurements reported to the first cell as part of normal operations). These measurement results will be plotted.

This approach will give two sets of measurements. If these measurements overlap, it means that PCIs overlap.

The overlap can be from: i) the first cell overshooting into the intended cell coverage area of the second cell, ii) the second cell overshooting into the intended cell coverage area of the first cell, iii) both the first cell overshooting into the intended cell coverage area of the second cell and the second cell overshooting into the intended cell coverage area of the first cell, and/or iv) the first cell and the second shell overshooting into the same area, which is outside the combined intended cell coverage areas of the first and second cells.

If the trace routes of the UEs of the first cell indicate UEs were within the intended coverage area of the second cell, then the first cell is overshooting into the second cell. If the trace routes of the UEs of second cell indicate UEs were within the intended coverage area of the first cell, then the second cell is overshooting into the first cell.

The first set of measurements gives an actual coverage area for the second cell without the effect of PCI collision from the first cell. The second set of measurements gives an actual coverage area for the first cell without the effect of PCI collision from the second cell.

If the actual coverage area for the second cell without the effect of PCI collision from first cell overlaps the actual coverage area for the first cell without the effect of PCI collision from the second cell, then the area of overlap is the area of PCI collision.

In various embodiments, the PCI of one of the first or second cell is changed in response to a determination that one or both of the following is occurring: i) the first cell is overshooting into the intended coverage area of the second cell, ii) the second cell is overshooting into the intended coverage area of the first cell: however, in some embodiments, no change in PCI is initiated if the overlap is just due to the first and second cells overshooting into the same area which is outside the combined intended cell coverage area for the first cell and the intended coverage area for the second cell.

Figure 6:
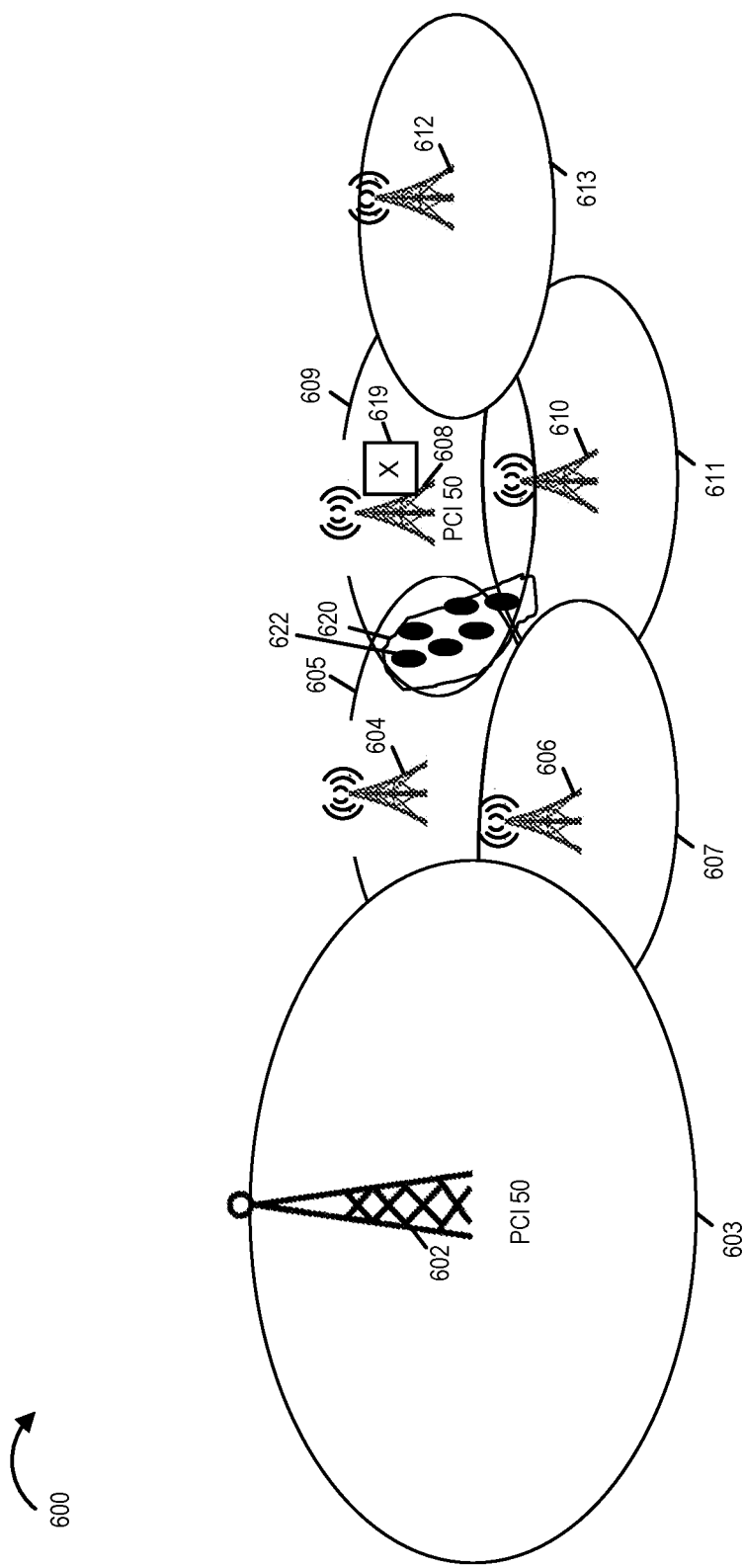
FIG. 6 is a drawing illustrating an example, in which a PCI collision occurs between a large cell overshooting into a smaller cell's intended coverage area, and the coverage area overlap between the two cells, indicating a PCI collision, is identified using a method in accordance with the present invention, in which a base station turned-off in combination with UEs of another base station in trace mode are used to a map coverage area.

FIG. 6 is a drawing 600 illustrating an example, in which a PCI collision occurs between a large cell overshooting into a smaller cell's intended coverage area, and the coverage area overlap 622 between the two cells, indicating a PCI collision, is identified using a method in accordance with the present invention, in which a base station turned-off in combination with UEs of another base station in trace mode are used to a map coverage area.

Drawing 600 shows a wireless communications network including a plurality of base stations (cell 1 serving base station 602, cell 2 serving base station 604, cell 3 serving base station 606, cell 4 serving base station 608, cell 5 serving base station 610, cell 6 serving base station 612), with corresponding intended cellular coverage areas (603, 605, 607, 609, 610, 613), respectively. Consider that at least one of cell 4 with its base station 608 and cell 1 with its base station 602 have both reported poor (very low and unacceptable) PRACH success KPI values, and both cells of the cell pair (cell 1/cell 4) are using the same PCI=50.

Operations are performed to detect if larger cell 1 is overshooting into the intended coverage area of small cell 4. Small cell 4's coverage is put on reserve or turned off, as indicated by X 619. Cell 1's UE's are put into trace mode to determine if PCI=50 is still observed in the intended area of coverage 609 of small cell 4. Data collected by cell 1's UEs is used to map out the actual coverage area of cell 1 (including a possible overshoot into the intended coverage area of cell 4). If coverage from PCI 50 (large cell 1 with its serving base station 602) is found by the first cell's UE (in trace mode) within the intended coverage area 609 of small cell 4, the results are plotted. Area 620 with UEs 622 indicates that UEs from cell 1 have been detected (e.g., via UE trace mode (e.g., UE (location) route tracking) while cell 4 was in reserve or turned off. Area 620 is a first detected PCI collision area for cell pair: (cell 1, cell 4), which is due to large cell 1 overshooting into small cell 4.

Figure 7:
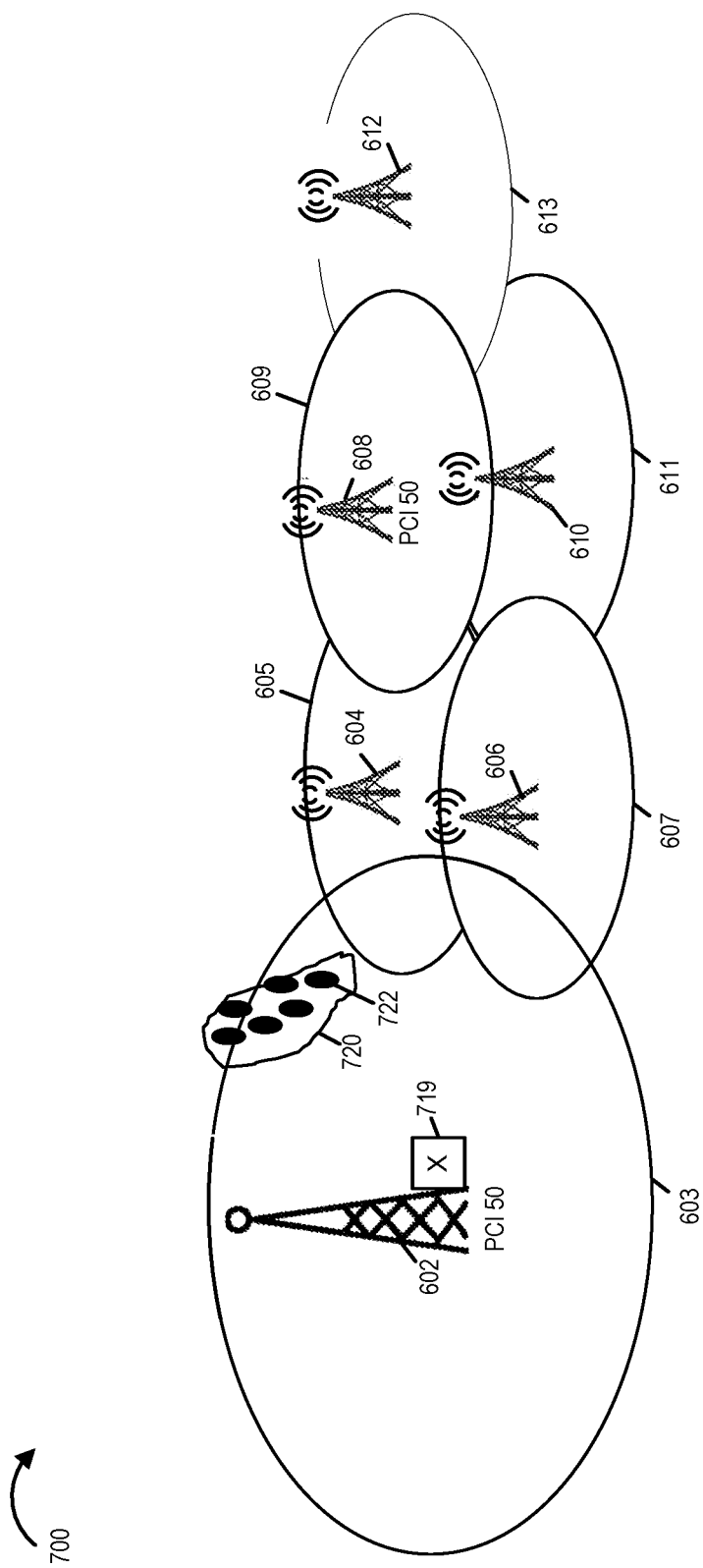
FIG. 7 is a drawing illustrating an example, in which a PCI collision occurs between a small cell overshooting into a larger cell's intended coverage area, and the coverage area overlap between the two cells, indicating a PCI collision, is identified using a method in accordance with the present invention, in which a base station turned-off in combination with UEs of another base station in trace mode are used to a map coverage area.

FIG. 7 is a drawing 700 illustrating an example, in which a PCI collision occurs between a small cell overshooting into a larger cell's intended coverage area, and the coverage area overlap 720 between the two cells, indicating a PCI collision, is identified using a method in accordance with the present invention, in which a base station turned-off in combination with UEs of another base station in trace mode are used to a map coverage area.

Drawing 700 shows the same wireless communications network of FIG. 6, but for an exemplary case in which the overshoot is from a small cell into the large cell. FIG. 7 shows similar operations to FIG. 6 (in the other direction) to determine if there is an overshooting from small cell 4 including its serving base station 608 into the intended coverage area 603 of large cell 1.

Operations are performed to detect if small cell 4 is overshooting into the intended coverage area of large cell 1. Large cell 1's coverage is put on reserve or turned off, as indicated by X 719. Cell 4's UEs are put into trace mode to determine if PCI=50 is still observed in the intended area of coverage 603 of large cell 1. Data collected by cell 4's UEs is used to map out the actual coverage area of cell 4 (including a possible overshoot into the intended coverage area 603 of cell 1). In the case that coverage from PCI 50 (small cell 4 with its serving base station 608) is found by the fourth cell's UEs (while in trace mode) within the intended coverage area 603 of large cell 1, the data is plotted. Area 770 with UEs 722 indicates that UEs from cell 4 have been detected (e.g., via UE trace mode (e.g., UE (location) route tracking) while cell 1 was in reserve or turned off. Area 720 is detected PCI collision area for cell pair: (cell 1, cell 4), which is due to small cell 4 overshooting into large cell 1.

In some embodiments, each of the UEs of the cell which is mapping its coverage area is placed in trace mode. In some other embodiments, only a certain number of UEs (less than the full set of UEs available) in the cell which is mapping its coverage area is placed into trace mode.

In some embodiments, umbrella coverage of MNO exists (e.g., back-up network coverage), and it is possible to put cells on reserve mode or turn them off with limited impact to users. For example, the wireless communications network including (cell 1 serving base station 602, cell 2 serving base station 604, cell 3 serving base station 606, cell 4 serving base station 608, cell 5 serving base station 610, cell 6 serving base station 612) corresponds to a first network (e.g., a MVNO) which overlaps with a MNO, and a UE operating on a cell of the first network which is put on reserve mode or tuned off may switch to using the back-up MNO network, while the cell of the first network remains in reserve mode or off.

Figure 8:
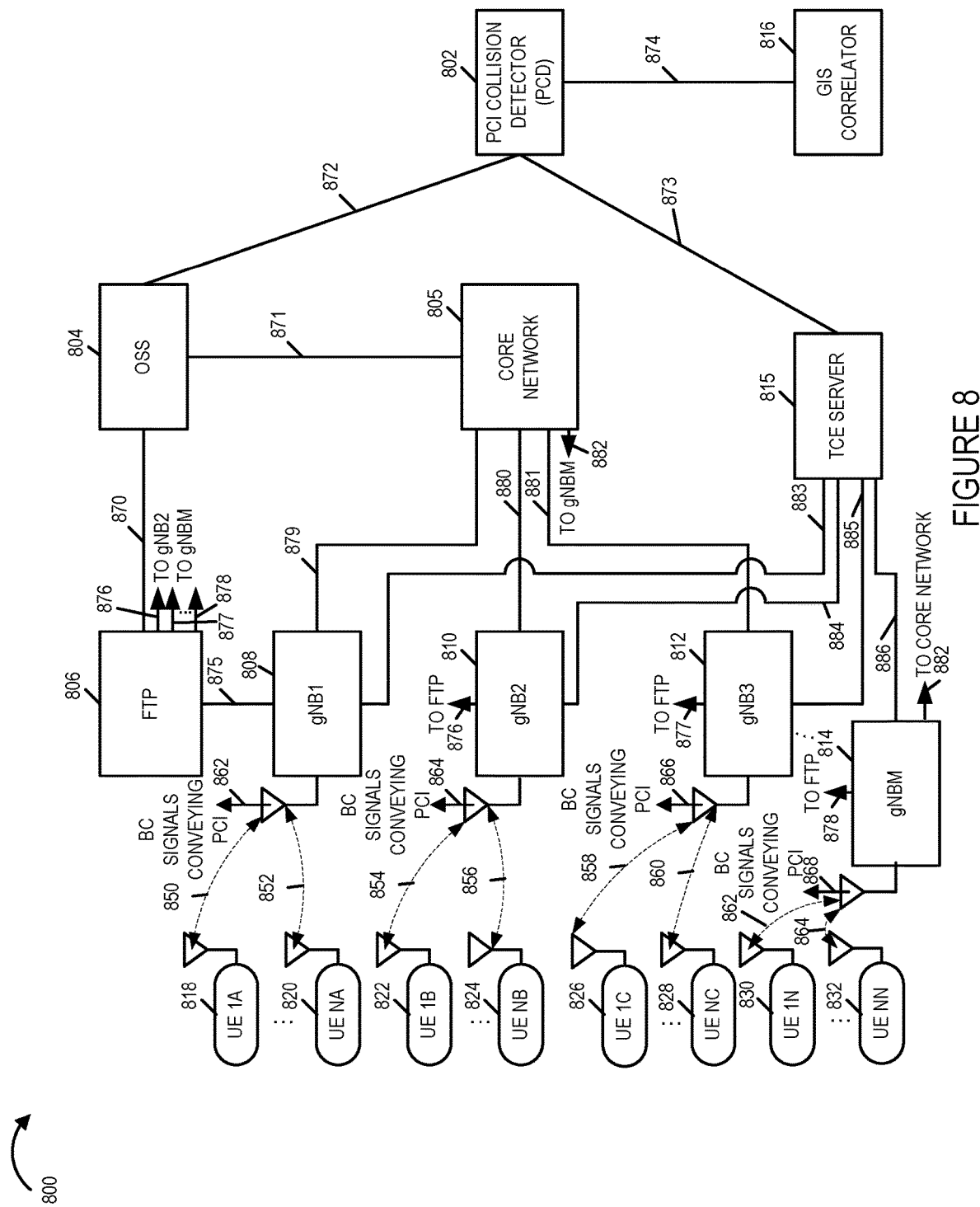
FIG. 8 is a drawing of an exemplary communications system in accordance with an exemplary embodiment, said exemplary communications system including a PCI collision detector (PCI) and a GIS correlator used to identify PCI collision pairs in the system and take remediation actions.
Figure 9A:
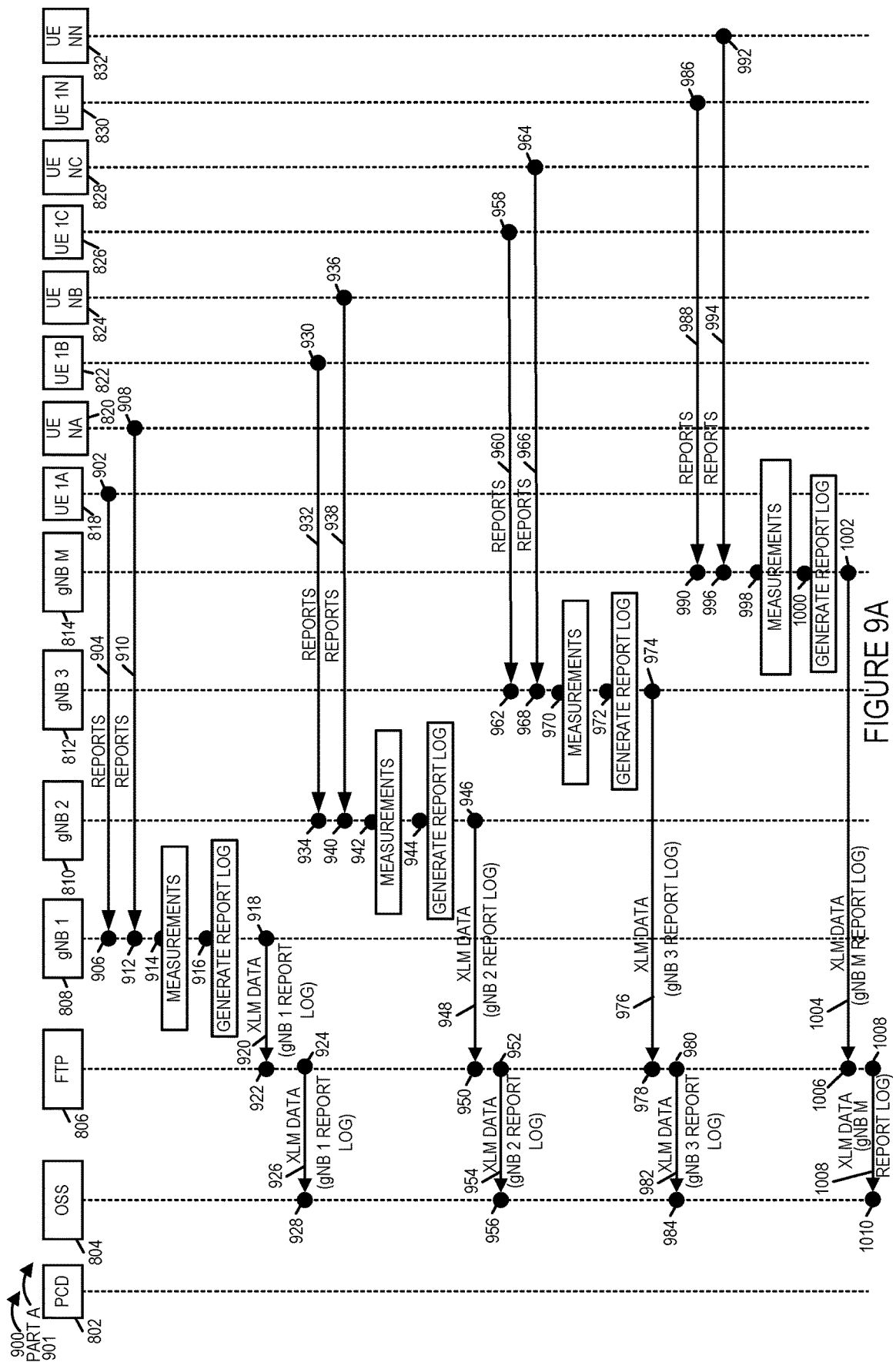
FIG. 9A is a first part of a signaling diagram of an exemplary method of operating a communication system in accordance with an exemplary embodiment.
Figure 9B:
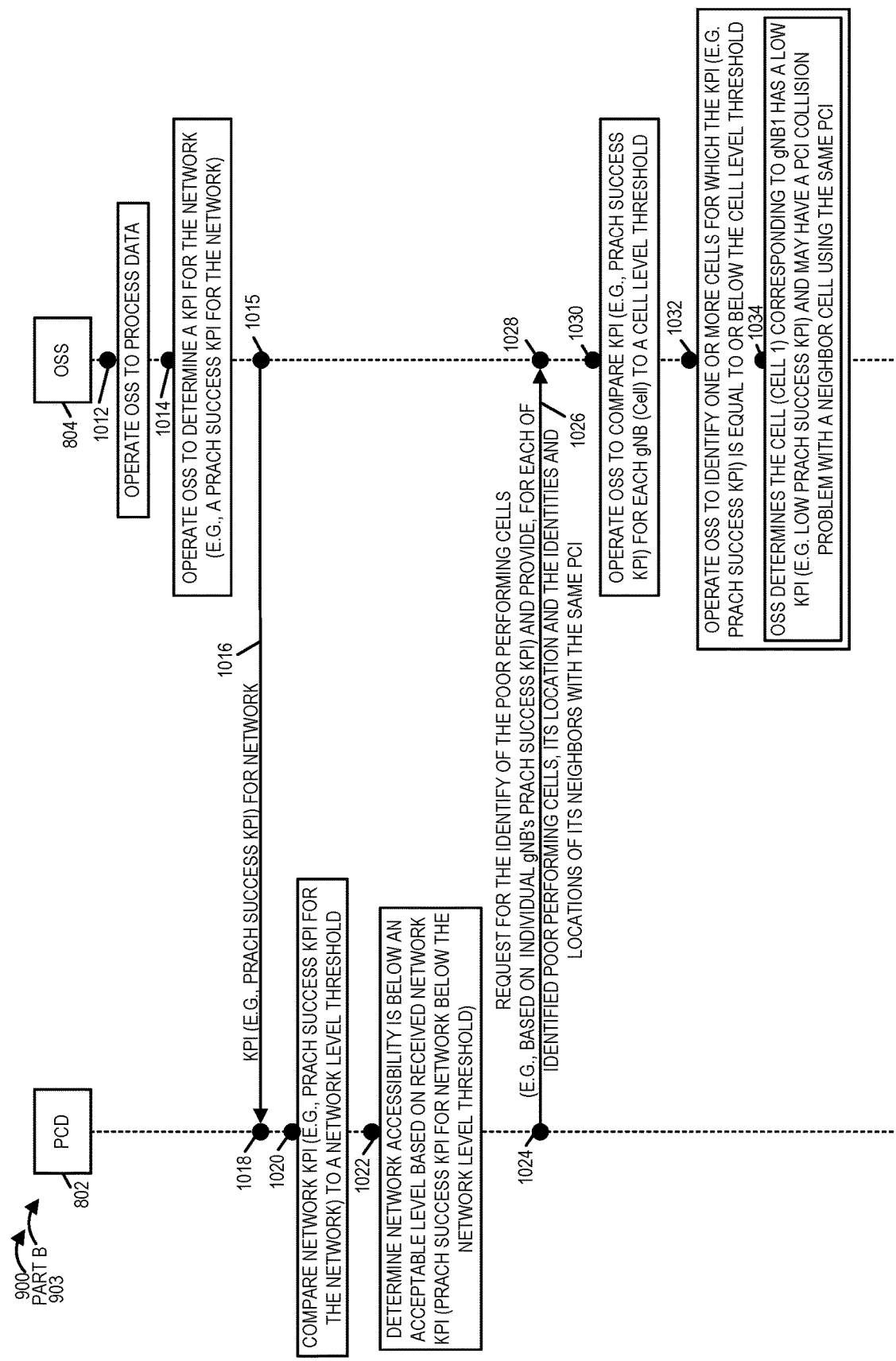
FIG. 9B is a second part of a signaling diagram of an exemplary method of operating a communication system in accordance with an exemplary embodiment.
Figure 9C:
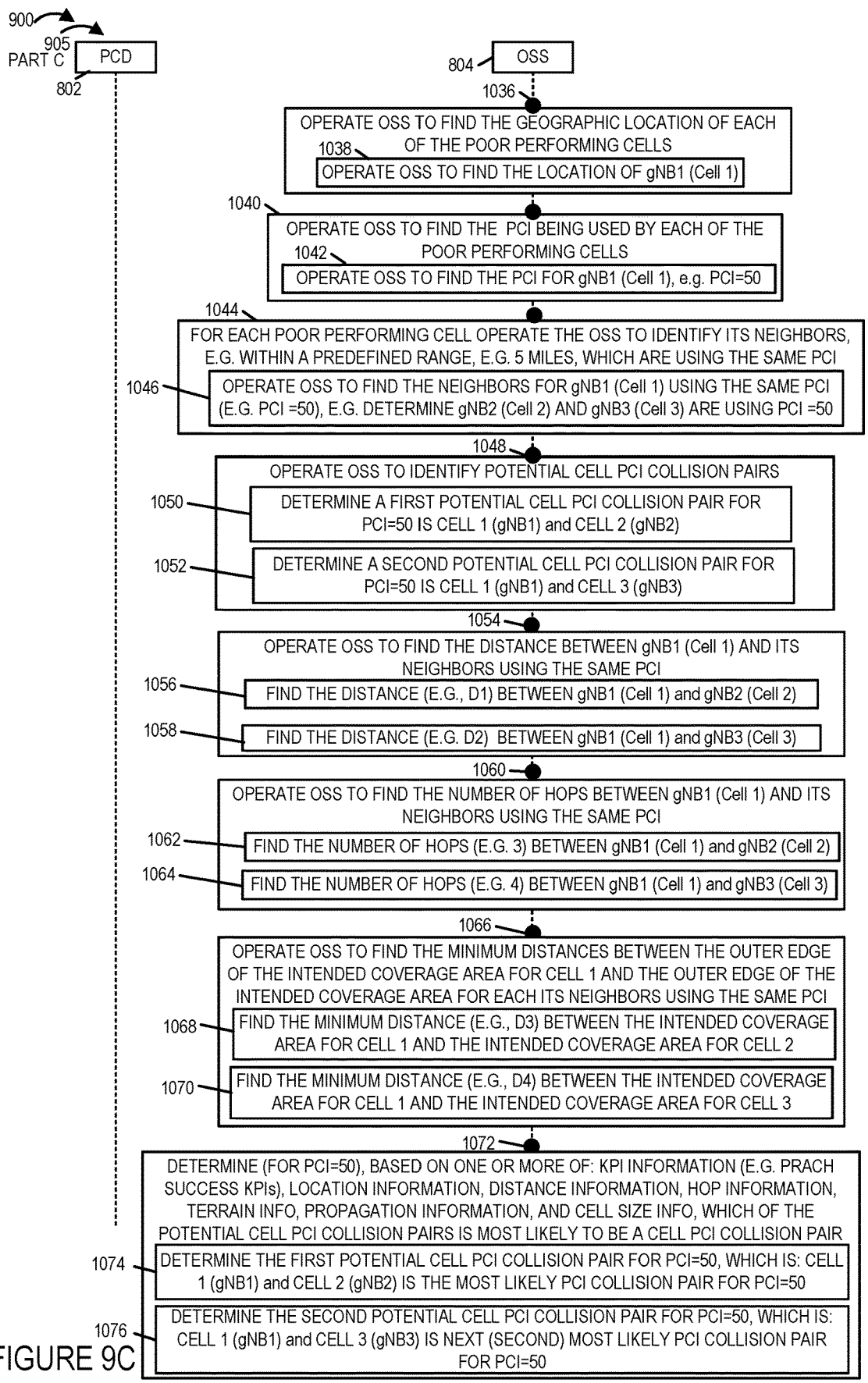
FIG. 9C is a third part of a signaling diagram of an exemplary method of operating a communication system in accordance with an exemplary embodiment.
Figure 9D:
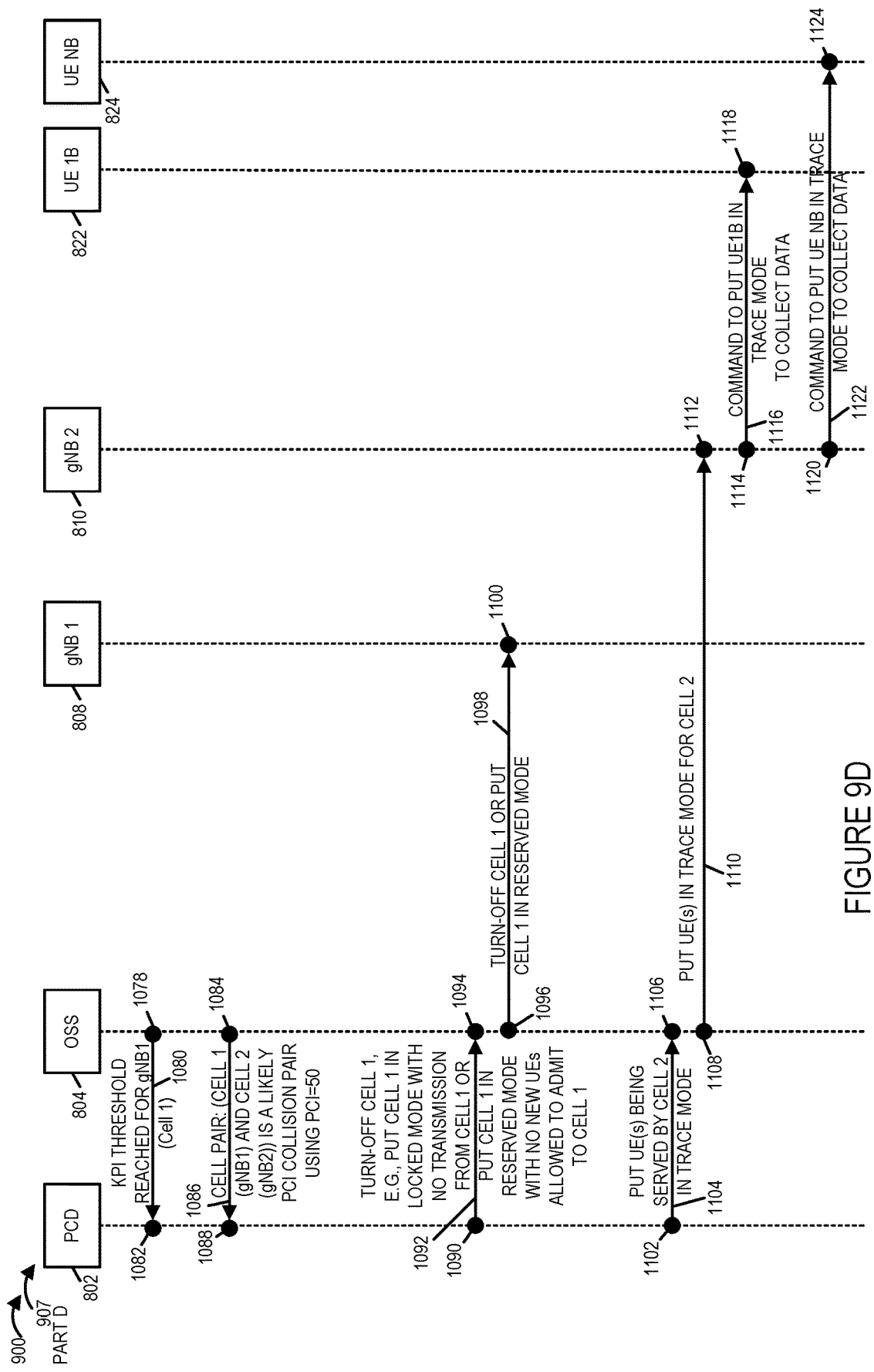
FIG. 9D is a fourth part of a signaling diagram of an exemplary method of operating a communication system in accordance with an exemplary embodiment.
Figure 9E:
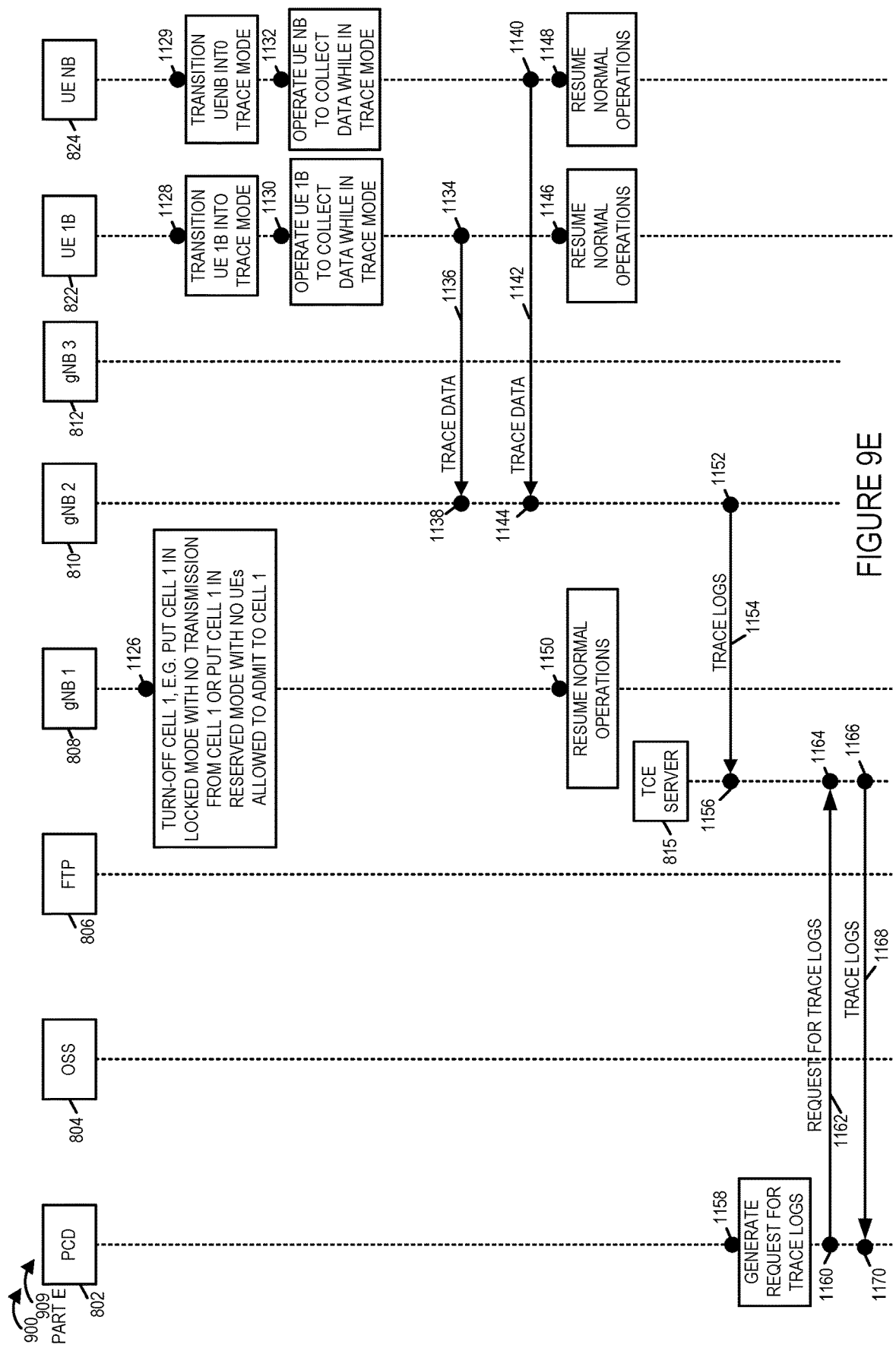
FIG. 9E is a fifth part of a signaling diagram of an exemplary method of operating a communication system in accordance with an exemplary embodiment.
Figure 9F:
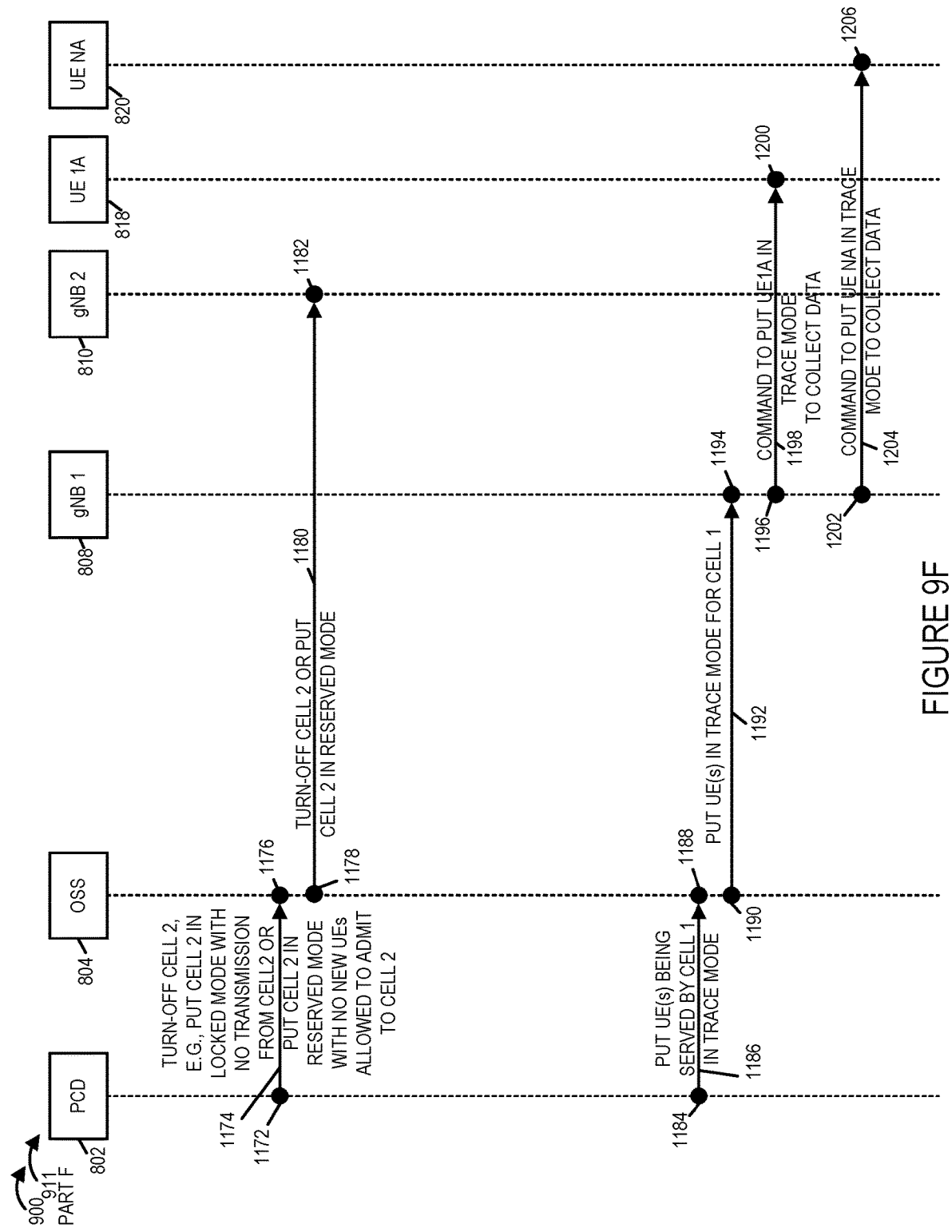
FIG. 9F is a sixth part of a signaling diagram of an exemplary method of operating a communication system in accordance with an exemplary embodiment.
Figure 9G:
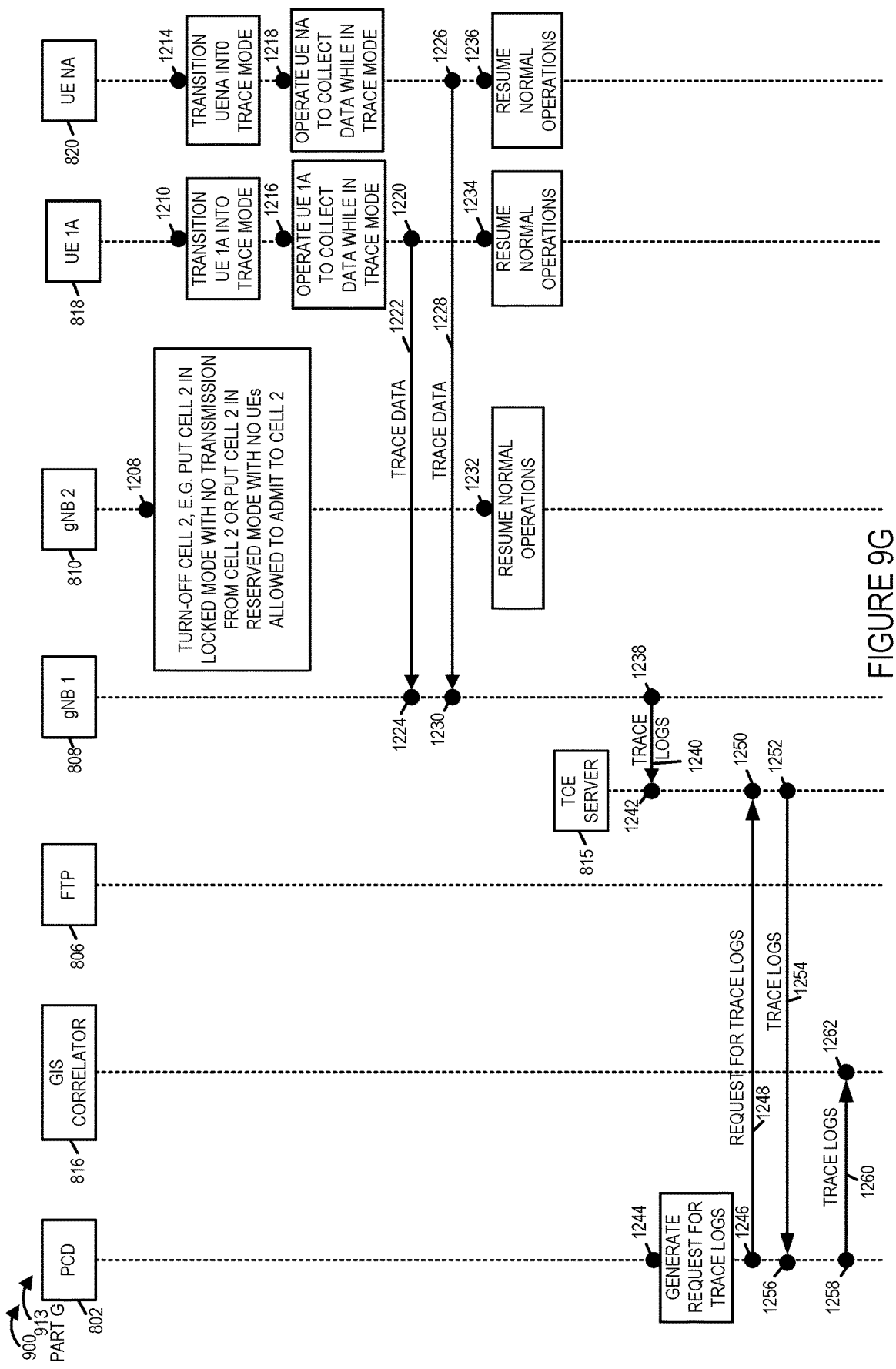
FIG. 9G is a seventh part of a signaling diagram of an exemplary method of operating a communication system in accordance with an exemplary embodiment.
Figure 9H:
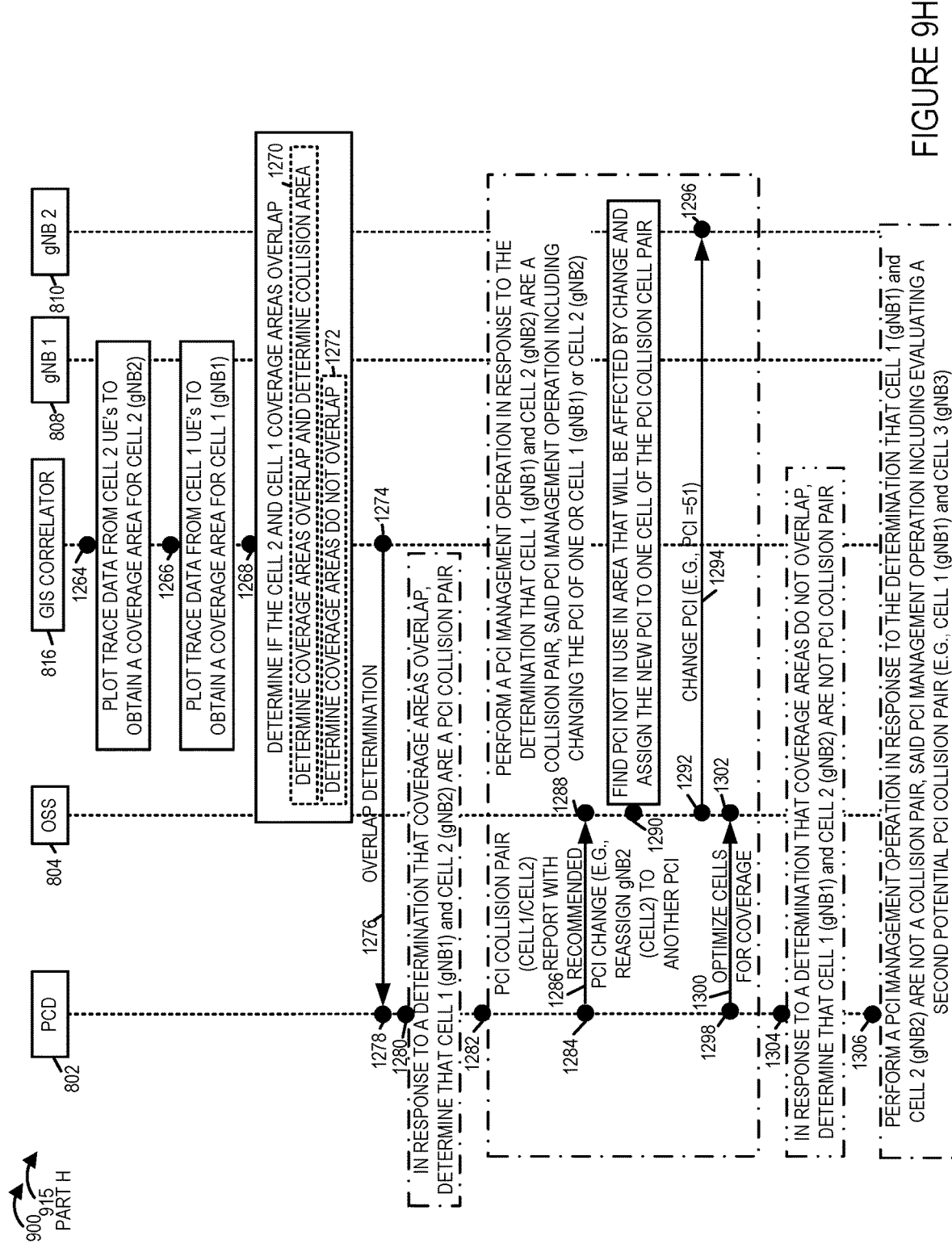
FIG. 9H is an eighth part of a signaling diagram of an exemplary method of operating a communication system in accordance with an exemplary embodiment.
Figure 9I:
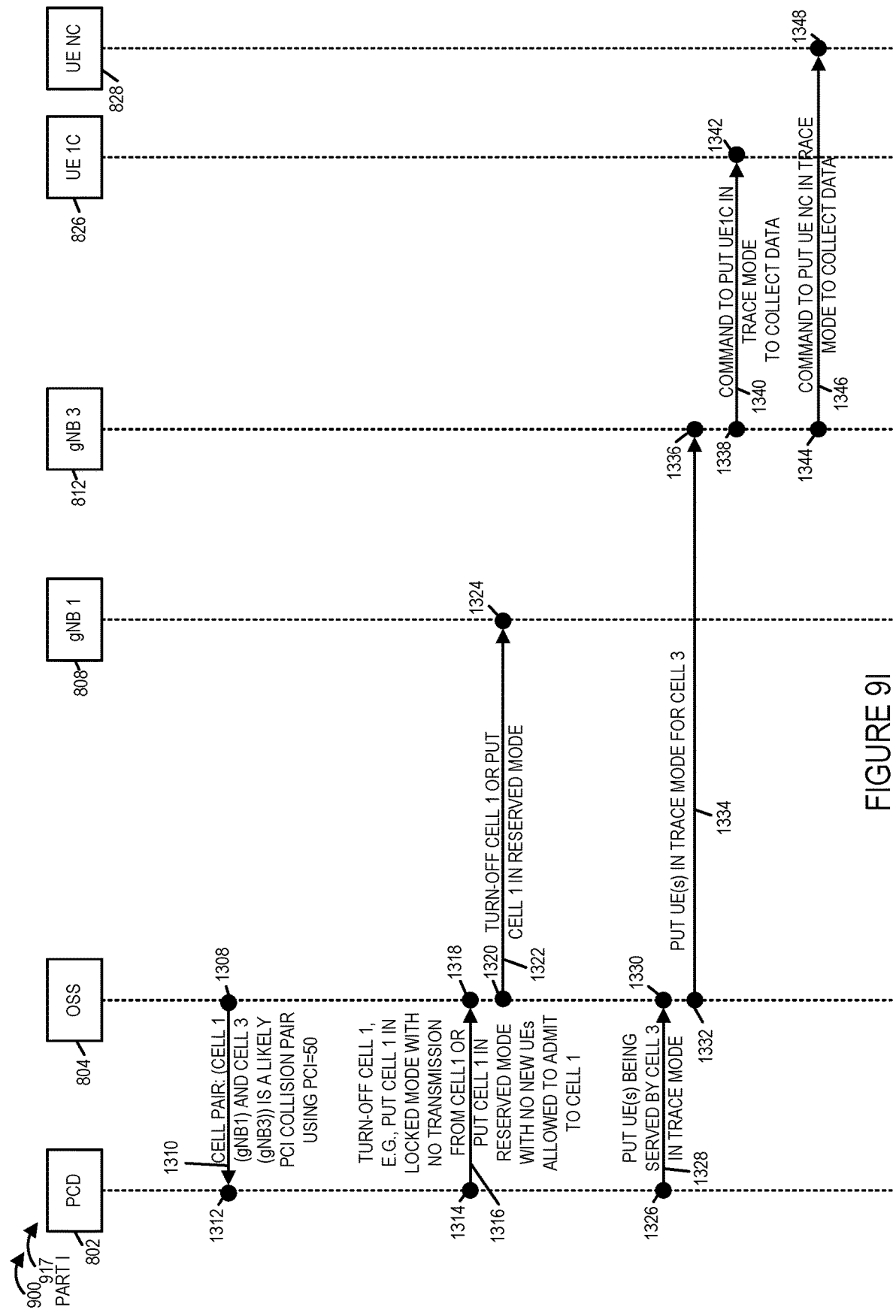
FIG. 9I is a ninth part of a signaling diagram of an exemplary method of operating a communication system in accordance with an exemplary embodiment.
Figure 9J:
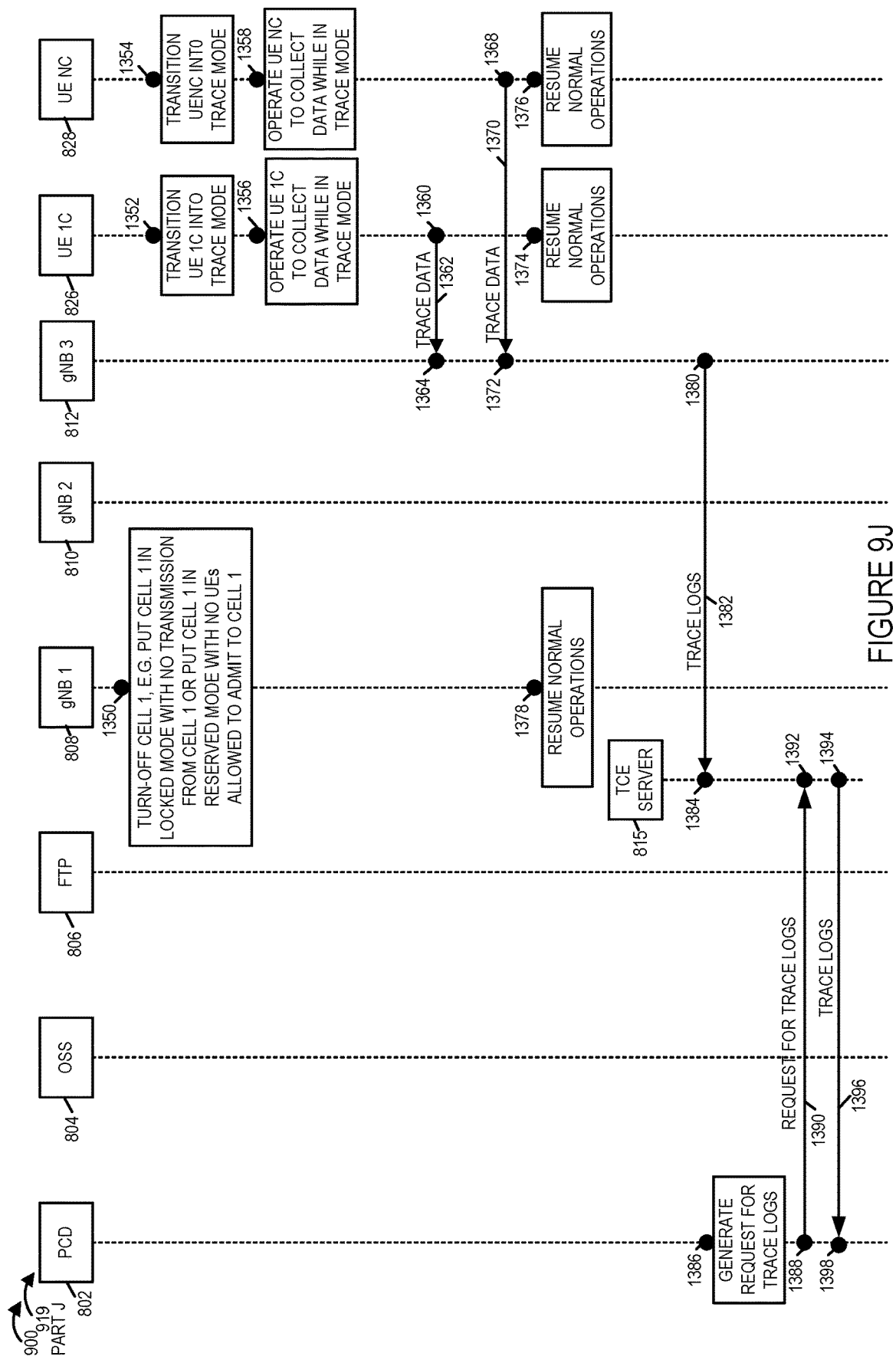
FIG. 9J is a tenth part of a signaling diagram of an exemplary method of operating a communication system in accordance with an exemplary embodiment.
Figure 9K:
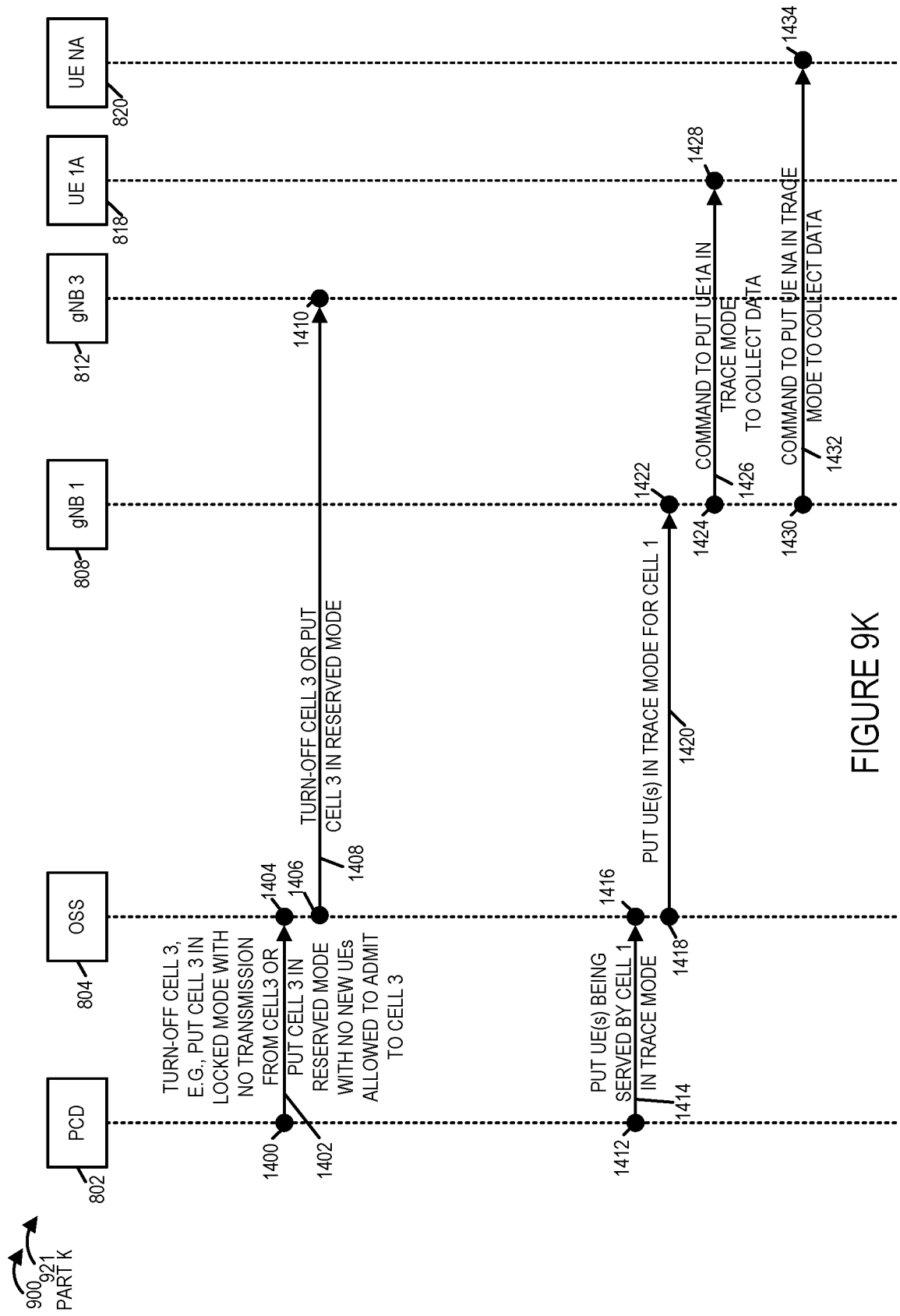
FIG. 9K is an eleventh part of a signaling diagram of an exemplary method of operating a communication system in accordance with an exemplary embodiment.
Figure 9L:
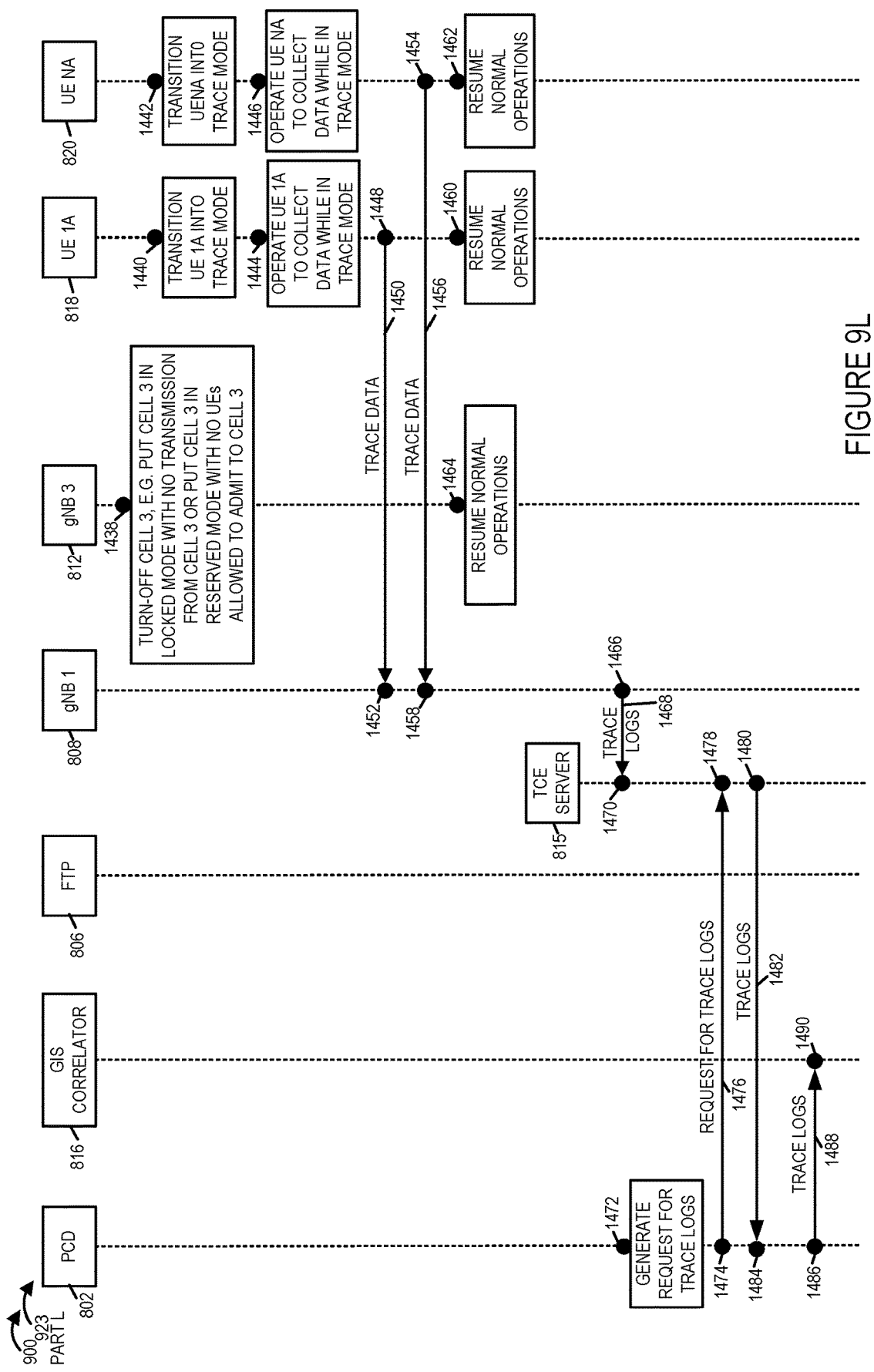
FIG. 9L is a twelfth part of a signaling diagram of an exemplary method of operating a communication system in accordance with an exemplary embodiment.
Figure 9M:
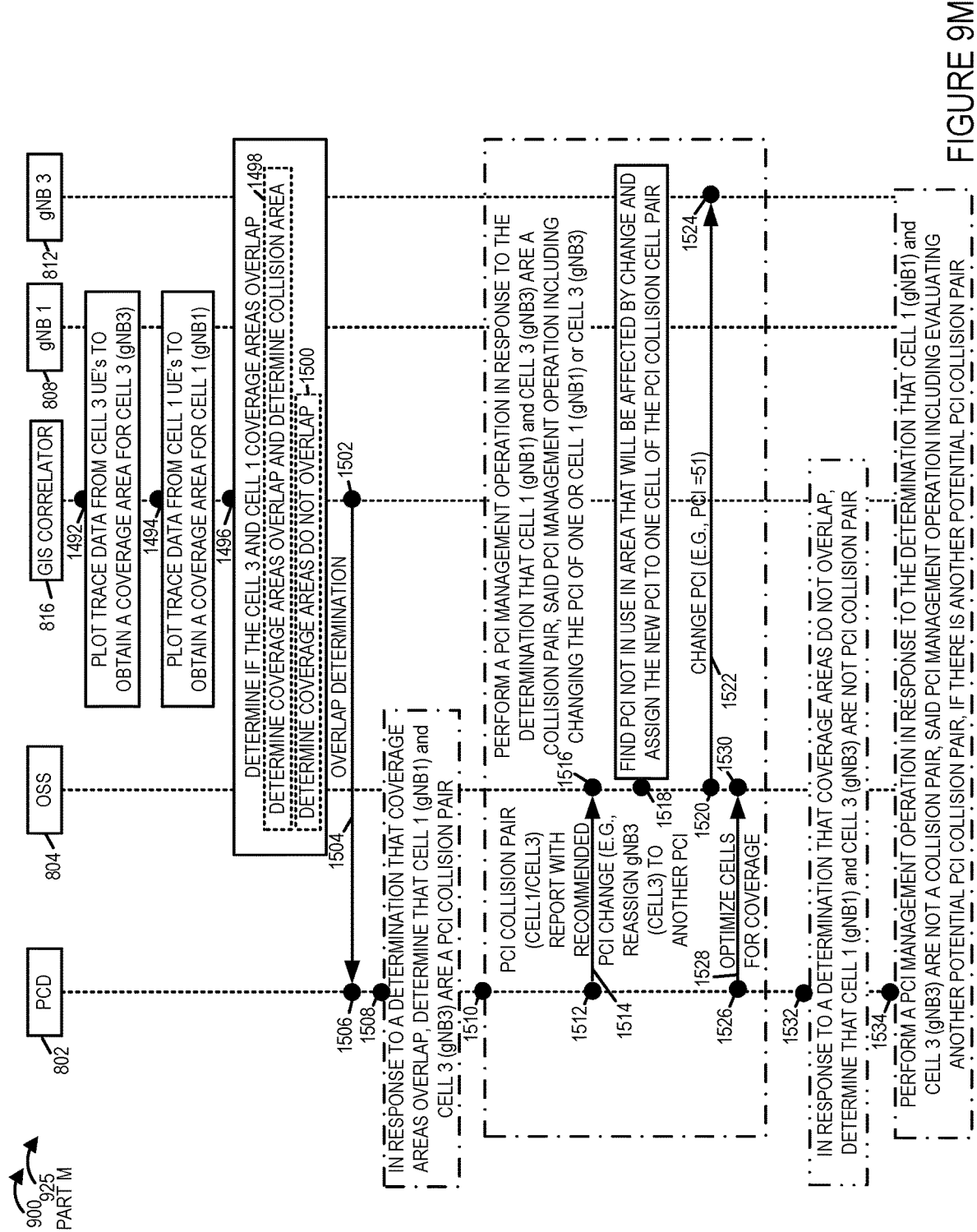
FIG. 9M is a thirteenth part of a signaling diagram of an exemplary method of operating a communication system in accordance with an exemplary embodiment.

FIG. 8 is a drawing of an exemplary communications system 800 in accordance with an exemplary embodiment. Exemplary communications system 800 includes a Physical Cell ID (PCI) collision detector (PCD) 802, an Operations Support Systems (OSS) 804, a core network 805, a File Transfer Protocol (FTP) server 806 and a plurality of base stations (gNB1 808, gNB2 810, gNB3 812, . . . , gNBM 814), a Trace Collection Entity (TCE) server 815, and a Geographic Information System (GIS) correlator 816 coupled together as shown. Exemplary communications system 800 further includes a plurality of user equipments (UEs) (UE1A 818, . . . , UENA 820, UE1B 822, . . . , UENB 824, UE1C 826, . . . , UENC 828, UE1N 830, . . . , UENN 832. At least some of the UEs are mobile wireless communications devices which may move throughout the communications system and be attached to different base stations at different times. The set of base stations (gNB1 808, gNB2 810, gNB3 812 . . . , gNBM 814) are part of a first wireless communications network. Core network 805, e.g., a 5G core network, includes entities such as, e.g., AUSF 218, UDM 222, AMF 216, SMF 222, PCF 226, AF 228, and UPF 224 as shown in FIG. 2. The 5G core network 805 is coupled to a DN, e.g., DN 230 shown in FIG. 2.

FTP server 806 is coupled to OSS 804 via communications link 870. OSS 804 is coupled to core network 805 via communications link 871. OSS 804 is coupled tp PCD 802 via communications link 872. PCD 802 is coupled to GIS correlator 816 via communications link 874. FTP server 806 is coupled to gNB (gNB1 808, gNB2 810, gNB3 812, . . . , gNBM 814) via communications links (875, 876, 877, . . . , 878), respectively. The core network 805 is coupled to the gNBs (gNB1 808, gNB2 810, gNB3 812, . . . , gNBM 814) via communications links (879, 880, 881, . . . , 882), respectively. The TCE server 814 is coupled to the gNBs (gNB1 808, gNB2 810, gNB3 812, . . . , gNBM 814) via communications links (883, 884, 885, . . . , 886), respectively. The TCE server 815 is coupled to the PCD 802 via communications link 873.

UE1A 818 and UENA 820 are coupled to gNB1 808 via wireless communications links (850, 852), respectively. UE1B 822 and UENB 824 are coupled to gNB2 810 via wireless communications links (854, 856), respectively. UE1C 826 and UENC 828 are coupled to gNB3 812 via wireless communications links (858, 860), respectively. UE1N 830 and UENN 832 are coupled to gNBM 814 via wireless communications links (862, 864), respectively.

Each base station (gNB1 808, gNB2 810, gNB3 812 . . . , gNBM 814) transmits broadcast signals conveying a PCI (862, 864, 866, . . . , 868), respectively. A PCI value may be, and sometimes is reused in the network. Therefore, two base stations may, and sometimes do, use and broadcast the same PCI value. If the two base stations are not far enough apart PCI collision or PCI confusion may occur for a UE, attempting to connect to the network.

Physical Cell ID (PCI) collision detector (PCD) 802 implements a new function which interacts with various network components directly and indirectly. The TCE set 815 contain the logs of UE(s) in trace route mode. These trace routes will be processed by the PCD 802 with the help of GIS correlator 816 which will help in determining the overshooting coverage areas. The GIS correlator 816 also has the expected cell coverage, i.e., planned cell coverage of cells. This helps in determining which cell(s) is overshooting beyond its intended cell coverage.

FIG. 9, comprising the combination of FIG. 9A, FIG. 9B, FIG. 9C, FIG. 9D, FIG. 9E, FIG. 9F, FIG. 9G, FIG. 9H, FIG. 9I, FIG. 9J, FIG. 9J, FIG. 9L and FIG. 9M, is a signaling diagram 900 comprising Part A 901, Part B 903, Part C 905, Part D 907, Part E 909, Part F 911, Part G 913, Part H 915, Part I 917, Part J 919, Part K 921, Part L 923 and Part M 925, of an exemplary method of operating a communication system in accordance with an exemplary embodiment. The exemplary communications system implementing the method of signaling diagram 900 is, e.g., communications system 800 of FIG. 8 including PCD 802, OSS 804, FTP 806, gNB1 808, gNB2 810, gNB3 812, gNBM 814, UE 1A 818, UE1N 820, UE1B 822, UENB 824, UE1C 826, UENC 828, UE1N 830, UENN 832, TCE server 815, and GIS correlator 816.

In step 902 UE1A 818 generates and transmits reports 904, e.g., reports including measurement and feedback information, to gNB1 808, which is serving UE1A 818. In step 906, gNB1 808 receives the reports 904 and recovers the communicated information. In step 908 UENA 820 generates and transmits reports 910, e.g., reports including measurement and feedback information, to gNB1 808, which is serving UENA 820. In step 912, gNB1 808 receives the reports 910 and recovers the communicated information. In step 914 gNB1 808 performs measurements of received signals including reference signals from UEs (UE1A 818, UENA 820). In step 916 gNB1 808 generates a report log, said report log including information based on information received from UEs and/or measurement information, said report log including key performance information and/or information used to derive key performance information. In step 918 gNB1 808 transmits XLM (extensible markup language) data 910 conveying the generated gNB1 report log to FTP (file transfer protocol) server 806. In step 920 FTP server 806 receives the XLM data 920 and stores gNB1 report log. In step 924 the FTP server 806 generates and sends XLM data 926 conveying the gNB1 report log to the OSS 804. In step 928 OSS 804 receives the XLM data 926, recovers the communications gNB1 report log and stores the gNB1 report log.

In step 930 UE1A 822 generates and transmits reports 932, e.g., reports including measurement and feedback information, to gNB2 810, which is serving UE1B 822. In step 934, gNB2 810 receives the reports 932 and recovers the communicated information. In step 936 UENB 824 generates and transmits reports 938, e.g., reports including measurement and feedback information, to gNB2 810, which is serving UENB 824. In step 940, gNB2 810 receives the reports 938 and recovers the communicated information. In step 942 gNB2 810 performs measurements of received signals including reference signals from UEs (UE1B 822, UENB 824). In step 946 gNB2 810 generates a report log, said report log including information based on information received from UEs and/or measurement information, said report log including key performance information and/or information used to derive key performance information. In step 946 gNB2 810 transmits XLM (extensible markup language) data 948 conveying the generated gNB2 report log to FTP (file transfer protocol) server 806. In step 950 FTP server 806 receives the XLM data 948 and stores gNB2 report log. In step 952 the FTP server 806 generates and sends XLM data 954 conveying the gNB2 report log to the OSS 804. In step 956 OSS 804 receives the XLM data 954, recovers the communications gNB2 report log and stores the gNB2 report log.

In step 958 UE1C 826 generates and transmits reports 960, e.g., reports including measurement and feedback information, to gNB3 812, which is serving UE1C 826. In step 962, gNB3 812 receives the reports 960 and recovers the communicated information. In step 964 UENC 828 generates and transmits reports 966, e.g., reports including measurement and feedback information, to gNB3 812, which is serving UENC 828. In step 968, gNB3 812 receives the reports 966 and recovers the communicated information. In step 970 gNB3 812 performs measurements of received signals including reference signals from UEs (UE1C 826, UENC 828). In step 972 gNB3 812 generates a report log, said report log including information based on information received from UEs and/or measurement information, said report log including key performance information and/or information used to derive key performance information. In step 974 gNB3 812 transmits XLM (extensible markup language) data 976 conveying the generated gNB3 report log to FTP (file transfer protocol) server 806. In step 978 FTP server 806 receives the XLM data 976 and stores gNB3 report log. In step 980 the FTP server 806 generates and sends XLM data 982 conveying the gNB3 report log to the OSS 804. In step 984 OSS 804 receives the XLM data 982, recovers the communications gNB3 report log and stores the gNB3 report log.

In step 986 UE1N 830 generates and transmits reports 988, e.g., reports including measurement and feedback information, to gNBM 814, which is serving UE1N 830. In step 990, gNBM 814 receives the reports 988 and recovers the communicated information. In step 992 UENN 832 generates and transmits reports 994, e.g., reports including measurement and feedback information, to gNBM 814, which is serving UENN 832. In step 996, gNBM 814 receives the reports 994 and recovers the communicated information. In step 998 gNBM 814 performs measurements of received signals including reference signals from UEs (UE1N 830, UENN 832). In step 1000 gNBM 814 generates a report log, said report log including information based on information received from UEs and/or measurement information, said report log including key performance information and/or information used to derive key performance information. In step 1002 gNBM 814 transmits XLM (extensible markup language) data 1004 conveying the generated gNBM report log to FTP (file transfer protocol) server 806. In step 1006 FTP server 806 receives the XLM data 1004 and stores gNBM report log. In step 1006 the FTP server 806 generates and sends XLM data 1008 conveying the gNBM report log to the OSS 804. In step 1010 OSS 804 receives the XLM data 1008, recovers the communications gNBM report log and stores the gNBM report log.

In step 1012 the OSS 804 processes the received data (report logs from each of the base stations (gNB1 808, gNB2 810, gNB3 812, ..., gNBM 814)), said processing including generating network performance metrics. In step 1014, the OSS 1014 determines one or more key performance indicators (KPIs) for the network, e.g., a PRACH (Physical Random Access Channel) success KPI for the network. In step 1015, the OSS 804 generates and sends signal 1016, which includes a KPI for the network, e.g., a PRACH success KPI for the network, to PCD 102. In step 1018 the PCD receives signal 1016 and recovers the communications network KPI, e.g., the PRACH success KPI for the network.

In step 1020 the PCD 802 compares the network KPI (e.g., PRACH success KPI for the network) to a network level threshold. In step 1022 the PCD determines that network accessibility is below an acceptable level based on the received network KPI (e.g., PRACH success KPI for the network) being below the network level threshold.

In step 1024 PCD 802 generates and sends a request 1026 for the identity of the poor performing cells (e.g., based on individual gNBs PRACH success KPI) and requests that the OSS provide, for each of the identified poor performing cell, its location and the identities and locations of its neighbors with the same physical cell identifier (PCI). IN step 1028 the OSS 804 receives the request 1026. In step 1030 the OSS 804 compares the KPI (e.g., PRACH success KPI) for each gNB (cell) to a cell level threshold. In step 1032 the OSS 804 identifies one or more cells for which the KPI (e.g., PRACH success KPI is equal to or below the cell level threshold. Step 1032 includes step 1034, in which OSS 804 determines that the cell (e.g., cell 1) corresponding to gNB1 808 has a low KPI (e.g., PRACH success KPI) and may have a PCI collision problem with a neighbor cell using the same PCI.

In step 1036, the OSS 804 finds the geographic location of each of the identified poor performing cells. Step 1036 includes step 1038 in which the OSS 804 finds the location of gNB1 808 (Cell 1).

In step 1040 the OSS 804 finds the PCI being used by each of the poor performing cells. Step 1040 includes step 1042 in which the OSS 804 finds the PCI for gNB1 808 (Cell 1), e.g., the OSS finds that gNB1 808 (Cell 1) is using PCI=50.

In step 1044 the OSS 804 identifies, for each of the identified poor performing cells, its neighbors, e.g., to within a predefined range, e.g., 5 miles, which are using the same PCI. Step 1044 includes step 1046 in which the OSS 804 finds the neighbors for gNB1 808 (Cell 1) using the same PCI (e.g., PCI=50), e.g., the OSS 804 determines that gNB2 810 (Cell 2) and gNB3 812 (Cell 3) are using PCI=50.

In step 1048 the OSS 804 identifies potential PCI collision pairs. Step 1048 includes steps 1050 and 1052. In step 1050 the OSS 804 determines a first potential PCI collision pair for PCI=50 is cell 1 (gNB1 808) and cell 2 (gNB2 810). In step 1052 the OSS 804 determines a second potential PCI collision pair for PCI=50 is cell 1 (gNB1 808) and cell 3 (gNB3 812).

In step 1054 the OSS 804 finds the distance between gNB1 808 (Cell 1) and its neighbors using the same PCI. Step 1054 includes steps 1056 and 1058. In step 1056 the OSS 804 finds the distance (e.g., D1) between gNB1 808 (cell 1) and gNB2 810 (Cell 2). In step 1058 the OSS 804 finds the distance (e.g., D2) between gNB1 808 (cell 1) and gNB3 812 (Cell 3).

In step 1060 the OSS 804 finds the number of hops between gNB1 808 (Cell 1) and its neighbors using the same PCI. Step 1060 includes steps 1062 and 1064. In step 1062 the OSS 804 finds the number of hops (e.g., 3) between gNB1 808 (cell 1) and gNB2 810 (Cell 2). In step 1064 the OSS 804 finds the number of hops (e.g., 4) between gNB1 808 (cell 1) and gNB3 813 (Cell 3).

In step 1066 the OSS 804 finds the minimum distances between the outer edge of the intended coverage area for cell 1 and the outer edge of the intended coverage area for each of its neighbors using the same PCI. Step 1066 includes steps 1068 and 1070. In step 1068 the OSS 804 finds the minimum distance (e.g., D3) between the intended coverage area for cell 1 and the intended coverage area for cell 2. In step 1070 the OSS 804 finds the minimum distance (e.g., D4) between the intended coverage area for cell 1 and the intended coverage area for cell 3.

In step 1072 the OSS 804 determines (for PCI=50), based on one or more or all of: KPI information (e.g., PRACH success KPIs), location information, distance information, hop information, terrain information, propagation information, and cell size information, which of the potential PCI collision pairs is most likely to be a cell PCI collision pair, e.g., for a particular PCI the OSS 804 ranks the identified potential PCI collision pair from most likely to least likely. Step 1072 includes steps 1074 and 1076. In step 1074 the OSS 804 determines that the first potential PCI collision pair for PCI=50, which is the pair of: cell 1 (gNB1 808) and cell 2 (gNB2 810) is the most likely PCI collision pair for PCI=50. In step 1076 the OSS 804 determines that the second potential PCI collision pair for PCI=50, which is the pair of: cell 1 (gNB1 808) and cell 3 (gNB3 812) is the next (second) most likely PCI collision pair for PCI=50.

In step 1078 the OSS 804 generates and sends message 1080, indicating that the KPI threshold has been reached for gNB1 808 (cell 1), to PCD 802. Thus message 1080 indicates that the KPI (e.g., PRACH success KPI) for gNB1 808 (cell 1) is equal to or less than the KPI threshold, indicating cell 1 (gNB1 808) is a poor performing cell, and may be part of PCI collision pair. In some embodiments, gNB1 808 (cell 1) has the lowest KPI (e.g., PRACH success KPI) of the base stations (cells) with PCI=50, e.g., cell 1 808 is the worst performing cell with PCI=50. In step 1082 PCD 802 receives message 1080 and recovers the communicated information, identifying cell 1 (gNB1 808) as a poor performing cell and a likely member of a PCI collision pair.

In step 1084 the OSS 804 generates and sends message 1086 to PCD 802, said message 1086 identifying cell pair (cell 1 (gNB1 808) and cell 2 (gNB2 810) as a likely (e.g., the most likely) PCI collision pair using PCI=50. In step 1088 PCD 802 receives message 1086 and recovers the communicated information.

In step 1090 PCD 802 generates and sends message 1092 to OSS 804, said message 1092 commanding gNB1 808 to: i) turn-off cell 1, e.g., put cell 1 in locked mode with no transmission from cell 1, or ii) put cell 1 in reserved mode with not new UEs allowed to admit to cell 1. In step 1094, the OSS 804 receives message 1092 and recovers the communicated information. In step 1096 OSS 804 generates and sends message 1098 to gNB1 808. Message 1098, which command gNB1 808 to turn-off cell 1 or put cell 1 in reserved mode, is a forwarded version of message 1092. In step 1100 gNB 1 808 receives message 1098 and recovers the communicated information.

In step 1102 PCD 802 generates and sends message 1104 to OSS 804, said message 1104 commanding gNB2 810 to put UEs (some or all of the UEs) being served by cell 2 (gNB2 810) in trace mode. In step 1106, the OSS 804 receives message 1104 and recovers the communicated information. In step 1108 OSS 804 generates and sends message 1110 to gNB2 810. Message 1110, which commands gNB2 810 to put UEs being served by cell 2 (gNB2 810) in trace mode, is a forwarded version of message 1104. In step 1112 gNB2 810 receives message 1110 and recovers the communicated information. In response to received message 1110, in step 1114 gNB2 810 generates and sends (transmits) command message 1116 to UE1B 822, instructing UE 1B 822 to transition into trace mode and to collect trace data. In step 1118 UE1B 822 receives command message 1116 and recovers the communicated information. In response to received message 1110, in step 1120 gNB2 810 generates and sends (transmits) command message 1120 to UENB 824, instructing UENB 824 to transition into trace mode and to collect trace data. In step 1124 UENB 824 receives command message 1122 and recovers the communicated information.

In response to receiving message 1098, in step 1100, in step 1126, gNB1 808 turns-off cell 1, e.g., puts cell 1 in locked mode with no transmission from cell 1, or puts cell 1 in reserved mode with no UEs allowed to admit to cell 1. In response to receiving message 1116, in step 1118, in step 1128 UE1B 822 transitions into trace mode and in step 1130 UE1B 822 is operated to collect data while in trace mode. In response to receiving message 1122, in step 1124, in step 1129 UENB 824 transitions into trace mode and in step 1132 UENB 822 is operated to collect data while in trace mode.

In step 1134, UE1B 822 sends trace data 1136 to gNB2 810. In step 1138 gNB2 810 receives and stores the trace data from UE1B 822, said trace data including location data, e.g., position information, e.g., position fixes, of UE1B 822 while in trace mode.

In step 1140, UENB 824 sends trace data 1142 to gNB2 810. In step 1144 gNB2 810 receives and stores the trace data from UENB 824, said trace data including location data, e.g., position information, e.g., position fixes, of UENB 824 while in trace mode.

After a predetermined time interval, e.g., specified in messages 1098, 1116, and 1122, operation proceeds to steps 1150, 1146, and 1148. In step 1150 gNB1 808 resumes normal operations, e.g., with gNB being turned on (allowing transmissions from cell 1) or being removed from reserved mode (allowing UEs to admit to cell 1). In step 1146, UE 1B 822 resumes normal operations, e.g., with UE1B 822 transitioning out of trace mode and no longer collecting trace data. In step 1148, UE NB 824 resumes normal operations, e.g., with UENB 824 transitioning out of trace mode and no longer collecting trace data.

In step 1152 gNB2 810 sends trace logs 1154, which includes an aggregation of trace data from a plurality of its UEs which were commanded in trace mode including trace data 1136 from UE1B 822 and trace data 1142 from UENB 824, to TCE server 815. In step 1156 TCE server 815 receives the trace logs 1154 and stores the trace logs, to be available to the PCD 802, when requested. In step 1158 the PCD 802 generates a request for trace logs 1162. In step 1160 the PCD 802 sends the request for trace logs 1162 to the TCE server 815, which receives the request in step 1164. In response to the received request 1162, in step 1166, the TCE server 815 generates and sends trace logs 1168 (which is a copy of the received trace logs 1154 from gNB2 810), to PCD 802. In step 1170 PCD 802 receives the trace logs 1168 and recovers the communicated information.

In step 1172 PCD 802 generates and sends message 1174 to OSS 804, said message 1174 commanding gNB2 810 to: i) turn-off cell 2, e.g., put cell 2 in locked mode with no transmission from cell 2, or ii) put cell 2 in reserved mode with not new UEs allowed to admit to cell 2. In step 1176, the OSS 804 receives message 1174 and recovers the communicated information. In step 1178 OSS 804 generates and sends message 1180 to gNB2 810. Message 1180, which command gNB2 810 to turn-off cell 2 or put cell 2 in reserved mode, is a forwarded version of message 1174. In step 1182 gNB2 810 receives message 1180 and recovers the communicated information.

In step 1184 PCD 802 generates and sends message 1186 to OSS 804, said message 1186 commanding gNB1 808 to put UEs (some or all of the UEs) being served by cell 1 (gNB1 808) in trace mode. In step 1188, the OSS 804 receives message 1186 and recovers the communicated information. In step 1190 OSS 804 generates and sends message 1192 to gNB1 808. Message 1192, which commands gNB1 808 to put UEs being served by cell 1 (gNB1 808) in trace mode, is a forwarded version of message 1192.

In step 1194 gNB1 808 receives message 1192 and recovers the communicated information. In response to received message 1192, in step 1196 gNB1 808 generates and sends (transmits) command message 1198 to UE1A 818, instructing UE 1A 818 to transition into trace mode and to collect trace data. In step 1200 UE1A 818 receives command message 1198 and recovers the communicated information. In response to received message 1192, in step 1202 gNB1 808 generates and sends (transmits) command message 1204 to UENA 820, instructing UENA 820 to transition into trace mode and to collect trace data. In step 1206 UENA 820 receives command message 1204 and recovers the communicated information.

In response to receiving message 1180, in step 1182, in step 1208, gNB2 810 turns-off cell 2, e.g., puts cell 2 in locked mode with no transmission from cell 2, or puts cell 2 in reserved mode with no UEs allowed to admit to cell 2. In response to receiving message 1198, in step 1200, in step 1210 UE1A 818 transitions into trace mode and in step 1216 UE1A 818 is operated to collect data while in trace mode. In response to receiving message 1204, in step 1206, in step 1214 UENA 820 transitions into trace mode and in step 1218 UENA 820 is operated to collect data while in trace mode.

In step 1220, UE1A 818 sends trace data 1222 to gNB1 808. In step 1224 gNB1 808 receives and stores the trace data from UE1A 818, said trace data including location data, e.g., position information, e.g., position fixes, of UE1A 818 while in trace mode.

In step 1226, UENA 820 sends trace data 1228 to gNB1 808. In step 1230 gNB1 808 receives and stores the trace data from UENA 820, said trace data including location data, e.g., position information, e.g., position fixes, of UENA 820 while in trace mode.

After a predetermined time interval, e.g., specified in messages 1180, 1198, and 1204, operation proceeds to steps 1232, 1234, and 1236. In step 1232 gNB2 810 resumes normal operations, e.g., with gNB2 being turned on (allowing transmissions from cell 2) or being removed from reserved mode (allowing UEs to admit to cell 2). In step 1234, UE 1A 818 resumes normal operations, e.g., with UE1A 818 transitioning out of trace mode and no longer collecting trace data. In step 1236, UE NA 820 resumes normal operations, e.g., with UENA 820 transitioning out of trace mode and no longer collecting trace data.

In step 1238 gNB1 808 sends trace logs 1240, which includes an aggregation of trace data from a plurality of its UEs which were commanded in trace mode including trace data 1222 from UE1A 818 and trace data 1228 from UENA 820, to TCE server 815. In step 1242 TCE server 815 receives the trace logs 1240 and stores the trace logs, to be available to the PCD 802, when requested. In step 1244 the PCD 802 generates a request for trace logs 1248. In step 1250 the PCD 802 sends the request for trace logs 1248 to the TCE server 815, which receives the request in step 1250. In response to the received request 1248, in step 1252, the TCE server 815 generates and sends trace logs 1254 (which is a copy of the received trace logs 1240 from gNB1 810), to PCD 802. In step 1256 PCD 802 receives the trace logs 1254 and recovers the communicated information. In step 1258 the PCD 802 sends trace logs 1260 (which includes trace logs 1168 (sourced from UEs of gNB2 810) and trace logs 1254 (sourced from UE's pf gNB1 808) to GIS correlator 816. In step 1262 GIS correlator 816 receives the trace logs 1260.

In step 1264 the GIS correlator 816 plots trace data from cell 2's UEs to obtain a coverage area for cell 2 (gNB2 810).

In step 1266 the GIS correlator 816 plots trace data from cell 1's UEs to obtain a coverage area for cell 1 (gNB1 810).

In step 1268 the GIS correlator 816 determines if the cell 2 and cell 1 coverage areas overlap. Step 1268 includes step 1270 and 1272, one of which is performed for an iteration of step 1268. In step 1270 the GIS correlator 816 determines that the determined coverage areas for cell 2 and cell 1 overlap and further determines the collision area (PCI collision area), which is the overlap area. In step 1272 the GIS correlator 816 determines that the determined coverage areas for cell 2 and cell 1 do not overlap.

In step 1274, the GIS correlator 816 generates and sends message 1276 to PCD 802, said message 1276 including the overlap determination from step 1268 and further including information identifying the collision area, when the determination is that the cell 2 and cell 1 coverage areas overlap. In step 1278, the PCD receives message 1276 and recovers the communicated information, e.g., the coverage area overlap determination (overlap or no overlap) and information indicating the collision area when the determination is that there is overlap.

PCD 802 performs step 1280 and 1282, in response to a determination that the coverage areas overlap. Alternatively, PCD 802 performs steps 1304 and 1306, in response to a determination that the coverage areas do not overlap.

In step 1280 the PCD 802, in response to a determination that the coverage areas overlap, determines that cell 1 (gNB1 808) and cell 2 (gNB2 810) are a PCI collision pair. Operation proceeds from step 1280 to step 1282. In step 1282, the PCD 802 performs a PCI management operation in response to the determination that cell 1 (gNB1 808) and cell 2 (gNB2 810) are a collision pair, said PCI management operation including changing the PCI of one of cell 1 (gNB1 808) and cell 2 (gNB2 810). In step 1282 PCD 802 generates and sends message 1286 communicating a PCI collision pair (cell 1/cell 2) report with a recommended PCI change (e.g., reassign gNB2 810 (cell 2) to another PCI), to OSS 804. In step 1288 OSS 804 receives message 1286 and recovers the communicated information. In step 1290 OSS 804 finds a PCI (e.g., PCI=51), which is not in use in the area that will be affected by the change and assigns the new (PCI=51) to one of the PCI collision cell pairs. In this example, the OSS 804 follows the recommendation of the PCD 802 and assigns the new PCI (PCI=51) to gNB2 810 (cell 2). In step 1292 OSS 804 generates and sends PCI change message 1294 to gNB2 810, said PCI change message 1294 indicating that gNB2 810 (cell 2) is to change its PCI to the new PCI value indicated in the message, e.g., PCI=51. In step 1296, gNB2 810 receives the PCI change message 1294 and implements the change. In step 1298, the PCD 802 sends a message 1300 to OSS 804 indicating that the OSS 804 is to optimize cell for coverage. In step 1302 the OSS 804 receives message 1300 and implements cell coverage optimization operations, e.g., adjusting parameters corresponding to one or more cells pertaining to maximum transmission power levels.

In step 1304, the PCD 802, in response to a determination that coverage areas do not overlap, determines that cell 1 (gNB1 808) and cell 2 (gNB2 810) are not a PCI collision pair. Operation proceeds from step 1304 to step 1306. In step 1306, the PCD 802 performs a PCI management operation in response to the determination that cell 1 (gNB1 808) and cell 2 (gNB2 810) are not a collision pair, said PCI management operation including evaluating a second potential PCI collision pair (e.g., cell 1 (gNB1 808) and cell 3 (gNB3 812)). Operation proceeds from step 1306 to step 1308.

In step 1308 the OSS 804 generates and sends message 1310 to PCD 802, said message 1310 identifying cell pair (cell 1 (gNB1 808) and cell 3 (gNB3 812) as a likely (e.g., the next most likely) PCI collision pair using PCI=50. In step 1312 PCD 802 receives message 1310 and recovers the communicated information.

In step 1314 PCD 802 generates and sends message 1316 to OSS 804, said message 1316 commanding gNB1 808 to: i) turn-off cell 1, e.g., put cell 1 in locked mode with no transmission from cell 1, or ii) put cell 1 in reserved mode with not new UEs allowed to admit to cell 1. In step 1318, the OSS 804 receives message 1316 and recovers the communicated information. In step 1320 OSS 804 generates and sends message 1322 to gNB1 808. Message 1322, which command gNB1 808 to turn-off cell 1 or put cell 1 in reserved mode, is a forwarded version of message 1316. In step 1324 gNB 1 808 receives message 1322 and recovers the communicated information.

In step 1326 PCD 802 generates and sends message 1328 to OSS 804, said message 1328 commanding gNB3 812 to put UEs (some or all of the UEs) being served by cell 3 (gNB3 812) in trace mode. In step 1330, the OSS 804 receives message 1328 and recovers the communicated information. In step 1332 OSS 804 generates and sends message 1334 to gNB3 812. Message 1334, which commands gNB3 812 to put UEs being served by cell 3 (gNB2 813) in trace mode, is a forwarded version of message 1328. In step 1336 gNB3 812 receives message 1334 and recovers the communicated information. In response to received message 1334, in step 1338 gNB3 812 generates and sends (transmits) command message 1340 to UE1C 826, instructing UE1C 826 to transition into trace mode and to collect trace data. In step 1342 UE1C 826 receives command message 1340 and recovers the communicated information. In response to received message 1334, in step 1344 gNB3 812 generates and sends (transmits) command message 1346 to UENC 828, instructing UENC 828 to transition into trace mode and to collect trace data. In step 1348 UENC 828 receives command message 1346 and recovers the communicated information.

In response to receiving message 1322 in step 1322, in step 1350, gNB1 808 turns-off cell 1, e.g., puts cell 1 in locked mode with no transmission from cell 1, or puts cell 1 in reserved mode with no UEs allowed to admit to cell 1. In response to receiving message 1340 in step 1342, in step 1352 UE1C 826 transitions into trace mode and in step 1356 UE1C 826 is operated to collect data while in trace mode. In response to receiving message 1346 in step 1348, in step 1354 UENC 828 transitions into trace mode and in step 1358 UENC 828 is operated to collect data while in trace mode.

In step 1360, UE1C 826 sends trace data 1362 to gNB3 812. In step 1364 gNB3 812 receives and stores the trace data from UE1C 828, said trace data including location data, e.g., position information, e.g., position fixes, of UE1C 826 while in trace mode.

In step 1368, UENC 828 sends trace data 1370 to gNB3 812. In step 1372 gNB3 812 receives and stores the trace data from UENC 828, said trace data including location data, e.g., position information, e.g., position fixes, of UENC 828 while in trace mode.

After a predetermined time interval, e.g., specified in messages 1322, 1340, and 1346, operation proceeds to steps 1374, 1376, and 1378. In step 1378 gNB1 808 resumes normal operations, e.g., with gNB being turned on (allowing transmissions from cell 1) or being removed from reserved mode (allowing UEs to admit to cell 1). In step 1374, UE 1C 826 resumes normal operations, e.g., with UE1C 826 transitioning out of trace mode and no longer collecting trace data. In step 1376, UE NC 828 resumes normal operations, e.g., with UENC 828 transitioning out of trace mode and no longer collecting trace data.

In step 1380 gNB3 812 sends trace logs 1382, which includes an aggregation of trace data from a plurality of its UEs which were commanded in trace mode including trace data 1362 from UE1C 826 and trace data 1370 from UENC 828, to TCE server 815. In step 1384 TCE server 815 receives the trace logs 1382 and stores the trace logs, to be available to the PCD 802, when requested. In step 1386 the PCD 802 generates a request for trace logs 1390. In step 1390 the PCD 802 sends the request for trace logs 1390 to the TCE server 815, which receives the request in step 1392. In response to the received request 1390, in step 1394, the TCE server 815 generates and sends trace logs 1396 (which is a copy of the received trace logs 1382 from gNB3 812), to PCD 802. In step 1398 PCD 802 receives the trace logs 1396 and recovers the communicated information.

In step 1400 PCD 802 generates and sends message 1402 to OSS 804, said message 1402 commanding gNB3 812 to: i) turn-off cell 3, e.g., put cell 3 in locked mode with no transmission from cell 3, or ii) put cell 3 in reserved mode with not new UEs allowed to admit to cell 3. In step 1404, the OSS 804 receives message 1402 and recovers the communicated information. In step 1406 OSS 804 generates and sends message 1408 to gNB3 812. Message 1408, which commands gNB3 812 to turn-off cell 3 or put cell 3 in reserved mode, is a forwarded version of message 1402. In step 1410 gNB3 812 receives message 1408 and recovers the communicated information.

In step 1412 PCD 802 generates and sends message 1414 to OSS 804, said message 1414 commanding gNB1 808 to put UEs (some or all of the UEs) being served by cell 1 (gNB1 808) in trace mode. In step 1416, the OSS 804 receives message 1414 and recovers the communicated information. In step 1418 OSS 804 generates and sends message 1420 to gNB1 808. Message 1410, which commands gNB1 808 to put UEs being served by cell 1 (gNB1 808) in trace mode, is a forwarded version of message 1414. In step 1422 gNB1 808 receives message 1420 and recovers the communicated information. In response to received message 1420, in step 1424 gNB1 808 generates and sends (transmits) command message 1426 to UE1A 818, instructing UE 1A 818 to transition into trace mode and to collect trace data. In step 1428 UE1A 818 receives command message 1426 and recovers the communicated information. In response to received message 1420, in step 1430 gNB1 808 generates and sends (transmits) command message 1432 to UENA 820, instructing UENA 820 to transition into trace mode and to collect trace data. In step 1434 UENA 820 receives command message 1432 and recovers the communicated information.

In response to receiving message 1408 in step 1410, in step 1438, gNB3 812 turns-off cell 3, e.g., puts cell 3 in locked mode with no transmission from cell 3, or puts cell 3 in reserved mode with no UEs allowed to admit to cell 3. In response to receiving message 1426 in step 1428, in step 1440 UE1A 818 transitions into trace mode and in step 1444 UE1A 818 is operated to collect data while in trace mode. In response to receiving message 1432 in step 1434, in step 1442 UENA 820 transitions into trace mode and in step 1446 UENA 820 is operated to collect data while in trace mode.

In step 1448, UE1A 818 sends trace data 1450 to gNB1 808. In step 1452 gNB1 808 receives and stores the trace data from UE1A 818, said trace data including location data, e.g., position information, e.g., position fixes, of UE1A 818 while in trace mode.

In step 1454, UE NA 820 sends trace data 1456 to gNB1 808. In step 1458 gNB1 808 receives and stores the trace data from UE NA 820, said trace data including location data, e.g., position information, e.g., position fixes, of UE NA 820 while in trace mode.

After a predetermined time interval, e.g., specified in messages 1408, 1426, and 1432, operation proceeds to steps 1464, 1460, and 1462. In step 1464 gNB3 812 resumes normal operations, e.g., with gNB3 being turned on (allowing transmissions from cell 3) or being removed from reserved mode (allowing UEs to admit to cell 3). In step 1460, UE 1A 818 resumes normal operations, e.g., with UE1A 818 transitioning out of trace mode and no longer collecting trace data. In step 1462, UE NA 820 resumes normal operations, e.g., with UE NA 820 transitioning out of trace mode and no longer collecting trace data.

In step 1468 gNB1 808 sends trace logs 1468, which includes an aggregation of trace data from a plurality of its UEs which were commanded in trace mode including trace data 1450 from UE1A 818 and trace data 1456 from UE NA 820, to TCE server 815. In step 1470 TCE server 815 receives the trace logs 1468 and stores the trace logs, to be available to the PCD 802, when requested. In step 1472 the PCD 802 generates a request for trace logs 1476. In step 1474 the PCD 802 sends the request for trace logs 1476 to the TCE server 815, which receives the request in step 1478. In response to the received request 1476, in step 1480, the TCE server 815 generates and sends trace logs 1482 (which is a copy of the received trace logs 1460 from gNB1 810), to PCD 802. In step 1484 PCD 802 receives the trace logs 1482 and recovers the communicated information. In step 1486 the PCD 802 sends trace logs 1488 (which includes trace logs 1396 (sourced from UE's of gNB3 812) and trace logs 1488 (sourced from UEs of gNB1 808) to GIS correlator 816. In step 1490 GIS correlator 816 receives the trace logs 1488.

In step 1492 the GIS correlator 816 plots trace data from cell 3's UEs to obtain a coverage area for cell 3 (gNB3 812). In step 1494 the GIS correlator 816 plots trace data from cell 1's UEs to obtain a coverage area for cell 1 (gNB1 810). In step 1496 the GIS correlator determines if the cell 3 and cell 1 coverage areas overlap. Step 1496 includes step 1498 and 1500, one of which is performed for an iteration of step 1496.

In step 1498 the GIS correlator 816 determines that the determined coverage areas for cell 3 and cell 1 overlap and further determines the collision area (PCI collision area), which is the overlap area. In step 1500 the GIS correlator 816 determines that the coverage area for cell 3 and cell 1 do not overlap.

In step 1500, the GIS correlator 816 generates and sends message 1504 to PCD 802, said message 1504 including the overlap determination from step 1496 and further including information identifying the collision area, when the determination is that the cell 3 and cell 1 coverage areas overlap. In step 1506, the PCD receives message 1504 and recovers the communicated information, e.g., the coverage area overlap determination (overlap or no overlap) and information indicating the collision area when the determination is that there is overlap.

PCD 802 performs step 1508 and 1510, in response to a determination that the coverage areas overlap. Alternatively, PCD 802 performs steps 1532 and 1534, in response to a determination that the coverage areas do not overlap.

In step 1508 the PCD 802, in response to a determination that the coverage areas overlap, determines that cell 1 (gNB1 808) and cell 3 (gNB3 812) are a PCI collision pair. Operation proceeds from step 1508 to step 1510. In step 1510, the PCD 802 performs a PCI management operation in response to the determination that cell 1 (gNB1 808) and cell 3 (gNB3 812) are a collision pair, said PCI management operation including changing the PCI of one of cell 1 (gNB1 808) and cell 3 (gNB3 812). In step 1512 PCD 802 generates and sends message 1514 communicating a PCI collision pair (cell 1/cell 3) report with a recommended PCI change (e.g., reassign gNB3 812 (cell 3) to another PCI), to OSS 804. In step 1516 OSS 804 receives message 1514 and recovers the communicated information. In step 1518 OSS 804 finds a PCI (e.g., PCI=51), which is not in use in the area that will be affected by the change and assigns the new (PCI=51) to one of the PCI collision cell pairs. In this example, the OSS 804 follows the recommendation of the PCD 802 and assigns the new PCI (PCI=51) to gNB3 812 (cell 3). In step 1520 OSS 804 generates and sends PCI change message 1522 to gNB3 812, said PCI change message 1522 indicating that gNB3 812 (cell 3) is to change its PCI to the new PCI value indicated in the message, e.g., PCI=51. In step 1524, gNB3 812 receives the PCI change message 1522 and implements the change. In step 1526, the PCD 802 sends a message 1528 to OSS 804 indicating that the OSS 804 is to optimize cell for coverage. In step 1530 the OSS 804 receives message 1528 and implements cell coverage optimization operations, e.g., adjusting parameters corresponding to one or more cells pertaining to maximum transmission power levels.

In step 1532, the PCD 802, in response to a determination that coverage areas do not overlap, determines that cell 1 (gNB1 808) and cell 3 (gNB3 812) are not a PCI collision pair. Operation proceeds from step 1532 to step 1536. In step 1536, the PCD 802 performs a PCI management operation in response to the determination that cell 1 (gNB1 808) and cell 3 (gNB3 812) are not a collision pair, said PCI management operation including evaluating another potential PCI collision pair, if there is another potential PCI collision pair.

Figure 10A:
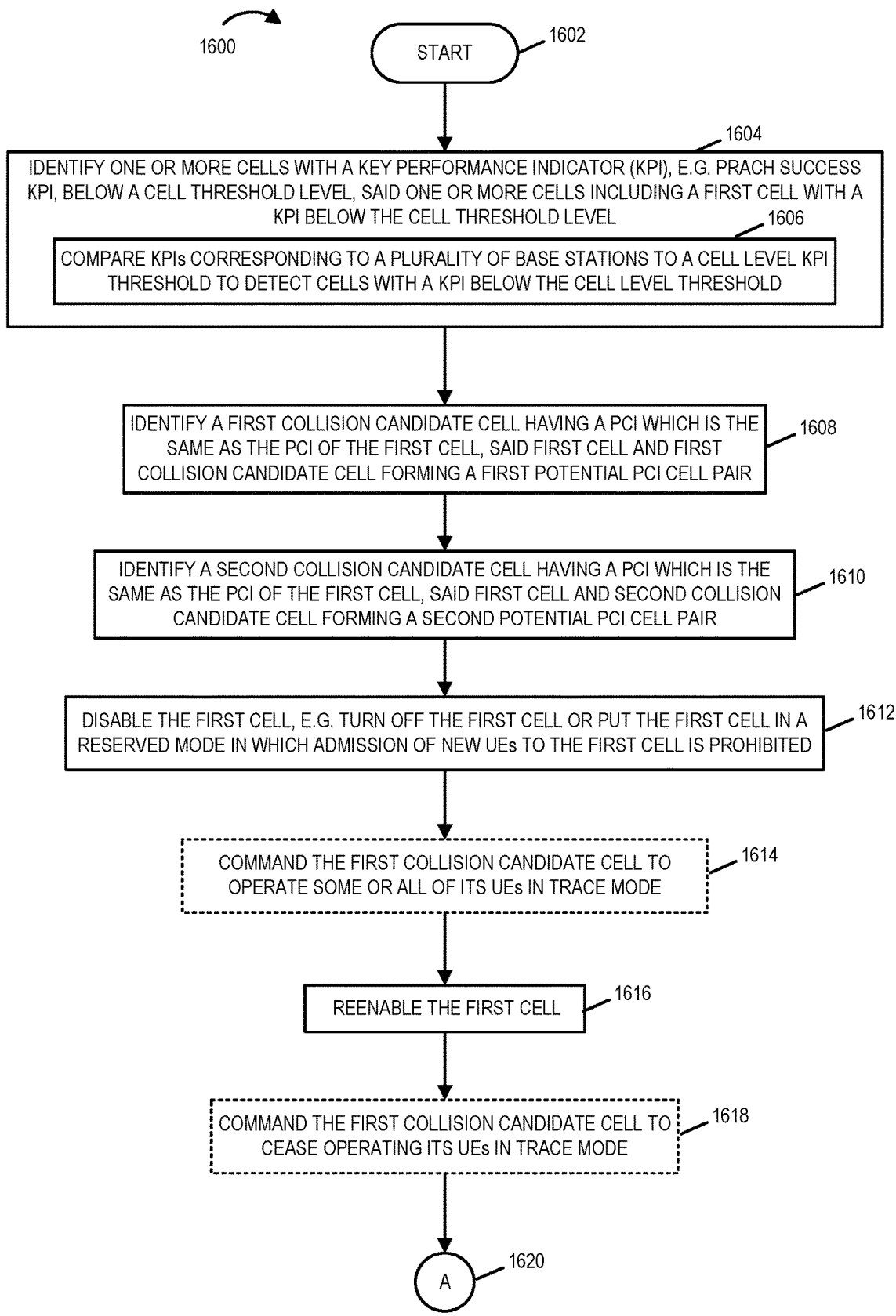
FIG. 10A is a first part of a flowchart of an exemplary method of controlling Physical Cell ID (PCI) use in a network in accordance with an exemplary embodiment.
Figure 10B:
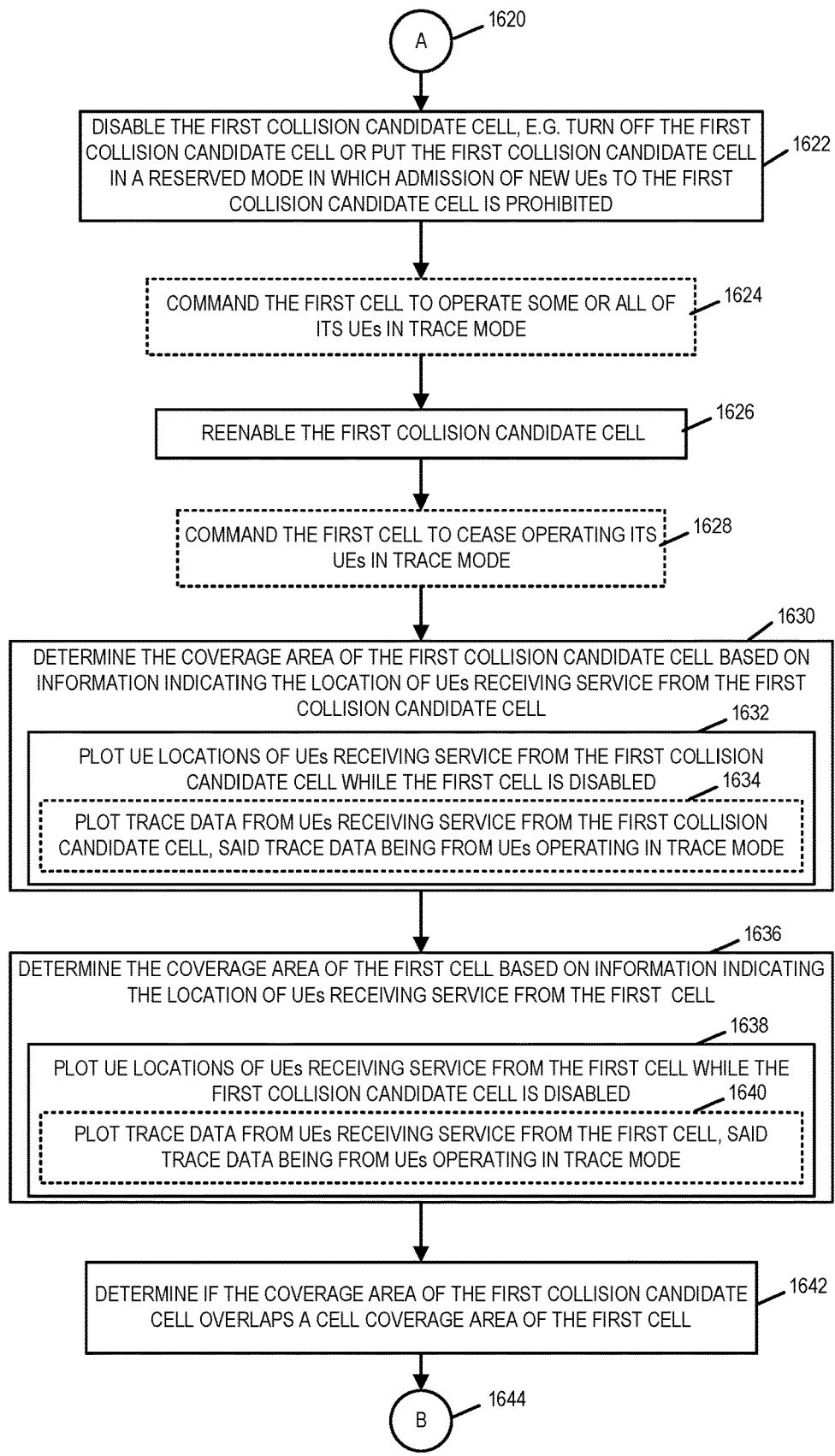
FIG. 10B is second part of a flowchart of an exemplary method of controlling Physical Cell ID (PCI) use in a network in accordance with an exemplary embodiment.
Figure 10C:
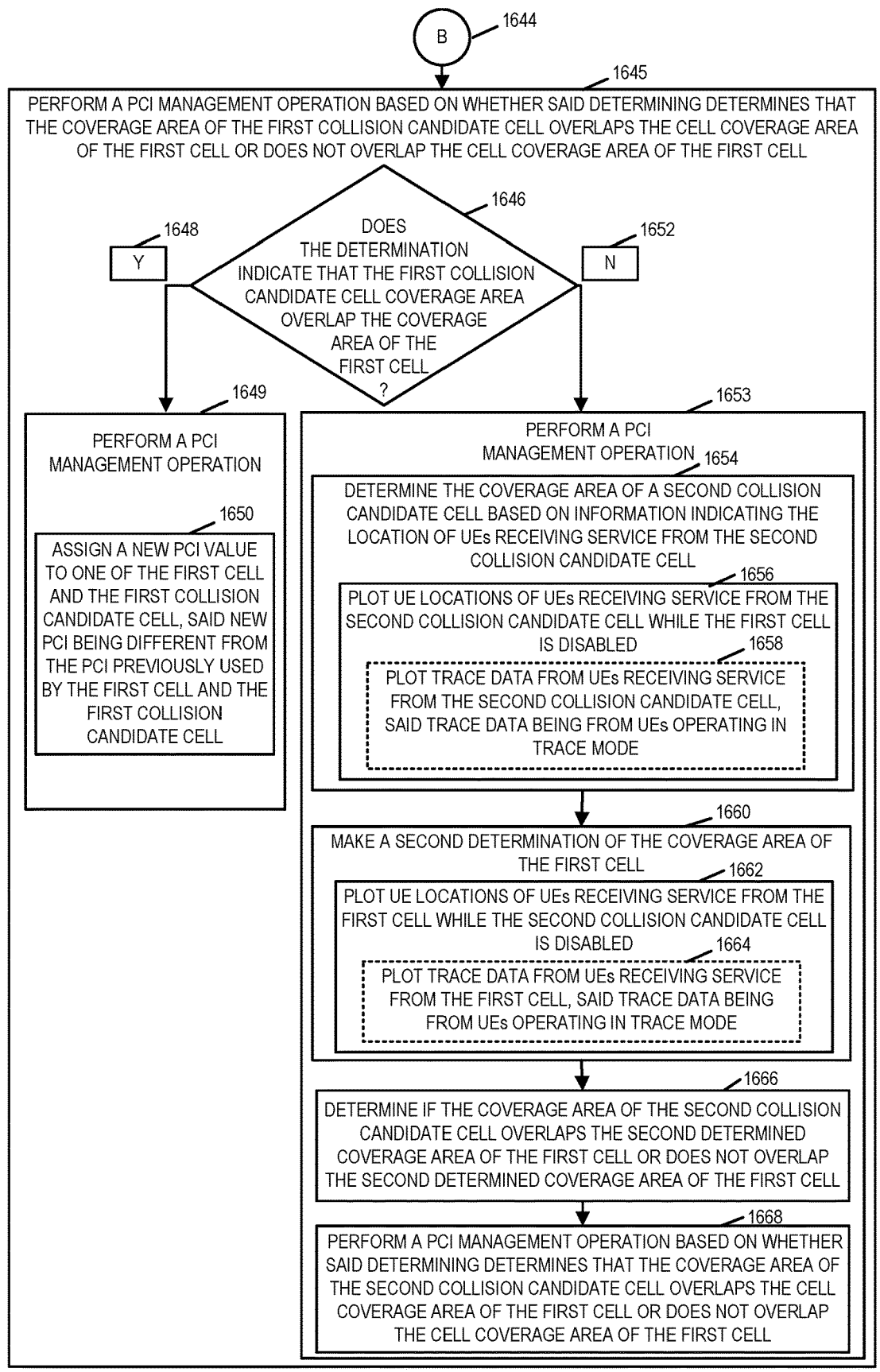
FIG. 10C is a third part of a flowchart of an exemplary method of controlling Physical Cell ID (PCI0 use in a network in accordance with an exemplary embodiment.
Figure 10:
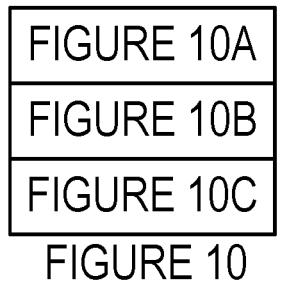
FIG. 10 comprises the combination of FIG. 10A, FIG. 10B, and FIG. 10C.

FIG. 10, comprising the combination of FIG. 10A, FIG. 10B and FIG. 10C, is a flowchart 1600 of an exemplary method of controlling Physical Cell ID (ID) use in a network in accordance with an exemplary embodiment. The exemplary network is, e.g., the wireless communications network including base stations (gNB1 808, gNB2 810, gNB3 812, . . . , gNBM 814) of communications system 800 of FIG. 8.

Operation starts in step 1602 in which the communications system is powered on and initialized. Operation proceeds from start step 1602 to step 1604.

In step 1604 an operations support systems (OSS), e.g., OSS 804, identifies one or more cells with a key performance indicator (KPI), e.g., PRACH success KPI), below a cell threshold level, said one or more cells including a first cell (e.g., cell 1 corresponding to gNB1 808) with a KPI below the cell threshold level. Step 1604 includes step 1606 in which the OSS compares KPIs (PRACH success KPIs) corresponding to a plurality of base stations (e.g., gNB1 808, gNB2 810, gNB3 812, . . . , gNBM 814) to a cell level KPI threshold to detect cells with a KPI below the cell level threshold.

In some embodiments, the KPIs corresponding to a plurality of base stations includes one cell level KPI for each individual one of the plurality of base stations, and the cell level KPI for an individual one of the plurality of base stations is a PRACH success KPI which is an indicator of UE success in accessing the individual base station to which the KPI corresponds, e.g. while attempting to access the base station via a physical random access channel.

Operation proceeds from step 1604 to step 1608. In step 1608 the OSS identifies a first collision candidate cell, e.g., cell 2 corresponding to gNB2 810, having a PCI which is the same as the PCI (e.g., PCI value=50) of the first cell, said first cell and said first collision candidate cell forming a first potential PCI cell pair, e.g., a first potential PCI cell collision pair.

In some embodiments, in step 1608 the OSS selects the first collision candidate cell from among a plurality of cells with the same PCI (e.g., PCI value=50) as the first cell based on one or more of all of: PRACH success KPI values, distances between base stations, number of hops, and minimum distances between outer boundaries of intended cell coverage areas). In one example, the first cell has the worst KPI (e.g., lowest PRACH success KPI) in a set of cells including the first cell, which have the same PCI (e.g., PCI value=50) as the first cell. In some such embodiments, the first collision candidate cell has the second worst (second lowest) KPI (e.g., PRACH success KPI) in the set of cell which have the same PCI (e.g., PCI=50) as the first cell.

Operation proceeds from step 1608 to step 1610. In step 1608 the OSS identifies a second collision candidate cell, e.g., cell 3 corresponding to gNB3 812, having a PCI which is the same as the PCI (e.g., PCI value=50) of the first cell, said first cell and said second collision candidate cell forming a second potential PCI cell pair, e.g., a second potential PCI cell collision pair. Operation proceeds from step 1610 to step 1612.

In step 1612 a PCI collision detector (PCD), e.g., PCD 802, disables the first cell, e.g., turns off the first cell or puts the first cell in a reserved mode in which admission of new UEs to the first cell is prohibited. In some embodiments, the PCD sends a message to cause the first cell to turn-off. In some embodiments, the turn-off coincides with first cell (base station) down time for maintenance operations. In some embodiments, the PCD sends a message to cause the first cell to stop servicing UEs and/or stop accepting new UEs for service in which case UEs receiving service from the first cell will naturally diminish over time as UEs leave the coverage area of the first cell or drop connections with the first cell.

In some embodiments, operation proceeds from step 1612 to step 1614, in which the PCD commands the first collision candidate cell to operate some or all of its UEs in trace mode. After a time interval, e.g. a predetermined time interval in which trace data is collected from first collision candidate cell's UEs, operation proceeds from step 1614 to step 1616.

In some other embodiments, optional step 1614 is not performed, and operation proceeds, after a time interval, e.g., a predetermined time interval in which data is collected from first collision candidate cell's UEs, from step 1612 to step 1616.

In step 1616 the PCD renewables the first cell. In embodiments, in which step 1614 was performed, step 1618 is performed, in which the PCD commands the first collision candidate cell to cease operating its UEs in trace mode. Operation proceeds from step 1616 or step 1618, via connecting node A 1620 to step 1622.

In step 1622 the PCD disables the first collision candidate cell, e.g., turns off the first collision candidate cell or puts the first collision candidate cell in a reserved mode in which admission of new UEs to the first collision candidate cell is prohibited. In some embodiments, the PCD sends a message to cause the first collision candidate cell to turn-off. In some embodiments, the turn-off coincides with first collision candidate cell (base station) down time for maintenance operations. In some embodiments, the PCD sends a message to cause the first collision candidate cell to stop servicing UEs and/or stop accepting new UEs for service in which case UEs receiving service from the first collision candidate cell will naturally diminish over time as UEs leave the coverage area of the first collision candidate cell or drop connections with the first collision candidate cell.

In some embodiments, operation proceeds from step 1622 to step 1624, in which the PCD commands the first cell to operate some or all of its UEs in trace mode. After a time interval, e.g. a predetermined time interval in which trace data is collected from first cell's UEs, operation proceeds from step 1624 to step 1626.

In some other embodiments, optional step 1624 is not performed, and operation proceeds, after a time interval, e.g., a predetermined time interval in which data is collected from first cell's UEs, from step 1622 to step 1626.

In step 1626 the PCD renewables the first collision candidate cell. In embodiments, in which step 1624 was performed, step 1628 is performed, in which the PCD commands the first cell to cease operating its UEs in trace mode. Operation proceeds from step 1626 or step 1628 to step 1630.

In step 1630 a Geographic Information System (GIS) correlator, e.g., GIS correlator 816, determines the coverage area of the first collision candidate cell based on information indicating the location of UEs receiving service from the first collision candidate cell. For example, in some embodiments, trace data, e.g., trace data including GPS position fix information, from UEs in trace mode receiving service from the first collision candidate cell is used to determine the coverage area of the first collision candidate cell. As another example, in some embodiments, received RF signals from UEs receiving service from the first collision candidate cell is used to determine the locations of the UEs receiving service from the first collision candidate cell, and the determined RF based locations are used to determine the coverage area of the first collision candidate cell.

Step 1630 includes step 1632, in which the GIS correlator plots UE location of UEs receiving service from the first collision candidate cell while the first cell is disabled. In some embodiments, step 1632 includes step 1634, in which the GIS correlator plots trace data from UEs receiving service from the first collision candidate cell, said trace data being from UEs operating in trace mode. Operation proceeds from step 1630 to step 1636.

In step 1636 the Geographic Information System (GIS) correlator determines the coverage area of the first collision candidate cell based on information indicating the location of UEs receiving service from the first cell. For example, in some embodiments, trace data, e.g., trace data including GPS position fix information, from UEs in trace mode receiving service from the first cell is used to determine the coverage area of the first cell. As another example, in some embodiments, received RF signals from UEs receiving service from the first cell is used to determine the locations of the UEs receiving service from the first cell, and the determined RF based locations are used to determine the coverage area of the first cell.

Step 1636 includes step 1638, in which the GIS correlator plots UE location of UEs receiving service from the first cell while the first collision candidate cell is disabled. In some embodiments, step 1638 includes step 1640, in which the GIS correlator plots trace data from UEs receiving service from the first cell, said trace data being from UEs operating in trace mode. Operation proceeds from step 1636 to step 1642.

In step 1642 the GIS correlator determines if the coverage area of the first collision candidate cell overlaps a cell coverage area of the first cell. Operation proceeds from step 1642, via connecting node B 1644, to step 1645.

In step 1645 the system, under the control of the PCI detector, performs PCI management operation based on whether said determining determines that the coverage area of the first collision candidate cell overlaps the cell coverage area of the first cell or does not overlap the cell coverage area of the first cell. Step 1645 includes steps 1646, 1649 and 1653.

If the determination (of step 1642) is that the first collision candidate cell coverage area does overlap the coverage area of the first cell, as indicated by Y 1648, then operation proceeds from step 1646 step 1649. In step 1649 the system, under the control of the PCI detector, performs PCI management operation. Step 1649 includes step 1650 in which the OSS assigns a new PCI value (e.g., PCI=51) to one of the first cell and first collision candidate cell, said new PCI being different from the PCI previously used by the first cell and the first collision candidate cell.

Alternatively, if the determination (of step 1642) is that the first collision candidate cell coverage area does not overlap the coverage area of the first cell, as indicated by N 1652, then operation proceeds from step 1646 step 1653. In step 1653 the system, under the control of the PCI detector, performs PCI management operation(s). Step 1653 includes steps 1654, 1660, 1666 and 1668. In step 1654 the GIS correlator determines the coverage area of the second collision candidate cell based on information indicating the location of UEs receiving service from the second collision candidate cell. For example, in some embodiments, trace data, e.g., trace data including GPS position fix information, from UEs in trace mode receiving service from the second collision candidate cell is used to determine the coverage area of the second collision candidate cell. As another example, in some embodiments, received RF signals from UEs receiving service from the second collision candidate cell is used to determine the locations of the UEs receiving service from the second collision candidate cell, and the determined RF based locations are used to determine the coverage area of the second collision candidate cell.

Step 1654 includes step 1656 in which the GIS correlator plots UE location of UEs receiving service from the second collision candidate cell while the first cell is disabled. In some embodiments, step 1656 includes step 1658, in which the GIS correlator plots trace data from UEs receiving service from the second collision candidate cell, said trace data being from UEs operating in trace mode. Operation proceeds from step 1656 to step 1660. In step 1660 the GIS correlator makes a second determination of the coverage area of the first cell based on information indicating the location of UEs receiving service from the first cell. Step 1660 includes step 1662 in which the GIS correlator plots UE location of UEs receiving service from the first cell while the second collision candidate cell is disabled. In some embodiments, step 1662 includes step 1664, in which the GIS correlator plots trace data from UEs receiving service from the first cell, said trace data being from UEs operating in trace mode. Operation proceeds from step 1660 to step 1666.

In step 1666 the GIS correlator determines if the coverage area of the second collision candidate cell overlaps the second determined coverage area of the first cell or does not overlap the second determined coverage area of the first cell. Operation proceeds from step 1666 to step 1668. In step 1668 the system, under the control of the PCD performs a PCI management operation based on whether said determining (of step 1666) determines that the coverage area of the second collision candidate cell overlaps the cell coverage area of the first cell or does not overlap the cell coverage area of the first cell. If the determination is that the second collision candidate cell coverage area does overlap the coverage area of the first cell, then the OSS assigns a new PCI value (e.g., PCI=51) to one of the first cell and first collision candidate cell, said new PCI being different from the PCI previously used by the first cell and the first collision candidate cell. However, if the determination is that the second collision candidate cell coverage area does not overlap the coverage area of the first cell, then the PCD proceeds to test another collision candidate cell, for a coverage overlap with the first cell, if another collision candidate cell with the same PCI as the first cell has been identified.

Figure 11:
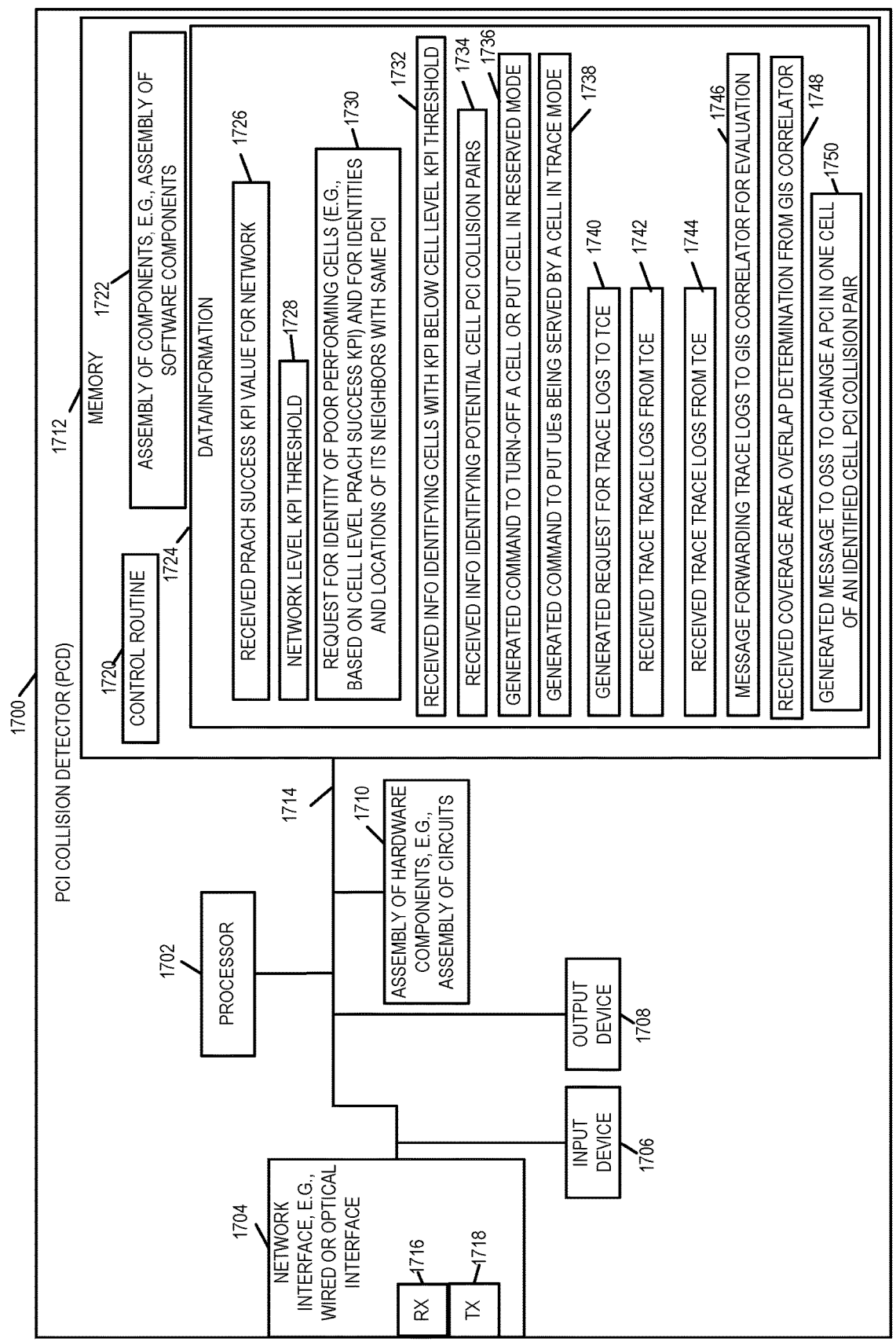
FIG. 11 is a drawing of an exemplary physical cell ID (PCI) collision detector (PCD) in accordance with an exemplary embodiment.

FIG. 11 is a drawing of an exemplary physical cell identifier (PCI) collision detector (PCD) 1700 in accordance with an exemplary embodiment. PCD 1700 is, e.g., PCD 802 of system 800 of FIG. 8, and/or PCD 802 of signaling diagram 900 of FIG. 9 and/or a PCD implementing steps of a method, e.g., the method of flowchart 300 of FIG. 3 and/or the method of flowchart 1600 of FIG. 10. Exemplary PCD 1700 includes a processor 1702, e.g., a CPU, a network interface 1704, an input device 1706, e.g., a keyboard, an output device 1708, e.g., a display, an assembly of hardware components 1710, e.g., an assembly of circuits, and memory 1712 coupled together via a bus 1714 over which the various elements may interchange data and information.

Network interface 1704, e.g., a wired or optical interface, includes a receiver 1716 and a transmitter 1718. Network interface 1704 couples the PCD 1700 to network nodes including, e.g., a GIS correlator, an OSS, a TCE server, and/or the Internet.

Memory 1712 includes a control routine 7120, an assembly of components 1722, and data/information 1726. Control routine 1720 includes instructions, which when executed by processor 1702 control the PCD 1700 to perform basic device operational functions such as, e.g., controlling the network interface 1706, controlling input device 1706, controlling output device 1708, accessing memory 1712, storing in memory 1712, etc. Assembly of components 1722, e.g., an assembly of software components, includes instructions, which when executed by processor 1702 control the PCD 1700 to implement steps of a method, e.g., steps of the method of flowchart 300 of FIG. 3, steps of the signaling diagram 900 of FIG. 9, and/or steps of the method of flowchart 1600 of FIG. 10.

Data/information 1742 includes a received PRACH success KPI value for a network 1726, a network level PKI threshold 1728, a generated request for the identity of poor performing cells (e.g., based on cell level PRACH success KPI) and for the identities and locations of its neighbors with the same PCI 1730, received information 1732 identifying cells with a KPI (e.g., cell level PRACH success KPI) below a cell level KPI threshold, received information 1734 identifying potential cell PCI collision pairs, a generated command 1736 to turn-off a cell or put a cell in reserved mode, said command to be sent to a base station (corresponding to the cell) via OSS, a generated command 1738 to put UEs being served by a cell in trace mode, said generated command to be sent, via OSS, to a base station corresponding to the cell, for the base station to instruct the UEs to enter trace mode, a generated request 1740 for trace logs to be sent to a trace collection entity (TCE), said requested trace logs corresponding to UEs of a cell for which cell coverage is to be mapped as part of a method if identifying an overshooting cell and PCI collision between cells, received trace logs 1742 from TCE corresponding to first cell of a potential PCI cell collision pair which is being evaluated, received trace logs 1744 from TCE corresponding to second cell of a potential PCI cell collision pair which is being evaluated, a generated message 1746 forwarding trace logs to a GIS correlator for evaluation, a received coverage area overlap determination 1748 from the GIS correlator, an a generated message 1750 to be sent to OSS instructing the OSS to change a PCI in one cell of an identified cell PCI collision pair.

Figure 12:
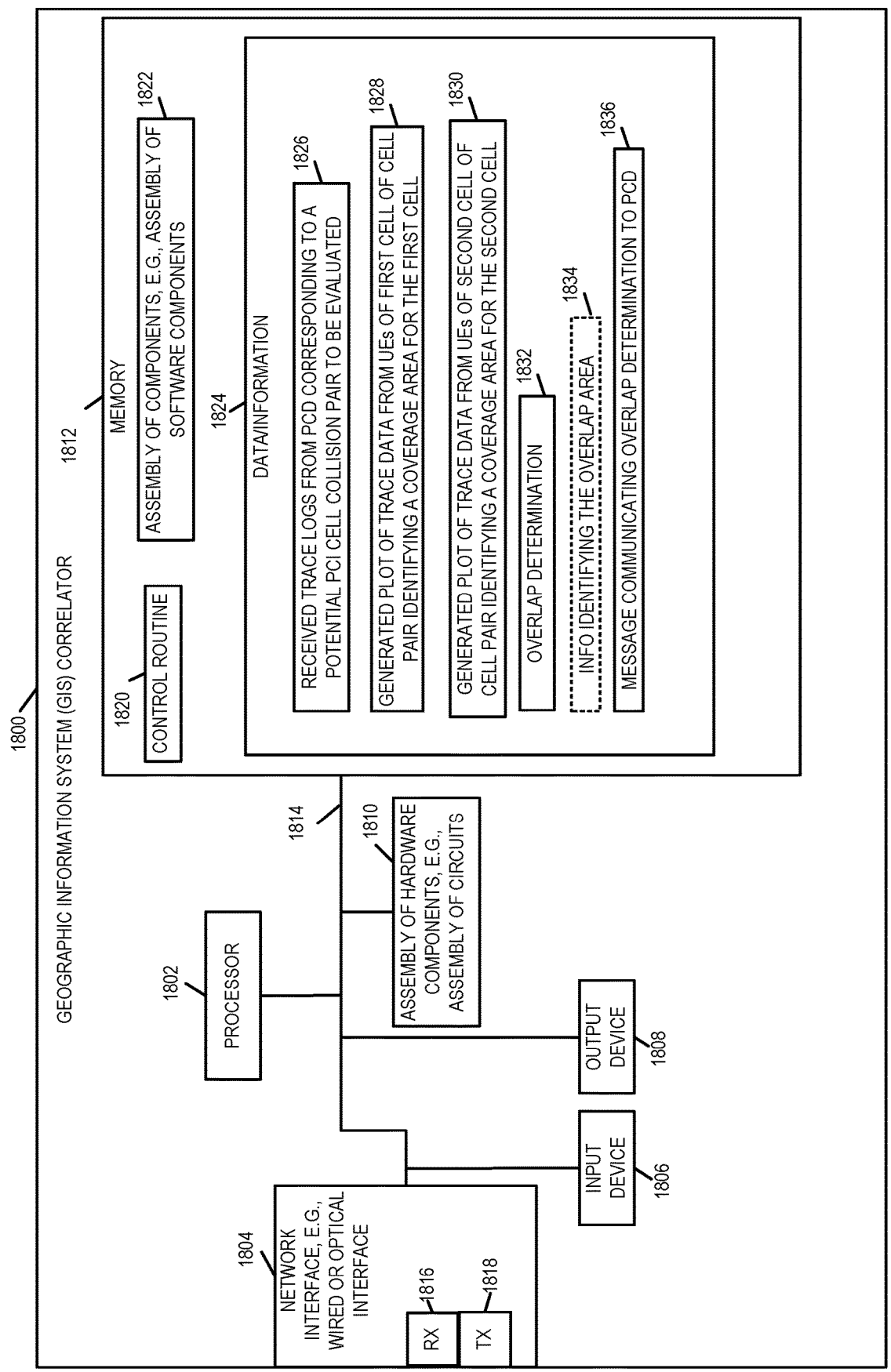
FIG. 12 is a drawing of an exemplary Geographic Information System (GIS) correlator in accordance with an exemplary embodiment.

FIG. 12 is a drawing of an exemplary geographic information system (GIS) correlator 1800 in accordance with an exemplary embodiment. GIS correlator 1800 is, e.g., GIS correlator 816 of system 800 of FIG. 8, and/or GIS correlator 816 of signaling diagram 900 of FIG. 9 and/or a GIS correlator implementing steps of a method, e.g., the method of flowchart 300 of FIG. 3 and/or the method of flowchart 1600 of FIG. 10. Exemplary GIS correlator 1800 includes a processor 1802, e.g., a CPU, a network interface 1804, an input device 1806, e.g., a keyboard, an output device 1808, e.g., a display, an assembly of hardware components 1810, e.g., an assembly of circuits, memory 1812 coupled together via a bus 1814 over which the various elements may interchange data and information.

Network interface 1804, e.g., a wired or optical interface, includes a receiver 1816 and a transmitter 1818. Network interface 1804 couples the GIS correlator 1800 to network nodes including, e.g., PCD, and/or the Internet.

Memory 1812 includes a control routine 1820, an assembly of components 1822, and data/information 1824. Control routine 1820 includes instructions, which when executed by processor 1802 control the GIS correlator 1800 to perform basic device operational functions such as, e.g., controlling the network interface 1806, controlling input device 1806, controlling output device 1808, accessing memory 1812, storing in memory 1812, etc. Assembly of components 1822, e.g., an assembly of software components, includes instructions, which when executed by processor 1802 control the GIS correlator 1800 to implement steps of a method, e.g., steps of the method of flowchart 300 of FIG. 3, steps of the signaling diagram 900 of FIG. 9, and/or steps of the method of flowchart 1600 of FIG. 10.

Data/information 1824 includes received trace logs 1826 from a PCD corresponding to potential PCI cell collision pair to be evaluated, a generated plot of trace data from UEs of a first cell of the cell pair identifying a coverage area for the first cell 1828, a generated plot of trace data from UEs of a second cell of the cell pair identifying a coverage area for the second cell 1830, an overlap determination 1832, indicating that there is overlap between the identifies coverage area or the first cell and the identified coverage area of the second cell or indicating that there is not an overlap in coverage areas between the two cells, information identifying the overlap area 1834, when the determination is that there is overlap, and a message 1836 communicating the overlap determination to the PCD, said message including information identify the overlap area when there is an overlap in coverage.

Figure 13:
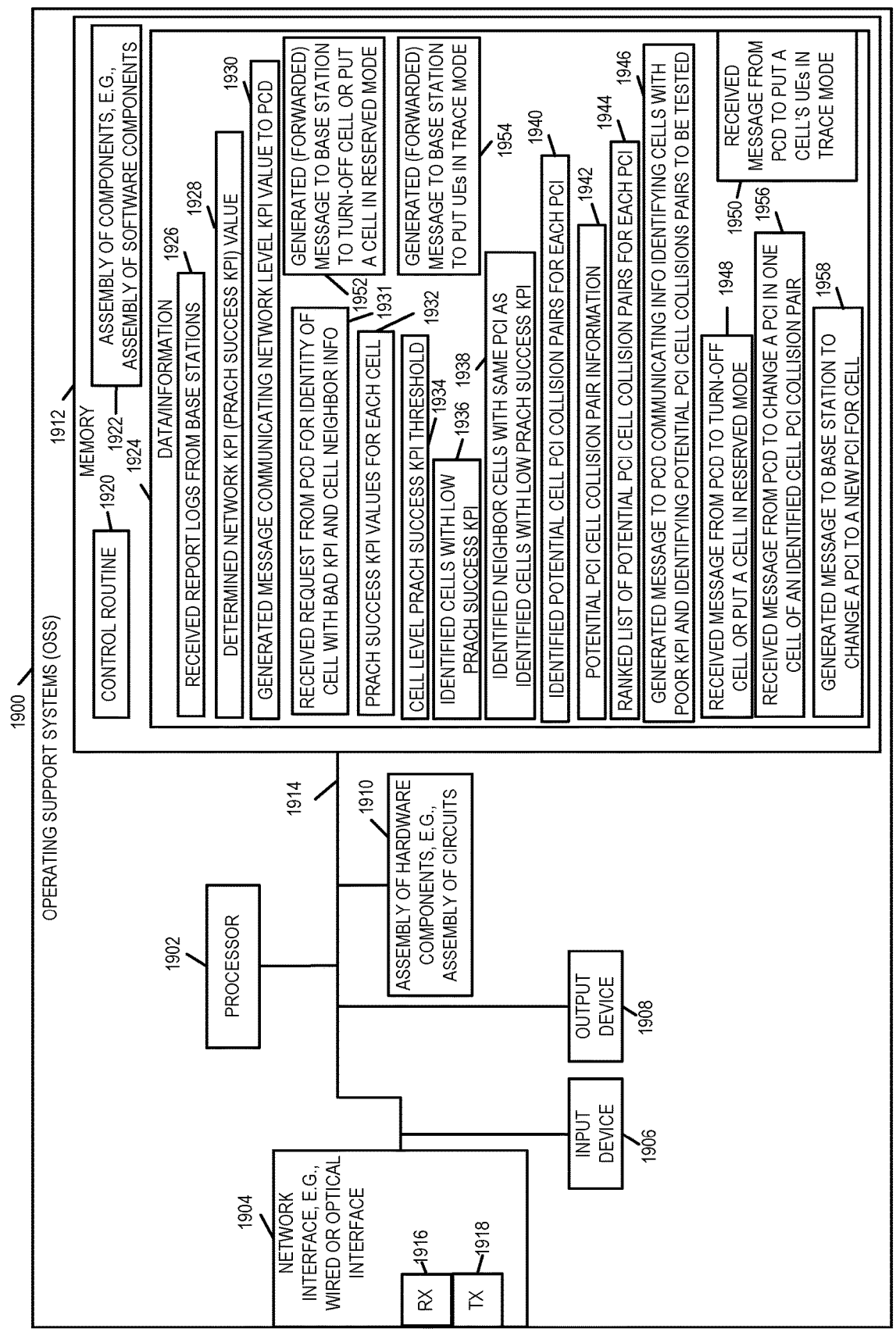
FIG. 13 is a drawing of an exemplary Operations Support System (OSS) in accordance with an exemplary embodiment.

FIG. 13 is a drawing of an exemplary Operations Support System (OSS) 1900 in accordance with an exemplary embodiment. OSS 1900 is, e.g., OSS 804 of system 800 of FIG. 8, and/or OSS 804 of signaling diagram 900 of FIG. 9 and/or an OSS implementing steps of a method, e.g., the method of flowchart 300 of FIG. 3 and/or the method of flowchart 1600 of FIG. 10. Exemplary OSS 1900 includes a processor 1902, e.g., a CPU, a network interface 1904, an input device 1906, e.g., a keyboard, an output device 1908, e.g., a display, an assembly of hardware components 1910, e.g., an assembly of circuits, and memory 1912 coupled together via a bus 1914 over which the various elements may interchange data and information.

Network interface 1904, e.g., a wired or optical interface, includes a receiver 1916 and a transmitter 1918. Network interface 1904 couples the OSS 1900 to network nodes including, e.g., an FTP server, a PCD, core network nodes, and/or the Internet.

Memory 1912 includes a control routine 1920, an assembly of components 1922, and data/information 1924. Control routine 1920 includes instructions, which when executed by processor 1902 control the OSS 1900 to perform basic device operational functions such as, e.g., controlling the network interface 1906, controlling input device 1906, controlling output device 1908, accessing memory 1912, storing in memory 1912, etc. Assembly of components 1922, e.g., an assembly of software components, includes instructions, which when executed by processor 1902 control the OSS 1900 to implement steps of a method, e.g., steps of the method of flowchart 300 of FIG. 3, steps of the signaling diagram 900 of FIG. 9, and/or steps of the method of flowchart 1600 of FIG. 10.

Data/information 1924 includes received report logs from base stations 1926, a determined network KPI (e.g., a PRACH success KPI) value 1928, a generated message 1930 communicating the network level KPI to a PCD, a received request 1931 from a PCD requesting the identity of cell(s) with bad (e.g., low level below a cell level threshold) KPI, e.g., PRACH success KPI, and corresponding cell neighbor information, PRACH success KPI values for each cell in the network being evaluated 1932, a cell level PRACH success KPI threshold 1934, information, e.g., a list, identifying the identified cells with low PRACH success KPI and corresponding information, e.g. KPI value, PCI value, location, etc. 1936, information 1938 identifying neighbor cells with the same PCI as an identified cell with a low PRACH success KPI, for each of the identified cells with a low PRACH success KPI, identified potential cell PCI collision pairs for each PCI 1942, a ranked list 1944 of potential PCI cell collision pairs for each PCI, and a generated message 1948 to be sent to a PCD communicating information identifying cells with poor KPI and identifying potential PCI cell collision pairs to be tested. Data/information 1924 further includes a received message 1948 from a PCD to turn-off a cell or put a cell in reserved mode, a received message 1950 from PCD to put a cell's UEs in trace mode, and a generated message 1952, which is a forwarded copy of received message, to be sent to a base station to turn-off a cell or put a cell in reserved mode, a generated message 1954, which is a forwarded copy of a received message, to be sent to a base station to put UEs in trace mode. Data/information 1924 further includes a received message from a PCD to change a PCI in one cell of an identified cell PCI collision pair 1956, optionally including one or more or all of: i) a recommendation as to which cell of the collision pair should be reassigned a new PCI, ii) information identifying a suggested PCI to be used for the reassignment, iii) information identifying the collision area, and iv) information identifying the measured coverage area for each of the cells of the cell pair. Data/information 1958 further includes a generated message 1958 to a base station commanding the base station to change its PCI for a cell to a new PCI, said new PCI being indicated in the message.

Figure 14:
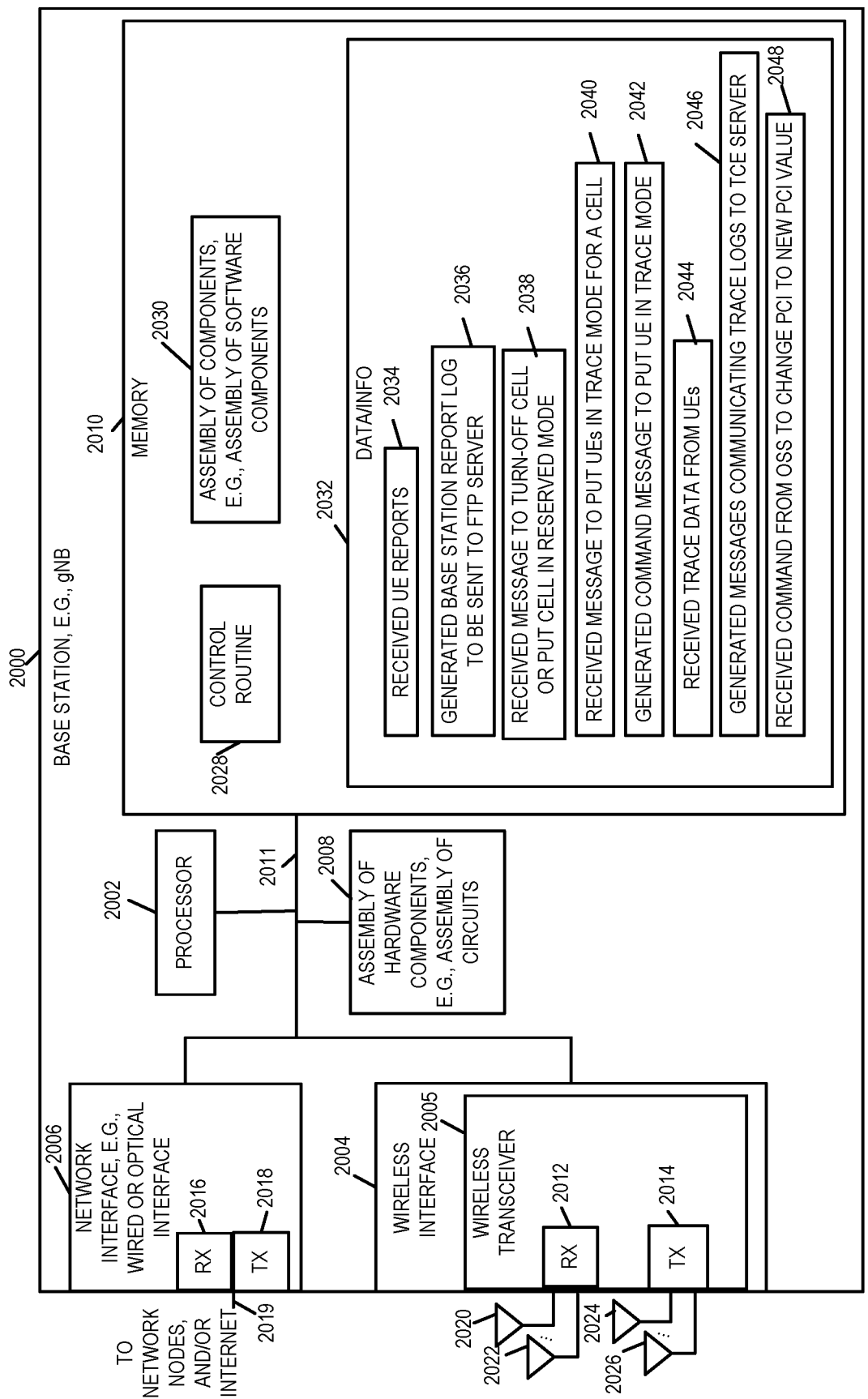
FIG. 14 is a drawing of an exemplary base station, e.g., a gNB, in accordance with an exemplary embodiment.

FIG. 14 is a drawing of an exemplary base station 2000, e.g., a gNB, in accordance with an exemplary embodiment. Base station 2000 is, e.g., any of the base stations (gNB1 808, gNB2 810, gNB3 812, . . . , gNBM 814) of system 800 of FIG. 8 or FIG. 9, and/or a base station, e.g., a gNB, implementing steps of a method, e.g., the method of flowchart 300 of FIG. 3 and/or the method of flowchart 1600 of FIG. 10. Exemplary base station 2000 includes a processor 2002, e.g., a CPU, a wireless interface 2004, a network interface 2006, an assembly of hardware components 2008, e.g., an assembly of components, and a memory 2010 coupled together via a bus 2011 over which the various elements may interchange data and information. Wireless interface 2004 includes a wireless receiver 2012 coupled to one or more receive antennas (2020, . . . 2022) and a wireless transmitter 2014 coupled to one or more transmit antennas (2024, . . . , 2026). In some embodiments the wireless receiver 2012 and wireless transmitter 2014 are included as part of a transceiver 2005, e.g., a transceiver chip.

Network interface 2006, e.g., a wired or optical interface, includes a receiver 2016 and a transmitter 2016 coupled to an interface connector 2019, which couples the base station 2000 to network nodes including, e.g., a OSS node, a FTP server, core network nodes, a TCE server and/or the Internet. Memory 2010 includes a control routine 2028, an assembly of components 2030, e.g., an assembly of software components, and data/information 2032.

Data/information 2032 includes received UE reports 2034, a generated base station report log 2036 to be sent to an FTP server, a received message 2038 instructing the base station to turn-off a cell or put the cell in reserved mode, a received message 2040 instructing the base station to put UEs in trace mode for a cell, a generated command message 2042 to be sent to a UE commanding the UE to enter trace mode and to start collected trace data, received trace data from UEs 2044, generated messages 2046 communicating trace logs to a TCE server, and a received command message 2048 from OSS commanding the base station to change its PCI to a new PCI value, said new PCI value being communicated in the received command message.

Figure 15:
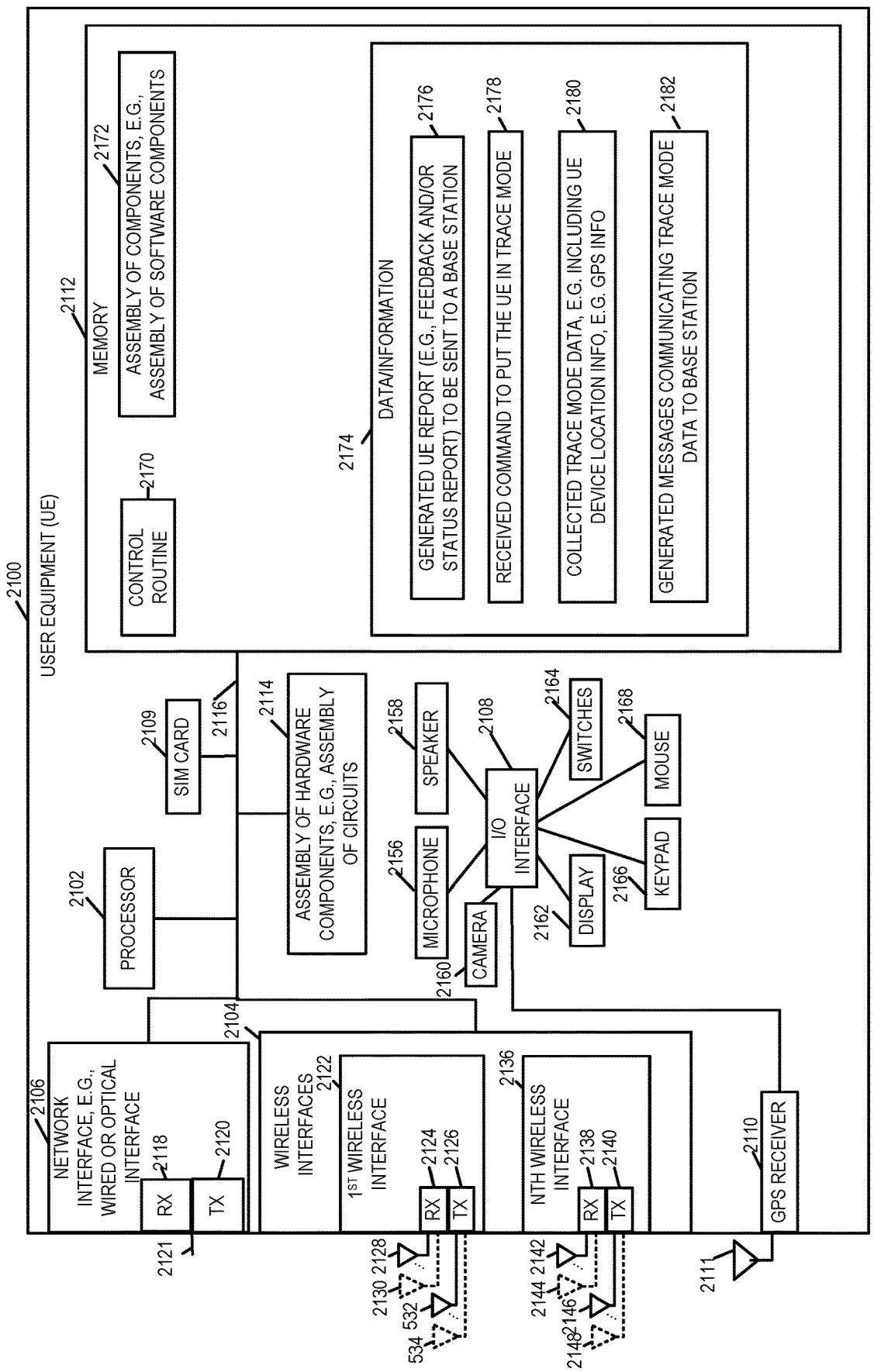
FIG. 15 is a drawing of an exemplary user equipment (UE) in accordance with an exemplary embodiment.

FIG. 15 is a drawing of an exemplary user equipment (UE) 2100 in accordance with an exemplary embodiment. Exemplary UE 2100 is, e.g., any of the UEs (818, 820, 822, 824, 826, 828, 830, 832) of system 800 of FIG. 8 or of signaling diagram 900 of FIG. 9, and/or UE, implementing steps of a method, e.g., the method of flowchart 300 of FIG. 3 and/or the method of flowchart 1600 of FIG. 10. UE 2100 includes processor 2102, e.g., a CPU, a wireless interface 2104, network interface 2106, I/O interface 2108, Subscriber Identity module (SIM) card 2109, GPS receiver 2110, memory 2112 and assembly of hardware components 2114, e.g., an assembly of circuits, coupled together via bus 2116 over which the various elements may exchange data and information.

Wireless interfaces 2104 includes a plurality of wireless interfaces (1st wireless interface 2122, Nth wireless interface 2136). 1st wireless interface 2122 includes wireless receiver (RX) 2124 and wireless transmitter (TX) 2126. Wireless receiver 2124 is coupled to one or more receive antennas or antenna elements (2128, 2130) via which the UE 2100 receives wireless signals from a radio access network node, e.g., a base station, e.g., a gNB corresponding to a first wireless network. Wireless transmitter 2126 is coupled to one or more transmit antennas or antenna elements (2132, 2134) via which the UE 2100 transmits wireless signals to a radio access network node, a base station, e.g., a gNB corresponding to a first wireless network. In some embodiments, the same antennas are used for transmit and receive with regard to the 1st wireless interface 2122. Nth wireless interface 2136 includes wireless receiver (RX) 2138 and wireless transmitter (TX) 2140. Wireless receiver 2138 is coupled to one or more receive antennas or antenna elements (2142, . . . , 2144) via which the UE 2100 receives wireless signals, e.g., from a radio access network node, e.g., a base station, e.g., gNB corresponding to a second wireless network. Wireless transmitter 2140 is coupled to one or more transmit antennas or antenna elements (2146, . . . , 2148) via which the UE 2100 transmits wireless signals, e.g., to a radio access network node, e.g., base station, e.g., a gNB corresponding to a second wireless network. In some embodiments, the same antennas are used for transmit and receive with regard to the 2nd wireless interface 2136. In some embodiments the 1st wireless interface 2122 and the nth wireless interface 2136 are used for different communications bands and/or correspond to different technologies.

Network interface 2106, e.g., a wired or optical interface, includes receiver 2118, transmitter 2120 and connector 2121. Network interface 2106 allows the UE 500 to connect to a wired or optical interface, when the UE 2100 is stationary and the wired or optical interface is available.

GPS receiver 2110 is coupled to GPS antenna 2111 via which the UE 2100 receives GPS signals used to determine UE position and velocity. UE 2100 further includes a plurality of I/O devices (microphone 2156, speaker 2158, camera 2160, display 2162, e.g., a touch screen display, switches 2164, keypad 2166, and mouse 2168) coupled to I/O interface 2108 via which the various I/O devices may interact with other elements within UE 2100.

Memory 2112 includes a control routine 2170, an assembly of components 2172, e.g., an assembly of software components, and data/information 2174. Data/information 2174 includes a generated UE report 2176, e.g., a feedback and/or status report, to be sent to a base station, a received command 2178 to put the UE in trace mode, collected trace mode data 2180, e.g. trace mode data including UE device location information, e.g. GPS information, and generated messages 2182 communicating the UE's collected trace mode data to the base station.

Figure 16:
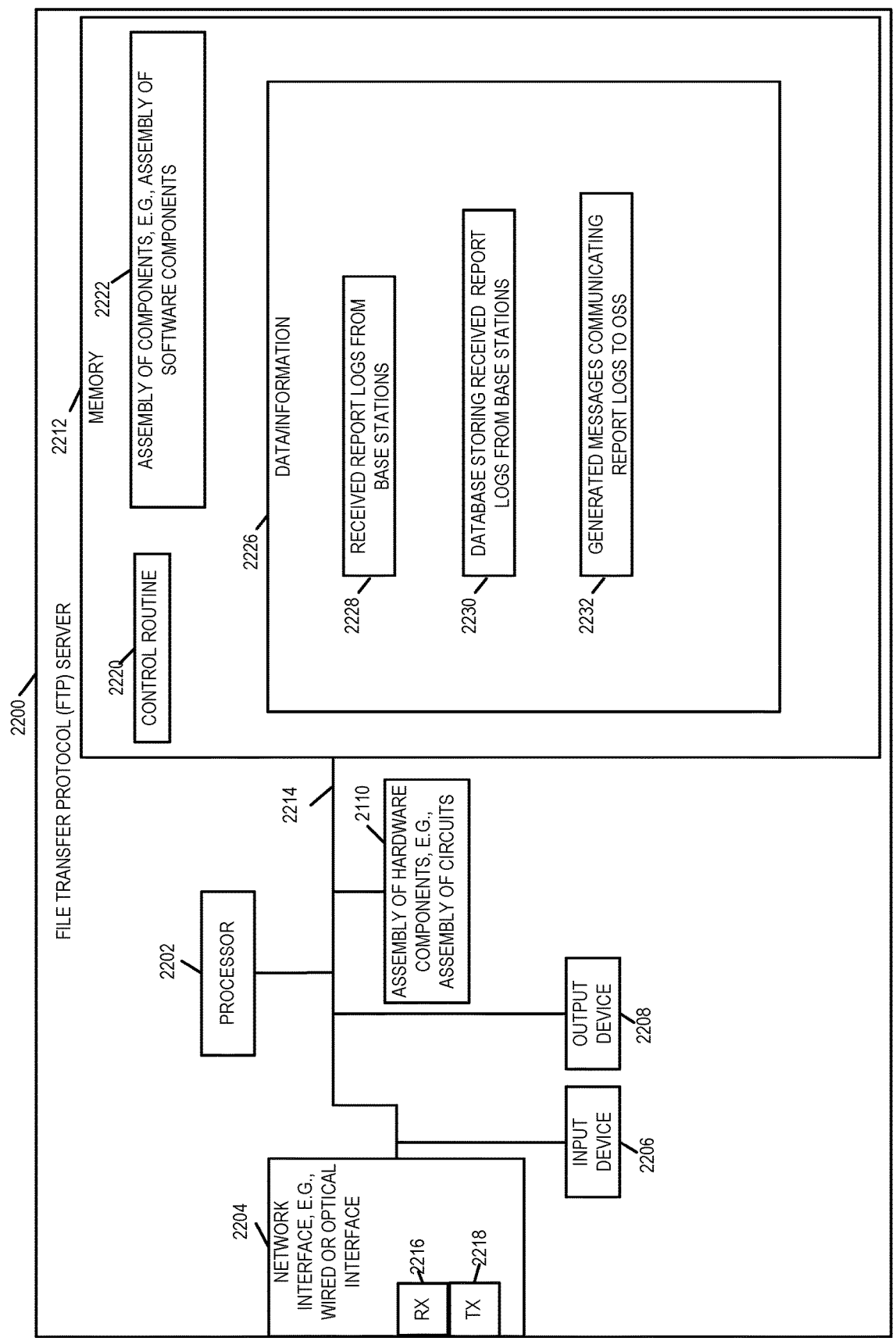
FIG. 16 is a drawing of an exemplary File Transfer Protocol (FTP) server in accordance with an exemplary embodiment.

FIG. 16 is a drawing of an exemplary File Transfer Protocol (FTP) server 2200 in accordance with an exemplary embodiment. FTP server 2200 is, e.g., FTP server 808 of system 800 of FIG. 8, and/or FTP server 806 of signaling diagram 900 of FIG. 9 and/or an FTP server implementing steps of a method, e.g., the method of flowchart 300 of FIG. 3 and/or the method of flowchart 1600 of FIG. 10. Exemplary FTP server 2200 includes a processor 2202, e.g., a CPU, a network interface 2204, an input device 2206, e.g., a keyboard, an output device 2208, e.g., a display, an assembly of hardware components 2210, e.g., an assembly of circuits, and memory 2212 coupled together via a bus 2214 over which the various elements may interchange data and information.

Network interface 2204, e.g., a wired or optical interface, includes a receiver 2216 and a transmitter 2218. Network interface 2204 couples the FTP server 2200 to network nodes including, e.g., base stations, an OSS, and/or the Internet.

Memory 2212 includes a control routine 2220, an assembly of components 2222, and data/information 2224. Control routine 2220 includes instructions, which when executed by processor 2202 control the FTP server 2200 to perform basic device operational functions such as, e.g., controlling the network interface 2204, controlling input device 2206, controlling output device 2208, accessing memory 2212, storing in memory 2212, etc. Assembly of components 2222, e.g., an assembly of software components, includes instructions, which when executed by processor 2202 control the FTP server 2200 to implement steps of a method, e.g., steps of the method of flowchart 300 of FIG. 3, steps of the signaling diagram 900 of FIG. 9, and/or steps of the method of flowchart 1600 of FIG. 10. Data/ information 2226 includes received report logs from base stations 2228, a database 2230 storing received report logs from base stations, and generated messages 2232 communicating report logs to OSS.

Figure 17:
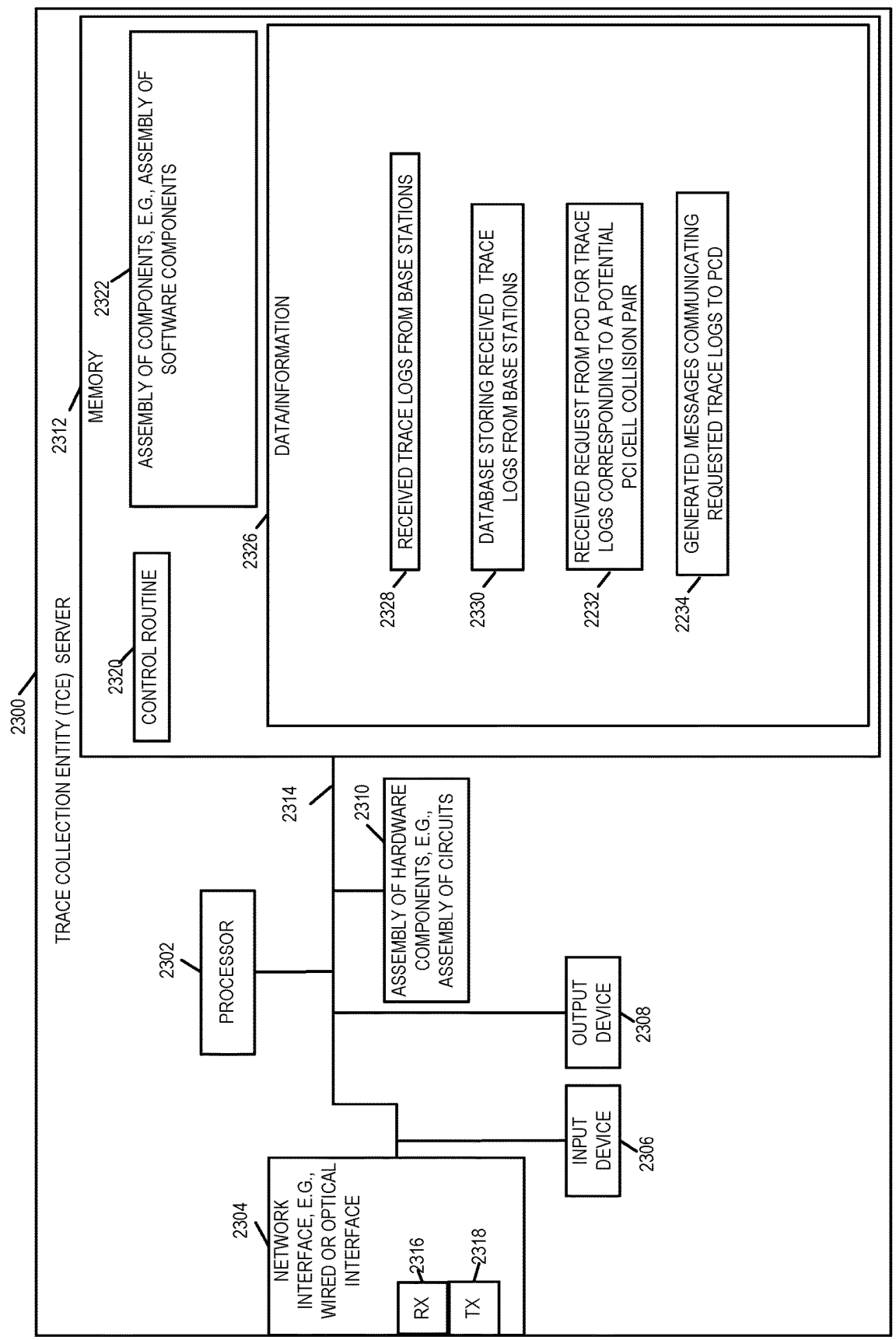
FIG. 17 is a drawing of an exemplary Trace Collection Entity (TCE) server in accordance with an exemplary embodiment.

FIG. 17 is a drawing of an exemplary Trace Collection Entity (TCE) server 2300 in accordance with an exemplary embodiment. TCE server 2300 is, e.g., TCE server 815 of system 800 of FIG. 8, and/or TCE server 815 of signaling diagram 900 of FIG. 9 and/or a TCE server implementing steps of a method, e.g., the method of flowchart 300 of FIG. 3 and/or the method of flowchart 1600 of FIG. 10. Exemplary TCE server 2300 includes a processor 2302, e.g., a CPU, a network interface 2304, an input device 2306, e.g., a keyboard, an output device 2308, e.g., a display, an assembly of hardware components 2310, e.g., an assembly of circuits, and memory 2312 coupled together via a bus 2314 over which the various elements may interchange data and information.

Network interface 2304, e.g., a wired or optical interface, includes a receiver 2316 and a transmitter 2318. Network interface 2304 couples the TCE server 2300 to network nodes including, e.g., base stations, a PCD, and/or the Internet.

Memory 2312 includes a control routine 2320, an assembly of components 2322, and data/information 2324. Control routine 2320 includes instructions, which when executed by processor 2302 control the TCE server 2200 to perform basic device operational functions such as, e.g., controlling the network interface 2304, controlling input device 2306, controlling output device 2308, accessing memory 2312, storing in memory 2312, etc. Assembly of components 2322, e.g., an assembly of software components, includes instructions, which when executed by processor 2302 control the TCE server 2300 to implement steps of a method, e.g., steps of the method of flowchart 300 of FIG. 3, steps of the signaling diagram 900 of FIG. 9, and/or steps of the method of flowchart 1600 of FIG. 10. Data/ information 2236 includes received trace logs from base stations 2328, a database 2330 storing received trace logs from base stations, a received request from a PCD for trace logs corresponding to a potential PCI cell collision pair, and generated messages 2234 communicating the requested trace logs to the PCD.

NUMBERED LIST OF EXEMPLARY METHOD EMBODIMENTS

Method Embodiment 1. A method of controlling physical cell ID (PCI) use in a network, the method comprising: identifying (1604 or 1032) one or more cells with a key performance indicator (KPI) below a cell level threshold, said one or more cells including a first cell with a KPI below the cell level threshold: identifying (1608 or 1050) a first collision candidate cell having a PCI which is the same as the PCI of the first cell, said first cell and first collision candidate cell forming a first potential PCI cell pair: determining (1630 or 1264) the coverage area of the first collision candidate cell based on information indicating the location of user equipments (UEs) receiving service from the first collision candidate cell (e.g., trace data (e.g., trace data including GPS position fix information) or RF location information obtained by monitoring locations of UEs receiving service from the first collision candidate cell); determining (1642 or 1268) if the coverage area of the first collision candidate cell overlaps a cell coverage area of the first cell; and performing (1645 or (1282, 1306)) a PCI management operation based on whether said determining (1642 or 1268) determines that the coverage area of the first collision candidate cell overlaps (1648 or 1270) the cell coverage area of the first cell or does not overlap (1652 or 1272) the cell coverage area of the first cell.

Method Embodiment 1a. The method of Method Embodiment 1, wherein said first cell has the worst (lowest) KPI (e.g., worst PRACH success KPI) in a set of cells including the first cell which have the same PCI as the first cell.

Method Embodiment 1b. The method of Method Embodiment 1a, wherein said first collision candidate cell has the second worst (lowest) KPI (e.g., second worst PRACH success KPI) in the set of cells which have the same PCI as the first cell.

Method Embodiment 1A. The method of Method Embodiment 1, wherein identifying (1604 or 1032) one or more cells with a KPI below the cell level threshold includes: comparing (1606 or 1030) KPIs (PRACH success KPIs) corresponding to a plurality of base stations to a cell level KPI threshold to detect cells with a KPI below the cell level KPI threshold.

Method Embodiment 1AA. The method of Method Embodiment 1A, wherein the KPIs corresponding to a plurality of base stations includes one cell level KPI for each individual one of the plurality of base stations; and wherein the cell level KPI for an individual one of the plurality of base station is a PRACH success KPI which is an indicator of UE success in accessing the individual base station to which the KPI corresponds (e.g., when attempting to access the base station via a physical random access channel).

Method Embodiment 2. The method of Method Embodiment 1, wherein performing (1649 or 1282) a PCI management operation in the case where it is determined that (1648 or 1270) the first collision candidate cell coverage area overlaps the coverage area of the first cell, includes: assigning (1650 or 1290) a new PCI value to one of the first cell and the first collision candidate cell, said new PCI being different from the PCI previously used by the first cell and the first collision candidate cell.

Method Embodiment 3. The method of Method Embodiment 2, further comprising, prior to determining (1630 or 1264) the coverage area of the first collision candidate cell: disabling the first cell (1612 or 1090), (e.g., turn off the first cell or put the first cell in a reserved mode in which admission of new UEs to the first cell is prohibited) (e.g., send a message to cause the first cell to stop servicing UEs and/or stop accepting new UEs for service in which case the UEs receiving service from the first cell will naturally diminish over time as UEs leave the coverage area of the first cell or drop connections with the first cell); and wherein determining (1630 or 1264) the coverage area of the first collision candidate cell includes plotting (1632) UE locations of UEs receiving service from the first collision candidate cell while the first cell is disabled.

Method Embodiment 3A. The method of Method Embodiment 3, wherein plotting (1632) UE locations of UEs receiving service from the first collision candidate cell while the first cell is disabled includes plotting (1634) trace data from UEs receiving service from the first collision candidate cell, said trace data being from UEs operating in trace mode.

Method Embodiment 3B. The method of Method Embodiment 3A, further comprising: commanding (1614 or 1102) the first collision candidate cell to operate some or all of its UEs in trace mode.

Method Embodiment 4. The method of Method Embodiment 3, further comprising, prior to determining (1642 or 1268) if the coverage area of the first collision candidate cell overlaps a cell coverage area of the first cell: disabling (1622 or 1172) the first collision candidate cell (e.g., turn off the first collision candidate cell or put the first collision candidate cell in a reserved mode in which admission of new UEs to the first collision candidate cell is prohibited) (e.g., send a message to cause first collision candidate cell to stop servicing UEs and/or stop accepting new UEs for service in which case the UEs receiving service from the first collision candidate cell will naturally diminish over time as UEs leave the coverage area of first collision candidate cell or drop connections with first collision candidate cell); and determining (1636 or 1266) the coverage area of the first cell based on information indicating the location of UEs receiving service from the first cell (e.g., trace data or RF location information obtained by monitoring locations of UEs receiving service from the first cell which the first collision candidate cell is disabled).

Method Embodiment 5. The method of Method Embodiment 4, wherein determining (1636 or 1266) the coverage area of the first cell includes: plotting (1638) UE locations of UEs receiving service from the first cell while the first collision candidate cell is disabled.

Method Embodiment 5A. The method of Method Embodiment 5, wherein plotting (1638) UE locations of UEs receiving service from the first cell while the first collision candidate cell is disabled includes plotting (1640) trace data from UEs receiving service from the first cell, said trace data being from UEs operating in trace mode.

Method Embodiment 5B. The method of Method Embodiment 3A, further comprising: commanding (1624 or 1184) the first cell to operate some or all of its UEs in trace mode.

Method Embodiment 6. The method of Method Embodiment 1, wherein performing (1653 or 1306) a PCI management operation when it is determined that (1652) the coverage area of the first collision candidate cell does not overlap the cell coverage area of the first cell includes: determining (1654 or 1492) the coverage area of a second collision candidate cell based on information indicating the location of UEs receiving service from the second collision candidate cell (e.g., trace data or RF location information obtained by monitoring locations of UEs receiving service from the second collision candidate cell); making (1660 or 1494) a second determination of the coverage area of the first cell, determining (1666 or 1496) if the coverage area of the second collision candidate cell overlaps the second determined cell coverage area of the first cell; and performing (1668 or (1510 or 1534)) a PCI management operation based on whether said determining (1666 or 1496) determines that the coverage area of the second collision candidate cell overlaps (1498) the second determined cell coverage area of the first cell or does not overlap (1500) the second determined cell coverage area of the first cell.

Method Embodiment 6A. The method of Method Embodiment 6, further comprising: prior to determining (1654 or 1492) the coverage area of the second collision candidate cell, identifying (1610 or 1052) the second collision candidate cell having a PCI which is the same as the PCI of the first cell, said first cell and second collision candidate cell forming a second potential PCI cell pair.

Method Embodiment 6B. The method of Method Embodiment 6A, wherein said first potential PCI cell pair is a first potential PCI cell collision pair, and wherein said second potential PCI cell pair is a second potential PCI cell collision pair.

Numbered List of Exemplary System Embodiments

System Embodiment 1. A system (800) for controlling physical cell identifier (PCI) use in a network, the system (800) comprising: an operations support system (OSS) (804 or 1900) including: memory (1912); and a first processor (1902) configured to: identify (1604 or 1032) one or more cells with a KPI below a cell level threshold, said one or more cells including a first cell with a KPI below the cell level threshold; and identify (1608 or 1050) a first collision candidate cell having a PCI which is the same as the PCI of the first cell, said first cell and first collision candidate cell forming a first potential PCI cell pair; and a geographic information system (GIS) correlator (816 or 1800) including: memory (1812); and a second processor (1802) configured to: determine (1630 or 1264) the coverage area of the first collision candidate cell based on information indicating the location of UEs receiving service from the first collision candidate cell (e.g., trace data (e.g., trace data including GPS position fix information) or RF location information obtained by monitoring and locations of UEs receiving service from the first collision candidate cell); determine (1642 or 1268) if the coverage area of the first collision candidate cell overlaps a cell coverage area of the first cell.

System Embodiment 2. The system of System Embodiment 1, further comprising: a physical cell ID (PCI) collision detector (PCD) (802 or 1700) including: memory (1712); and a third processor (1702) configured to: perform (1645 or (1282, 1306)) a PCI management operation based on whether said determining (1642 or 1268) determines that the coverage area of the first collision candidate cell overlaps (1648 or 1270) the cell coverage area of the first cell or does not overlap (1652 or 1272) the cell coverage area of the first cell.

System Embodiment 2a. The system (800) of System Embodiment 2, wherein said first cell has the worst (lowest) KPI (e.g., worst PRACH success KPI) in a set of cells including the first cell which have the same PCI as the first cell.

System Embodiment 2b. The system (800) of System Embodiment 2a, wherein said first collision candidate cell has the second worst KPI (second lowest KPI) (e.g., second worst PRACH success KPI) in the set of cells which have the same PCI as the first cell.

System Embodiment 2AA. The system (800) of System Embodiment 2, wherein said first processor (1902) is configured to: compare (1606 or 1030) KPIs (PRACH success KPIs) corresponding to a plurality of base stations to a cell level KPI threshold to detect cells with a KPI below the cell level KPI threshold, as part of being configured to identify (1604 or 1032) one or more cells with a KPI below the cell level threshold includes:

System Embodiment 2AB. The system (800) of System Embodiment 2AA, wherein the KPIs corresponding to a plurality of base stations includes one cell level KPI for each individual one of the plurality of base stations; and wherein the cell level KPI for an individual one of the plurality of base stations is a PRACH success KPI which is an indicator of UE success in accessing the individual base station to which the KPI corresponds (e.g., when attempting to access the base station via a physical random access channel).

System Embodiment 3. The system (800) of System Embodiment 2, wherein said third processor (1702) is configured to: command the OSS (804 or 1900) to assign (1650 or 1290) a new PCI value to one of the first cell and the first collision candidate cell, said new PCI being different from the PCI previously used by the first cell and the first collision candidate cell, as part of being configured to perform (1649 or 1282) a PCI management operation in the case where it is determined that (1648 or 1270) the first collision candidate cell coverage area overlaps the coverage area of the first cell.

System Embodiment 3A. The system (800) of System Embodiment 3, wherein said third processor (1702) is further configured to: disable the first cell (1612 or 1090) (e.g., turn off the first cell or put the first cell in a reserved mode in which admission of new UEs to the first cell is prohibited) (e.g., send a message to cause cell one to stop servicing UEs and/or stop accepting new UEs for service in which case the UEs receiving service from the first cell will naturally diminish over time as UEs leave the coverage area of the first cell or drop connections with the first cell), said disabling of the first cell being prior to said determining (1630 or 1264) of the coverage area of the first collision candidate cell; and wherein said second processor (1802) is configured to plot (1632) UE locations of UEs receiving service from the first collision candidate cell while the first cell is disabled, as part of being configured to determine (1630 or 1264) the coverage area of the first collision candidate cell.

System Embodiment 3AA. The system (800) of System Embodiment 3A, wherein said second processor (1802) is configured to: plot (1634) trace data from UEs receiving service from the first collision candidate cell, said trace data being from UEs operating in trace mode, as part of being configured to plot (1632) UE locations of UEs receiving service from the first collision candidate cell while the first cell is disabled.

System Embodiment 3B. The system (800) of System Embodiment 3A, wherein said third processor (1702) is further configured to: command (1614 or 1102) the first collision candidate cell to operate some or all of its UEs in trace mode.

System Embodiment 4. The system (800) of System Embodiment 3, wherein said third processor (1702) is further configured to: disable (1622 or 1172) the first collision candidate cell (e.g., turn off the first collision candidate cell or put the first collision candidate cell in a reserved mode in which admission of new UEs to the first collision candidate cell is prohibited) (e.g., send a message to cause first collision candidate cell to stop servicing UEs and/or stop accepting new UEs for service in which case the UEs receiving service from the first collision candidate cell will naturally diminish over time as UEs leave the coverage area of first collision candidate cell or drop connections with first collision candidate cell), said disabling of the first collision candidate cell being prior to said determining (1642 or 1268) if the coverage area of the first collision candidate cell overlaps a cell coverage area of the first cell; and wherein said second processor (1802) is further configured to determine (1636 or 1266) the coverage area of the first cell based on information indicating the location of UEs receiving service from the first cell (e.g., trace data or RF location information obtained by monitoring locations of UEs receiving service from the first cell which the first collision candidate cell is disabled).

System Embodiment 5. The system (800) of System Embodiment 4, wherein said second processor (1802) is configured to: plot (1638) UE locations of UEs receiving service from the first cell while the first collision candidate cell is disabled, as part of being configured to determine (1636 or 1266) the coverage area of the first cell.

System Embodiment 5A. The system (800) of System Embodiment 5, wherein said second processor (1802) is configured to: plot (1640) trace data from UEs receiving service from the first cell, said trace data being from UEs operating in trace mode, as part of being configured to plot (1638) UE locations of UEs receiving service from the first cell while the first collision candidate cell is disabled.

System Embodiment 5B. The system (800) of System Embodiment 3A, wherein said third processor (1702) is configured to: command (1624 or 1184) the first cell to operate some or all of its UEs in trace mode.

System Embodiment 6. The system (800) of System Embodiment 2, wherein said third processor (1702) is configured, as part of being configured to perform (1653 or 1306) a PCI management operation when it is determined that (1652) the coverage area of the first collision candidate cell does not overlap the cell coverage area of the first cell, to: request the GIS correlator (816 or 1800) to determine (1654 or 1492) the coverage area of a second collision candidate cell based on information indicating the location of UEs receiving service from the second collision candidate cell (e.g., trace data or RF location information obtained by monitoring locations of UEs receiving service from the second collision candidate cell): request the GIS correlator (816 or 1800) to make (1660 or 1494) a second determination of the coverage area of the first cell, request the GIS correlator (816 or 1800) to determine (1666 or 1496) if the coverage area of the second collision candidate cell overlaps the second determined cell coverage area of the first cell; and perform (1668 or (1510 or 1534)) a PCI management operation based on whether said determining (1666 or 1496) determines that the coverage area of the second collision candidate cell overlaps (1498) the second determined cell coverage area of the first cell or does not overlap (1500) the second determined cell coverage area of the first cell.

System Embodiment 6A. The system (800) of System Embodiment 6, wherein said first processor (1902) is further configured to: identify (1610 or 1052) the second collision candidate cell having a PCI which is the same as the PCI of the first cell, said first cell and second collision candidate cell forming a second potential PCI cell pair, said identifying of the second collision candidate cell being performed prior to determining (1654 or 1492) the coverage area of the second collision candidate cell.

System Embodiment 6B. The system (800) of System Embodiment 6A, wherein said first potential PCI cell pair is a first potential PCI cell collision pair, and wherein said second potential PCI cell pair is a second potential PCI cell collision pair.

Numbered Lists of Exemplary Non-Transitory Computer Readable Medium Embodiments

Non-Transitory Computer Readable Medium Embodiment 1. A non-transitory computer readable medium (1912) including machine executable instructions which when executed by a processor (1902) of an operations support systems (OSS) (804 or 1900) cause the OSS (804 or 1900)

to perform the following steps: identifying (1604 or 1032) one or more cells with a key performance indicator (KPI) below a cell level threshold, said one or more cells including a first cell with a KPI below the cell level threshold; and identifying (1608 or 1050) a first collision candidate cell having a PCI which is the same as the PCI of the first cell, said first cell and first collision candidate cell forming a first potential PCI cell pair.

Non-Transitory Computer Readable Medium Embodiment 2. A non-transitory computer readable medium (1812) including machine executable instructions which when executed by a processor (1802) of an geographic information system (GIS) correlator (1800) cause the GIS correlator (1800) to perform the following steps: determining (1630 or 1264) the coverage area of a first collision candidate cell based on information indicating the location of user equipments (UEs) receiving service from the first collision candidate cell (e.g., trace data (e.g., trace data including GPS position fix information) or RF location information obtained by monitoring locations of UEs receiving service from the first collision candidate cell); and determining (1642 or 1268) if the coverage area of the first collision candidate cell overlaps a cell coverage area of a first cell.

Non-Transitory Computer Readable Medium Embodiment 2. A non-transitory computer readable medium (1712) including machine executable instructions which when executed by a processor (1702) of an Physical Cell ID (PCI) collision detector (PCD) (1700) cause the PCD (1700) to perform the following steps: performing (1645 or (1282, 1306)) a PCI management operation based on whether determining (1642 or 1268) determines that the coverage area of a first collision candidate cell overlaps (1648 or 1270) the cell coverage area of a first cell or does not overlap (1652 or 1272) the cell coverage area of the first cell.

Various embodiments are directed to apparatus, e.g., a PCI collision detector (PCD) device, an operations support system (OSS) device, a geographic information system (GIS) correlator device, a file transport protocol (FTP) server, a trace collection entity (TCE) server, core network nodes, base stations, UEs, access points, a device including a AMF, a device including a UDM, a device including a SMF, a device including a PCF, a device including a UPF, a server, a device including a N3IWF, a device including a TNGF, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a PCI collision detector (PCD) device, an operations support system (OSS) device, a geographic information system (GIS) correlator device, a file transport protocol (FTP) server, a trace collection entity (TCE) server, a core network node, a base stations, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming. UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Devices can and sometimes are implemented as a set of separate elements or processors which work together to implement the functions attributed to a device. Cloud based processing systems can are used to implement one or more functions of a device in some embodiments.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a PCI collision detector (PCD) device, an operations support system (OSS) device, a geographic information system (GIS) correlator device, a file transport protocol (FTP) server, a trace collection entity (TCE) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a PCI collision detector (PCD) device, an operations support system (OSS) device, a geographic information system (GIS) correlator device, a file transport protocol (FTP) server, a trace collection entity (TCE) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g., a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a PCI collision detector (PCD) device, an operations support system (OSS) device, a geographic information system (GIS) correlator device, a file transport protocol (FTP) server, a trace collection entity (TCE) server, a core network node, a base station, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a PCI collision detector (PCD) device, an operations support system (OSS) device, a geographic information system (GIS) correlator device, a file transport protocol (FTP) server, a trace collection entity (TCE) server, a core network node, a base station, a UE, an access point, a device including a AMF, a device including a UDM, a device including a SMF, a device including a PCF, a device including a UPF, a server, a device including a N3IWF, a device including a TNGF, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a PCI collision detector (PCD) device, an operations support system (OSS) device, a geographic information system (GIS) correlator device, a file transport protocol (FTP) server, a trace collection entity (TCE) server, a core network node, base stations, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of controlling physical cell ID (PCI) use in a network, the method comprising:
    identifying one or more cells with a key performance indicator (KPI) below a cell level threshold, said one or more cells including a first cell with a KPI below the cell level threshold;
    identifying a first collision candidate cell having a PCI which is the same as the PCI of the first cell, said first cell and first collision candidate cell forming a first potential PCI cell pair;
    determining the coverage area of the first collision candidate cell based on information indicating the location of user equipments (UEs) receiving service from the first collision candidate cell;
    determining if the coverage area of the first collision candidate cell overlaps a cell coverage area of the first cell; and
    performing a PCI management operation based on whether said determining determines that the coverage area of the first collision candidate cell overlaps the cell coverage area of the first cell or does not overlap the cell coverage area of the first cell.

2. The method of claim 1, wherein said first cell has the worst KPI in a set of cells including the first cell which have the same PCI as the first cell.

3. The method of claim 2, wherein said first collision candidate cell has the second worst KPI in the set of cells which have the same PCI as the first cell.

4. The method of claim 1, wherein identifying one or more cells with a KPI below the cell level threshold includes:
    comparing KPIs corresponding to a plurality of base stations to a cell level KPI threshold to detect cells with a KPI below the cell level KPI threshold.

5. The method of claim 1, wherein performing a PCI management operation in the case where it is determined that the first collision candidate cell coverage area overlaps the coverage area of the first cell, includes:
    assigning a new PCI value to one of the first cell and the first collision candidate cell, said new PCI being different from the PCI previously used by the first cell and the first collision candidate cell.

6. The method of claim 5, further comprising, prior to determining the coverage area of the first collision candidate cell:
    disabling the first cell; and
    wherein determining the coverage area of the first collision candidate cell includes plotting UE locations of UEs receiving service from the first collision candidate cell while the first cell is disabled.

7. The method of claim 6, wherein plotting UE locations of UEs receiving service from the first collision candidate cell while the first cell is disabled includes plotting trace data from UEs receiving service from the first collision candidate cell, said trace data being from UEs operating in trace mode.

8. The method of claim 6, further comprising, prior to determining if the coverage area of the first collision candidate cell overlaps a cell coverage area of the first cell:
    disabling the first collision candidate cell; and
    determining the coverage area of the first cell based on information indicating the location of UEs receiving service from the first cell.

9. The method of claim 8, wherein determining the coverage area of the first cell includes: plotting UE locations of UEs receiving service from the first cell while the first collision candidate cell is disabled.

10. The method of claim 1, wherein performing a PCI management operation when it is determined that the coverage area of the first collision candidate cell does not overlap the cell coverage area of the first cell includes:
    determining the coverage area of a second collision candidate cell based on information indicating the location of UEs receiving service from the second collision candidate cell;
    making a second determination of the coverage area of the first cell;
    determining if the coverage area of the second collision candidate cell overlaps the second determined cell coverage area of the first cell; and
    performing a PCI management operation based on whether said determining determines that the coverage area of the second collision candidate cell overlaps the second determined cell coverage area of the first cell or does not overlap the second determined cell coverage area of the first cell.

11. The method of claim 10, further comprising: prior to determining the coverage area of the second collision candidate cell, identifying the second collision candidate cell having a PCI which is the same as the PCI of the first cell, said first cell and second collision candidate cell forming a second potential PCI cell pair.

12. The method of claim 11, wherein said first potential PCI cell pair is a first potential PCI cell collision pair, and wherein said second potential PCI cell pair is a second potential PCI cell collision pair.

13. A system for controlling physical cell identifier (PCI) use in a network, the system comprising:
  an operations support system (OSS) including:
    memory; and
    a first processor configured to:
      identify one or more cells with a KPI below a cell level threshold, said one or more cells including a first cell with a KPI below the cell level threshold; and
      identify a first collision candidate cell having a PCI which is the same as the PCI of the first cell, said first cell and first collision candidate cell forming a first potential PCI cell pair; and
  a geographic information system (GIS) correlator including:
    memory; and
    a second processor configured to:
      determine the coverage area of the first collision candidate cell based on information indicating the location of UEs receiving service from the first collision candidate cell; and
      determine if the coverage area of the first collision candidate cell overlaps a cell coverage area of the first cell.

14. The system of claim 13, further comprising:
  a physical cell ID (PCI) collision detector (PCD) including:
    memory; and
    a third processor configured to:
      perform a PCI management operation based on whether said determining if the coverage area of the first collision candidate cell overlaps a cell coverage area of the first cell determines that the coverage area of the first collision candidate cell overlaps the cell coverage area of the first cell or does not overlap the cell coverage area of the first cell.

15. The system of claim 14, wherein said first cell has the worst KPI in a set of cells including the first cell which have the same PCI as the first cell.

16. The system of claim 15, wherein said first collision candidate cell has the second worst KPI in the set of cells which have the same PCI as the first cell.

17. The system of claim 14, wherein said third processor is configured to:
  command the OSS to assign a new PCI value to one of the first cell and the first collision candidate cell, said new PCI being different from the PCI previously used by the first cell and the first collision candidate cell, as part of being configured to perform a PCI management operation in the case where it is determined that the first collision candidate cell coverage area overlaps the coverage area of the first cell.

18. The system of claim 17, wherein said third processor is further configured to:
  disable the first collision candidate cell, said disabling of the first collision candidate cell being prior to said determining if the coverage area of the first collision candidate cell overlaps a cell coverage area of the first cell; and
  wherein said second processor is further configured to determine the coverage area of the first cell based on information indicating the location of UEs receiving service from the first cell.

19. The system of claim 18, wherein said second processor is configured to: plot UE locations of UEs receiving service from the first cell while the first collision candidate cell is disabled, as part of being configured to determine the coverage area of the first cell.

20. The system of claim 14, wherein said third processor is configured, as part of being configured to perform a PCI management operation when it is determined that the coverage area of the first collision candidate cell does not overlap the cell coverage area of the first cell, to:
  request the GIS correlator to determine the coverage area of a second collision candidate cell based on information indicating the location of UEs receiving service from the second collision candidate cell;
  request the GIS correlator to make a second determination of the coverage area of the first cell;
  request the GIS correlator to determine if the coverage area of the second collision candidate cell overlaps the second determined cell coverage area of the first cell; and
  perform a PCI management operation based on whether said determining determines that the coverage area of the second collision candidate cell overlaps the second determined cell coverage area of the first cell or does not overlap the second determined cell coverage area of the first cell.

* * * * *